(12) United States Patent
Alsina

(10) Patent No.: US 12,311,880 B2
(45) Date of Patent: May 27, 2025

(54) MOBILE KEY USER INTERFACES

(71) Applicant: Apple Inc., Cupertino, CA (US)

(72) Inventor: Thomas Alsina, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/222,568

(22) Filed: Apr. 5, 2021

(65) Prior Publication Data

US 2022/0135001 A1     May 5, 2022

Related U.S. Application Data

(60) Provisional application No. 63/110,272, filed on Nov. 5, 2020.

(51) Int. Cl.
| | |
|---|---|
| *B60R 25/24* | (2013.01) |
| *B60R 25/25* | (2013.01) |
| *G06F 3/0482* | (2013.01) |
| *G06F 3/0484* | (2022.01) |
| *G06F 3/0488* | (2022.01) |

(52) U.S. Cl.
CPC ............ *B60R 25/241* (2013.01); *B60R 25/25* (2013.01); *G06F 3/0482* (2013.01); *G06F 3/0484* (2013.01); *G06F 3/0488* (2013.01)

(58) Field of Classification Search
CPC ..... B60R 25/241; B60R 25/25; G06F 3/0482; G06F 3/0484; G06F 3/0488
See application file for complete search history.

(56) References Cited

U.S. PATENT DOCUMENTS

| | | |
|---|---|---|
| 2,013,027 A | 9/1935 | Branch |
| 8,353,448 B1 | 1/2013 | Miller et al. |
| 8,381,969 B1 | 2/2013 | Miller et al. |
| 8,466,875 B2 | 6/2013 | Nakada et al. |
| 8,720,771 B2 | 5/2014 | Mackinnon Keith |
| 8,943,187 B1 | 1/2015 | Saylor |
| 9,324,067 B2 | 4/2016 | Van Os et al. |
| 9,348,492 B1 | 5/2016 | Penilla et al. |
| 9,485,251 B2 | 11/2016 | White et al. |
| 9,608,970 B1 | 3/2017 | Gehret et al. |
| 9,961,408 B2 | 5/2018 | Mickelsen et al. |
| 10,057,227 B1 | 8/2018 | Hess et al. |

(Continued)

FOREIGN PATENT DOCUMENTS

| | | |
|---|---|---|
| AU | 2021100511 A4 | 4/2021 |
| AU | 2021213717 A1 | 2/2022 |

(Continued)

OTHER PUBLICATIONS

English Translation of JP 2019046122 (Year: 2019).*

(Continued)

*Primary Examiner* — Patrick N Edouard
*Assistant Examiner* — Eboni N Giles
(74) *Attorney, Agent, or Firm* — DLA Piper LLP (US)

(57) ABSTRACT

The present disclosure generally relates to user interfaces for managing and using a mobile key. In some embodiments, while displaying a representation of a mobile car key on a multifunction device, the device receives a request to restrict use of the mobile car key for a predetermined time period, and in response, restricts at least one function of the mobile car key for the time period.

48 Claims, 23 Drawing Sheets

(56) References Cited

U.S. PATENT DOCUMENTS

| | | |
|---|---|---|
| 10,108,909 B2 | 10/2018 | Sulavik et al. |
| 10,163,105 B1 | 12/2018 | Ziraknejad et al. |
| 10,164,975 B1 | 12/2018 | Son et al. |
| 10,192,217 B1 | 1/2019 | Ellis et al. |
| 10,234,953 B1 | 3/2019 | Li et al. |
| 10,242,351 B1 | 3/2019 | Wilson et al. |
| 10,275,956 B1 | 4/2019 | Gehret et al. |
| 10,282,727 B2 | 5/2019 | Van Os et al. |
| 10,332,104 B2 | 6/2019 | Prakash et al. |
| 10,339,521 B1 | 7/2019 | Bodkin et al. |
| 10,366,387 B2 | 7/2019 | Aabye et al. |
| 10,373,395 B1 | 8/2019 | Harned et al. |
| 10,503,912 B1 | 12/2019 | Kerr |
| 10,621,575 B1 | 4/2020 | Belleville et al. |
| 10,701,067 B1 | 6/2020 | Ziraknejad et al. |
| 10,769,625 B2 | 9/2020 | Pandiarajan et al. |
| 10,776,779 B2 | 9/2020 | Ellis et al. |
| 10,803,400 B2 | 10/2020 | Sindia et al. |
| 10,853,791 B1 | 12/2020 | Ellis et al. |
| 10,878,437 B2 | 12/2020 | Ye et al. |
| 11,026,085 B2 | 6/2021 | Grange et al. |
| 11,080,700 B2 | 8/2021 | Ortiz et al. |
| 11,127,013 B1 | 9/2021 | Boyd et al. |
| 11,134,294 B2 | 9/2021 | Lee et al. |
| 11,157,918 B1 | 10/2021 | Ellison et al. |
| 11,182,774 B1 | 11/2021 | Boyd et al. |
| 11,206,544 B2 | 12/2021 | Boyd et al. |
| 11,312,207 B1 | 4/2022 | Sanders et al. |
| 11,488,140 B2 | 11/2022 | Bhuptani et al. |
| 11,748,507 B2 | 9/2023 | Cool et al. |
| 2002/0120867 A1 | 8/2002 | Mitchell et al. |
| 2005/0074126 A1 | 4/2005 | Stanko |
| 2005/0099275 A1 | 5/2005 | Kamdar et al. |
| 2005/0177867 A1 | 8/2005 | Toutonghi |
| 2006/0255906 A1 | 11/2006 | Ghabra et al. |
| 2008/0041936 A1 | 2/2008 | Vawter |
| 2008/0048022 A1 | 2/2008 | Vawter |
| 2008/0214150 A1 | 9/2008 | Ramer et al. |
| 2009/0320125 A1 | 12/2009 | Pleasant et al. |
| 2010/0026503 A1 | 2/2010 | Proefke et al. |
| 2010/0075656 A1 | 3/2010 | Howarter et al. |
| 2011/0077983 A1 | 3/2011 | Hua et al. |
| 2011/0126003 A1 | 5/2011 | Engert |
| 2011/0131494 A1 | 6/2011 | Ono et al. |
| 2011/0165859 A1 | 7/2011 | Wengrovitz |
| 2011/0202988 A1 | 8/2011 | Otranen et al. |
| 2011/0282785 A1 | 11/2011 | Chin |
| 2012/0129493 A1 | 5/2012 | Vasudevan |
| 2012/0200390 A1 | 8/2012 | Saravanan |
| 2012/0323664 A1 | 12/2012 | Klems |
| 2013/0024371 A1 | 1/2013 | Hariramani et al. |
| 2013/0046600 A1 | 2/2013 | Coppinger |
| 2013/0073459 A1 | 3/2013 | Zacarias et al. |
| 2013/0263211 A1 | 10/2013 | Neuman et al. |
| 2013/0275008 A1 | 10/2013 | Breed |
| 2013/0304642 A1 | 11/2013 | Campos |
| 2014/0047331 A1 | 2/2014 | Feldman et al. |
| 2014/0129053 A1 | 5/2014 | Kleve et al. |
| 2014/0244494 A1 | 8/2014 | Davis et al. |
| 2014/0244495 A1 | 8/2014 | Davis et al. |
| 2014/0244514 A1 | 8/2014 | Rodriguez et al. |
| 2014/0258110 A1 | 9/2014 | Davis et al. |
| 2014/0279519 A1 | 9/2014 | Mattes et al. |
| 2014/0304173 A1 | 10/2014 | Ernsdorff |
| 2014/0365466 A1 | 12/2014 | Chu et al. |
| 2015/0053757 A1 | 2/2015 | Williams et al. |
| 2015/0074774 A1 | 3/2015 | Nema et al. |
| 2015/0081346 A1 | 3/2015 | Charles |
| 2015/0210287 A1 | 7/2015 | Penilla et al. |
| 2015/0271175 A1 | 9/2015 | Je et al. |
| 2015/0278780 A1 | 10/2015 | Vaidyanathan et al. |
| 2015/0294515 A1 | 10/2015 | Bergdale et al. |
| 2015/0324791 A1 | 11/2015 | Khan |
| 2015/0348001 A1 | 12/2015 | Van Os et al. |
| 2016/0018525 A1 | 1/2016 | Lanzagorta |
| 2016/0055511 A1 | 2/2016 | Chidella et al. |
| 2016/0057138 A1 | 2/2016 | Hoyos et al. |
| 2016/0070447 A1 | 3/2016 | Righter et al. |
| 2016/0072794 A1 | 3/2016 | Engert |
| 2016/0078143 A1 | 3/2016 | Huang et al. |
| 2016/0078581 A1 | 3/2016 | Maher |
| 2016/0134599 A1 | 5/2016 | Ross et al. |
| 2016/0180332 A1 | 6/2016 | Wilczynski |
| 2016/0252978 A1 | 9/2016 | Yoo et al. |
| 2016/0259497 A1 | 9/2016 | Foss et al. |
| 2016/0294831 A1 | 10/2016 | Borunda et al. |
| 2016/0295005 A1 | 10/2016 | Schussmann et al. |
| 2016/0300054 A1 | 10/2016 | Turgeman et al. |
| 2016/0357752 A1 | 12/2016 | Yang et al. |
| 2016/0373458 A1 | 12/2016 | Moreton et al. |
| 2017/0032485 A1 | 2/2017 | Vemury |
| 2017/0053470 A1 | 2/2017 | Bergerhoff et al. |
| 2017/0091765 A1 | 3/2017 | Lloyd et al. |
| 2017/0103388 A1 | 4/2017 | Pillai et al. |
| 2017/0109901 A1 | 4/2017 | Raj |
| 2017/0120864 A1* | 5/2017 | Fischer ............... B60K 37/06 |
| 2017/0124312 A1 | 5/2017 | Inoue |
| 2017/0140642 A1 | 5/2017 | Kim |
| 2017/0151928 A1 | 6/2017 | Kang et al. |
| 2017/0169528 A1 | 6/2017 | Kundu et al. |
| 2017/0213211 A1 | 7/2017 | Sibert et al. |
| 2017/0243200 A1 | 8/2017 | Vaidyanathan et al. |
| 2017/0248946 A1 | 8/2017 | Ogura et al. |
| 2017/0249791 A1 | 8/2017 | Woo et al. |
| 2017/0286648 A1 | 10/2017 | Yamaguchi et al. |
| 2017/0286656 A1 | 10/2017 | Kohli |
| 2017/0343200 A1 | 11/2017 | Lai et al. |
| 2017/0357520 A1 | 12/2017 | De Vries et al. |
| 2017/0357973 A1 | 12/2017 | Van Os et al. |
| 2018/0018595 A1 | 1/2018 | Scott et al. |
| 2018/0018664 A1 | 1/2018 | Purves et al. |
| 2018/0029560 A1* | 2/2018 | Mohaupt ............. B60R 25/255 |
| 2018/0033034 A1 | 2/2018 | Ye et al. |
| 2018/0041503 A1 | 2/2018 | Lindemann |
| 2018/0103414 A1 | 4/2018 | Golsch |
| 2018/0108031 A1 | 4/2018 | Jones et al. |
| 2018/0130044 A1 | 5/2018 | Gage et al. |
| 2018/0165655 A1 | 6/2018 | Marcelle et al. |
| 2018/0165676 A1 | 6/2018 | Bhatt et al. |
| 2018/0167387 A1 | 6/2018 | Bhatt et al. |
| 2018/0186333 A1* | 7/2018 | Santiano ............... H04W 12/08 |
| 2018/0191501 A1 | 7/2018 | Lindemann |
| 2018/0195874 A1 | 7/2018 | Andrew et al. |
| 2018/0260553 A1 | 9/2018 | Hoyos et al. |
| 2018/0265095 A1 | 9/2018 | Joe et al. |
| 2018/0276657 A1 | 9/2018 | Cho et al. |
| 2018/0322488 A1 | 11/2018 | Arana et al. |
| 2018/0335928 A1 | 11/2018 | Van Os et al. |
| 2018/0336327 A1 | 11/2018 | Wallace et al. |
| 2018/0349581 A1 | 12/2018 | Ramalingam |
| 2018/0357846 A1 | 12/2018 | Chen |
| 2018/0367946 A1 | 12/2018 | Best |
| 2019/0043148 A1 | 2/2019 | Vemury |
| 2019/0057412 A1 | 2/2019 | Bhattacharjee et al. |
| 2019/0061687 A1 | 2/2019 | Khalil |
| 2019/0080070 A1 | 3/2019 | Van Os et al. |
| 2019/0080189 A1 | 3/2019 | Van Os et al. |
| 2019/0092279 A1 | 3/2019 | Jarvis et al. |
| 2019/0163876 A1 | 5/2019 | Remme et al. |
| 2019/0164165 A1 | 5/2019 | Ithabathula |
| 2019/0168036 A1 | 6/2019 | Conboy |
| 2019/0168410 A1 | 6/2019 | Conboy |
| 2019/0171998 A1 | 6/2019 | Conboy |
| 2019/0172149 A1 | 6/2019 | Conboy |
| 2019/0172161 A1 | 6/2019 | Conboy |
| 2019/0180021 A1 | 6/2019 | Mukundala |
| 2019/0197527 A1 | 6/2019 | Agarwalla et al. |
| 2019/0213525 A1 | 7/2019 | Haci et al. |
| 2019/0220662 A1 | 7/2019 | Shenouda Dawoud |
| 2019/0263356 A1 | 8/2019 | Golsch et al. |
| 2019/0287111 A1 | 9/2019 | Cvetkovich et al. |
| 2019/0304216 A1 | 10/2019 | Mendelson et al. |
| 2019/0305949 A1 | 10/2019 | Hamel et al. |
| 2019/0327228 A1 | 10/2019 | Pantfoerder et al. |

(56) References Cited

U.S. PATENT DOCUMENTS

| | | |
|---|---|---|
| 2019/0355191 A1 | 11/2019 | Jones et al. |
| 2019/0364020 A1 | 11/2019 | Wardell et al. |
| 2019/0370781 A1 | 12/2019 | Van Os et al. |
| 2020/0020196 A1 | 1/2020 | Petersen et al. |
| 2020/0029173 A1 | 1/2020 | Pang et al. |
| 2020/0065822 A1 | 2/2020 | Lin et al. |
| 2020/0079320 A1 | 3/2020 | Lacoss-Arnold |
| 2020/0211031 A1 | 7/2020 | Patil |
| 2020/0269811 A1 | 8/2020 | Kim et al. |
| 2020/0320653 A1 | 10/2020 | Hastings et al. |
| 2020/0349244 A1 | 11/2020 | Kim et al. |
| 2020/0387686 A1 | 12/2020 | Jhang et al. |
| 2020/0391049 A1 | 12/2020 | Moffat et al. |
| 2021/0004792 A1 | 1/2021 | Kikinis et al. |
| 2021/0014678 A1 | 1/2021 | Seagraves et al. |
| 2021/0089635 A1 | 3/2021 | Weeresinghe |
| 2021/0127233 A1 | 4/2021 | Santavicca et al. |
| 2021/0229630 A1 | 7/2021 | Kramar et al. |
| 2021/0266500 A1 | 8/2021 | Taylor et al. |
| 2021/0287768 A1 | 9/2021 | Craig et al. |
| 2021/0319468 A1 | 10/2021 | Zhu et al. |
| 2021/0319862 A1 | 10/2021 | Boyd et al. |
| 2021/0321263 A1 | 10/2021 | Boyd et al. |
| 2021/0373744 A1 | 12/2021 | Miller et al. |
| 2021/0373745 A1 | 12/2021 | Chang |
| 2021/0374714 A1 | 12/2021 | Chang |
| 2021/0374750 A1 | 12/2021 | Miller et al. |
| 2021/0377742 A1 | 12/2021 | Boyd et al. |
| 2021/0392125 A1 | 12/2021 | Bryson |
| 2022/0277295 A1 | 9/2022 | Robinson-Morgan et al. |
| 2022/0332285 A1 | 10/2022 | Sanders et al. |
| 2022/0391481 A1 | 12/2022 | Villanueva Gaviola et al. |
| 2022/0391482 A1 | 12/2022 | Villanueva Gaviola et al. |
| 2023/0039942 A1 | 2/2023 | Young et al. |
| 2023/0045850 A1 | 2/2023 | Sammoura et al. |
| 2023/0089689 A1 | 3/2023 | Pons Bordes et al. |
| 2023/0234537 A1 | 7/2023 | Kramar et al. |
| 2023/0394899 A1 | 12/2023 | Young |
| 2024/0036713 A1 | 2/2024 | Chang |
| 2024/0104188 A1 | 3/2024 | Villanueva Gaviola et al. |
| 2024/0147243 A1 | 5/2024 | Villanueva Gaviola et al. |
| 2024/0198960 A1 | 6/2024 | Kramar et al. |
| 2024/0253419 A1 | 8/2024 | Sanders et al. |

FOREIGN PATENT DOCUMENTS

| | | |
|---|---|---|
| CN | 101689188 A | 3/2010 |
| CN | 103635923 A | 3/2014 |
| CN | 103886460 A | 6/2014 |
| CN | 105099694 A | 11/2015 |
| CN | 105190659 A | 12/2015 |
| CN | 105321067 A | 2/2016 |
| CN | 105338066 A | 2/2016 |
| CN | 105787755 A | 7/2016 |
| CN | 106453341 A | 2/2017 |
| CN | 107609865 A | 1/2018 |
| CN | 108064393 A | 5/2018 |
| CN | 109353309 A | 2/2019 |
| CN | 109949120 A | 6/2019 |
| CN | 110086609 A | 8/2019 |
| CN | 110135872 A | 8/2019 |
| CN | 110197059 A | 9/2019 |
| CN | 112819475 A | 5/2021 |
| EP | 2981115 A2 | 2/2016 |
| EP | 3460692 A1 | 3/2019 |
| EP | 3476670 A1 | 5/2019 |
| EP | 3926888 A1 | 12/2021 |
| JP | 2004-213362 A | 7/2004 |
| JP | 2012-508930 A | 4/2012 |
| JP | 2013-37568 A | 2/2013 |
| JP | 2013-257878 A | 12/2013 |
| JP | 2016-133969 A | 7/2016 |
| JP | 2016-526211 A | 9/2016 |
| JP | 2018-501680 A | 1/2018 |
| JP | 2018-136886 A | 8/2018 |
| JP | 2018-156283 A | 10/2018 |
| JP | 2019-95880 A | 6/2019 |
| JP | 2019-149167 A | 9/2019 |
| JP | 2019-191753 A | 10/2019 |
| JP | 2019-197332 A | 11/2019 |
| JP | 2019-535931 A | 12/2019 |
| KR | 10-2013-0035286 A | 4/2013 |
| KR | 10-2013-0131956 A | 12/2013 |
| KR | 10-1509596 B1 | 4/2015 |
| KR | 10-2015-0066892 A | 6/2015 |
| KR | 10-1684188 B1 | 12/2016 |
| KR | 10-2062919 B1 | 1/2020 |
| KR | 10-2020-0108515 A | 9/2020 |
| WO | 2008/157016 A1 | 12/2008 |
| WO | 2013/003210 A3 | 2/2013 |
| WO | 2014/146186 A1 | 9/2014 |
| WO | 2015/153154 A1 | 10/2015 |
| WO | 2015/184353 A1 | 12/2015 |
| WO | 2015/194135 A1 | 12/2015 |
| WO | 2016/128569 A1 | 8/2016 |
| WO | 2017/078635 A1 | 5/2017 |
| WO | 2017/218490 A1 | 12/2017 |
| WO | 2018/048703 A1 | 3/2018 |
| WO | 2018/071674 A1 | 4/2018 |
| WO | 2018/074504 A1 | 4/2018 |
| WO | 2018/081317 A1 | 5/2018 |
| WO | 2018/160863 A1 | 9/2018 |
| WO | 2019/069129 A1 | 4/2019 |
| WO | 2019/191213 A1 | 10/2019 |
| WO | 2020/197694 A1 | 10/2020 |
| WO | 2021/038298 A2 | 3/2021 |

OTHER PUBLICATIONS

Applicant Initiated Interview Summary received for U.S. Appl. No. 17/030,260, mailed on Jan. 7, 2022, 2 pages.

Corrected Notice of Allowance received for U.S. Appl. No. 17/030,259, mailed on Jan. 5, 2022, 2 pages.

Non-Final Office Action received for U.S. Appl. No. 17/030,256, mailed on Jan. 18, 2022, 20 pages.

Applicant-Initiated Interview Summary received for U.S. Appl. No. 17/030,256, mailed on Jun. 17, 2022, 2 pages.

Non-Final Office Action received for U.S. Appl. No. 17/030,257, mailed on Jun. 20, 2022, 27 pages.

Office Action received for Australian Patent Application No. 2021213717, mailed on Jun. 17, 2022, 4 pages.

International Search Report and Written Opinion received for PCT Patent Application No. PCT/US2021/015123, mailed on Aug. 9, 2021, 20 pages.

Non-Final Office Action received for U.S. Appl. No. 17/030,259, mailed on Aug. 19, 2021, 20 pages.

Non-Final received for U.S. Appl. No. 17/030,257, mailed on Dec. 24, 2021, 24 pages.

Office Action received for Australian Patent Application No. 2021102823, mailed on Nov. 24, 2021, 7 pages.

Juan, "Everything you can do with Wechat QR codes in 2019", Available online at: https://qpsoftware.net/blog/wechat-qr-code, Jul. 1, 2019, 13 pages.

Linelovers, "4 ways to add someone to your Line friends list", Available online at: http://line-lovers-world.com/2016/10/23/%E3%80%90line-app%E3%80%914-ways-to-add-someone-to-your-line-friends-list/, Oct. 23, 2016, 14 pages.

Mack, Brandon, "How Do Snapchat's Snapcodes Work?", Available online at: https://blackatlascreative.com/blog/how-do-snapchats-snapcodes-work/, Nov. 10, 2015, 10 pages.

Corrected Notice of Allowance received for U.S. Appl. No. 17/030,259, mailed on Apr. 4, 2022, 2 pages.

Applicant-Initiated Interview Summary received for U.S. Appl. No. 17/030,260, mailed on May 5, 2022, 2 pages.

Corrected Notice of Allowance received for U.S. Appl. No. 17/484,306, mailed on Mar. 30, 2022, 4 pages.

Final Office Action received for U.S. Appl. No. 17/030,256, mailed on Mar. 14, 2022, 20 pages.

Final Office Action received for U.S. Appl. No. 17/030,260, mailed on Mar. 9, 2022, 42 pages.

(56) References Cited

OTHER PUBLICATIONS

Invitation to Pay Additional Fees received for PCT Patent Application No. PCT/US2021/033051, mailed on Aug. 26, 2021, 10 pages.
Office Action received for Australian Patent Application No. 2021102823, mailed on Aug. 24, 2021, 8 pages.
Lurey C., "Keeper fortifies industry best security architecture with integrated two-factor codes", Online available at: https://www.keepersecurity.com/blog/2019/08/29/keeper-fortifies-industry-best-securityarchitecture-with-integrated-two-factor-codes/, Aug. 29, 2019, 8 pages.
Office Action received for Australian Patent Application No. 2021100511, mailed on Sep. 2, 2021, 3 pages.
Office Action received for Australian Patent Application No. 2021203367, mailed on May 23, 2022, 5 pages.
Office Action received for Korean Patent Application No. 10-2022-0003867, mailed on May 17, 2022, 19 pages (9 pages of English Translation and 10 pages of Official Copy).
International Search Report and Written Opinion received for PCT Patent Application No. PCT/US2021/057325, mailed on Jan. 5, 2022, 14 pages.
Non-Final Office Action received for U.S. Appl. No. 17/030,260, mailed on Jul. 8, 2022, 36 pages.
Notice of Allowance received for U.S. Appl. No. 17/030,256, mailed on Jul. 20, 2022, 9 pages.
Applicant-Initiated Interview Summary received for U.S. Appl. No. 17/030,259, mailed on Nov. 19, 2021, 18 pages.
Certificate of Examination received for Australian Patent Application No. 2021100511, mailed on Nov. 5, 2021, 2 pages.
Intention to Grant received for Danish Patent Application No. PA202170032, mailed on Oct. 6, 2021, 2 pages.
International Search Report and Written Opinion received for PCT Patent Application No. PCT/US2021/033051, mailed on Oct. 29, 2021, 20 pages.
Meet Your Model 3, Available Online at: https://www.tesla.com/support/meet-your-tesla/model-3#keys, 2021, 3 pages.
Non-Final Office Action received for U.S. Appl. No. 17/030,260, mailed on Oct. 6, 2021, 43 pages.
Sibila Alex, "Tesla App Full Walkthrough (Mar. 2020)", Available Online at: https://www.youtube.com/watch?v=RHMWPj_RXLU, Mar. 16, 2020, 3 pages.
Use your iPhone or Apple Watch as a car key, Available Online at: https://support.apple.com/en-us/HT211234, Mar. 16, 2021, 5 pages.
Volvo On Call app: Operating remote start of the car, Available Online at: https://www.volvocars.com/en-ca/support/topics/volvo-on-call/app/volvo-on-call-app-operating-remote-start-of-the-car-2, Nov. 5, 2020, 4 pages.
International Preliminary Report on Patentability received for PCT Patent Application No. PCT/US2021/015123, mailed on Aug. 11, 2022, 14 pages.
Invitation to Pay Additional Fees received for PCT Patent Application No. PCT/US2022/025365, mailed on Aug. 4, 2022, 9 pages.
Applicant-Initiated Interview Summary received for U.S. Appl. No. 17/030,257, mailed on Feb. 7, 2022, 5 pages.
Decision to Grant received for Danish Patent Application No. PA202170032, mailed on Feb. 1, 2022, 2 pages.
Notice of Allowance received for U.S. Appl. No. 17/180,509, mailed on Apr. 28, 2021, 16 pages.
Notice of Allowance received for U.S. Appl. No. 17/180,509, mailed on Aug. 23, 2021, 14 pages.
Office Action received for Australian Patent Application No. 2021100511, mailed on May 26, 2021, 5 pages.
Notice of Allowance received for U.S. Appl. No. 17/030,259, mailed on Dec. 14, 2021, 8 pages.
Notice of Allowance received for U.S. Appl. No. 17/484,306, mailed on Nov. 26, 2021, 9 pages.
Applicant-Initiated Interview Summary received for U.S. Appl. No. 17/030,256, mailed on Feb. 23, 2022, 2 pages.
Office Action received for Australian Patent Application No. 2021102823, mailed on Feb. 22, 2022, 5 pages.
Office Action received for Australian Patent Application No. 2021213717, mailed on Feb. 10, 2022, 4 pages.
Search Report and Opinion received for Danish Patent Application No. PA202170598, mailed on Feb. 15, 2022, 11 pages.
Invitation to Pay Additional Fees received for PCT Patent Application No. PCT/US2021/015123, mailed on Jun. 16, 2021, 12 pages.
Office Action received for Danish Patent Application No. PA202170032, mailed on May 7, 2021, 7 pages.
Advisory Action received for U.S. Appl. No. 17/030,260, mailed on Dec. 13, 2022, 4 pages.
Advisory Action received for U.S. Appl. No. 17/485,086, mailed on Sep. 9, 2022, 5 pages.
Applicant Initiated Interview Summary received for U.S. Appl. No. 17/485,086, mailed on Apr. 26, 2022, 2 pages.
Applicant-Initiated Interview Summary received for U.S. Appl. No. 17/030,260, mailed on Nov. 29, 2022, 2 pages.
Cease, Dictionary.com, Merriam-Webster, 2022, 1 page.
Corrected Notice of Allowance received for U.S. Appl. No. 17/485,098, mailed on Oct. 13, 2022, 8 pages.
Final Office Action received for U.S. Appl. No. 17/030,257, mailed on Dec. 8, 2022, 29 pages.
Final Office Action received for U.S. Appl. No. 17/485,086, mailed on May 4, 2022, 21 pages.
International Preliminary Report on Patentability received for PCT Patent Application No. PCT/US2021/033051, mailed on Dec. 8, 2022, 14 pages.
International Search Report and Written Opinion received for PCT Patent Application No. PCT/US2022/030567, mailed on Dec. 9, 2022, 24 pages.
Invitation to Pay Additional Fees and Partial International Search Report received for PCT Patent Application No. PCT/US2022/030567, mailed on Sep. 13, 2022, 13 pages.
Non-Final Office Action received for U.S. Appl. No. 17/485,086, mailed on Jan. 24, 2022, 19 pages.
Non-Final Office Action received for U.S. Appl. No. 17/485,086, mailed on Nov. 14, 2022, 22 pages.
Notice of Allowance received for U.S. Appl. No. 17/485,098, mailed on Aug. 5, 2022, 12 pages.
Applicant-Initiated Interview Summary received for U.S. Appl. No. 17/375,767, mailed on Oct. 27, 2022, 4 pages.
Applicant-Initiated Interview Summary received for U.S. Appl. No. 17/030,260, mailed on Oct. 11, 2022, 2 pages.
Applicant-Initiated Interview Summary received for U.S. Appl. No. 17/077,820, mailed on Oct. 6, 2022, 2 pages.
International Search Report and Written Opinion received for PCT Patent Application No. PCT/US2022/025365, mailed on Sep. 27, 2022, 16 pages.
Non-Final Office Action received for U.S. Appl. No. 17/375,767, mailed on Sep. 29, 2022, 10 pages.
Applicant-Initiated Interview Summary received for U.S. Appl. No. 17/485,086, mailed on Dec. 23, 2022, 2 pages.
Final Office Action received for U.S. Appl. No. 17/375,767, mailed on Dec. 29, 2022, 13 pages.
Notice of Allowance received for U.S. Appl. No. 17/077,820, mailed on Jan. 6, 2023, 11 pages.
Office Action received for Japanese Patent Application No. 2022-520133, mailed on Oct. 17, 2022, 4 pages (2 pages of English Translation and 2 pages of Official Copy).
Applicant-Initiated Interview Summary received for U.S. Appl. No. 17/030,257, mailed on Aug. 29, 2022, 5 pages.
Non-Final Office Action received for U.S. Appl. No. 17/077,820, mailed on Aug. 31, 2022, 10 pages.
Office Action received for Danish Patent Application No. PA202170598, mailed on Sep. 7, 2022, 4 pages.
August, et al., "Mobile web searching", Bell Lab Technical Journal, vol. 6, No. 2, 2002, pp. 84-98.
Corrected Notice of Allowance received for U.S. Appl. No. 17/030,256, mailed on Nov. 9, 2022, 8 pages.
Dahan, et al., "Increasing TeraGrid User Productivity through Integration of Information and Interactive Services", IEEE, 2008, 11 pages.

(56) References Cited

OTHER PUBLICATIONS

Final Office Action received for U.S. Appl. No. 17/030,260, mailed on Nov. 4, 2022, 39 pages.
Notice of Allowance received for Korean Patent Application No. 10-2022-0003867, mailed on Oct. 21, 2022, 7 pages (2 pages of English Translation and 5 pages of Official Copy).
Office Action received for European Patent Application No. 21707473.1, mailed on Oct. 31, 2022, 7 pages.
Notice of Acceptance received for Australian Patent Application No. 2021213717, mailed on Sep. 21, 2022, 3 pages.
Applicant-Initiated Interview Summary received for U.S. Appl. No. 17/375,767, mailed on Apr. 13, 2023, 2 pages.
Applicant-Initiated Interview Summary received for U.S. Appl. No. 17/375,767, mailed on Feb. 2, 2023, 2 pages.
Corrected Notice of Allowance received for U.S. Appl. No. 17/077,820, mailed on Feb. 6, 2023, 2 pages.
Corrected Notice of Allowance received for U.S. Appl. No. 17/077,820, mailed on Mar. 8, 2023, 2 pages.
Intention to Grant received for Danish Patent Application No. PA202170598, mailed on Apr. 24, 2023, 2 pages.
International Search Report and Written Opinion received for PCT Patent Application No. PCT/US2022/042978, mailed on Nov. 29, 2022, 15 pages.
Non-Final Office Action received for U.S. Appl. No. 17/375,767, mailed on Feb. 16, 2023, 12 pages.
Notice of Allowance received for Japanese Patent Application No. 2022-520133, mailed on Jan. 27, 2023, 4 pages (1 page of English Translation and 3 pages of Official Copy).
Notice of Allowance received for U.S. Appl. No. 17/398,723, mailed on Feb. 23, 2023, 17 pages.
Search Report received for Danish Patent Application No. 202270438, mailed on Dec. 5, 2022, 9 pages.
Applicant-Initiated Interview Summary received for U.S. Appl. No. 17/030,257, mailed on Jan. 31, 2023, 7 pages.
Corrected Notice of Allowance received for U.S. Appl. No. 17/077,820, mailed on Jan. 19, 2023, 2 pages.
Intention to Grant received for Danish Patent Application No. PA202170598, mailed on Jan. 16, 2023, 2 pages.
Notice of Allowance received for U.S. Appl. No. 17/485,086, mailed on Jan. 30, 2023, 9 pages.
Office Action received for Korean Patent Application No. 10-2021-0151108, mailed on Jan. 13, 2023, 10 pages (5 pages of English Translation and 5 pages of Official Copy).
Final Office Action received for U.S. Appl. No. 17/375,767, mailed on Jun. 1, 2023, 15 pages.
Office Action received for European Patent Application No. 21731662.9, mailed on Oct. 12, 2023, 8 pages.
Office Action received for Korean Patent Application No. 10-2021-0151108, mailed on Sep. 21, 2023, 12 pages (6 pages of English Translation and 6 pages of Official Copy).
International Preliminary Report on Patentability received for PCT Patent Application No. PCT/US2022/025365, mailed on Nov. 2, 2023, 11 pages.
Kormann et al., "Risks of the Passport Single Signon Protocol", IEEE Computer Networks, Jul. 2000, 12 pages.
Non-Final Office Action received for U.S. Appl. No. 17/900,734, mailed on Oct. 24, 2023, 12 pages.
Notice of Allowance received for U.S. Appl. No. 17/398,723, mailed on Oct. 26, 2023, 15 pages.
Notice of Allowance received for U.S. Appl. No. 18/128,775, mailed on Nov. 2, 2023, 10 pages.
Office Action received for European Patent Application No. 21707473.1, mailed on Oct. 27, 2023, 5 pages.
Office Action received for Korean Patent Application No. 10-2021-7037387, mailed on Oct. 12, 2023, 14 pages (6 pages of English Translation and 8 pages of Official Copy).
Advisory Action received for U.S. Appl. No. 17/375,767, mailed on Jun. 29, 2023, 2 pages.
Applicant-Initiated Interview Summary received for U.S. Appl. No. 17/375,767, mailed on Jun. 26, 2023, 2 pages.
Extended European Search Report received for European Patent Application No. 23165330.4, mailed on Jun. 28, 2023, 10 pages.
Notice of Acceptance received for Australian Patent Application No. 2022235545, mailed on Jun. 27, 2023, 3 pages.
Notice of Allowance received for Japanese Patent Application No. 2023-028792, mailed on Jun. 26, 2023, 4 pages (1 page of English Translation and 3 pages of Official Copy).
Notice of Allowance received for U.S. Appl. No. 17/030,260, mailed on Jun. 28, 2023, 11 pages.
Notice of Allowance received for U.S. Appl. No. 17/398,723, mailed on Jun. 15, 2023, 15 pages.
Notice of Allowance received for U.S. Appl. No. 17/030,257, mailed on Jul. 26, 2023, 14 pages.
Notice of Allowance received for U.S. Appl. No. 17/030,260, mailed on Aug. 7, 2023, 11 pages.
Office Action received for Chinese Patent Application No. 202310033917.0, mailed on Jun. 28, 2023, 19 pages (10 pages of English Translation and 9 pages of Official Copy).
Office Action received for Korean Patent Application No. 10-2023-7010480, mailed on Jul. 20, 2023, 14 pages (7 pages of English Translation and 7 pages of Official Copy).
Eminagaoglu et al., "A Two-Factor Authentication System with QR Codes for Web and Mobile Applications", 2014 Fifth International Conference on Emerging Security Technologies, 2014, pp. 105-112.
Corrected Notice of Allowance received for U.S. Appl. No. 17/030,257, mailed on Sep. 12, 2023, 2 pages.
Non-Final Office Action received for U.S. Appl. No. 17/375,767, mailed on Aug. 31, 2023, 16 pages.
International Preliminary Report on Patentability received for PCT Patent Application No. PCT/US2021/057325, mailed on May 19, 2023, 8 pages.
Office Action received for Australian Patent Application No. 2022235545, mailed on May 11, 2023, 3 pages.
Notice of Allowance received for Korean Patent Application No. 10-2022-7045895, mailed on Apr. 19, 2023, 7 pages (2 pages of English Translation and 5 pages of Official Copy).
Notice of Allowance received for U.S. Appl. No. 17/030,260, mailed on May 3, 2023, 14 pages.
Office Action received for European Patent Application No. 21707473.1, mailed on May 4, 2023, 5 pages.
Applicant-Initiated Interview Summary received for U.S. Appl. No. 17/900,734, mailed on Nov. 20, 2023, 4 pages.
Corrected Notice of Allowance received for U.S. Appl. No. 17/398,723, mailed on Nov. 15, 2023, 12 pages.
Corrected Notice of Allowance received for U.S. Appl. No. 18/128,775, mailed on Nov. 17, 2023, 2 pages.
Office Action received for Australian Patent Application No. 2023200021, mailed on Nov. 1, 2023, 3 pages.
Office Action received for Korean Patent Application No. 10-2021-0182662, mailed on Oct. 26, 2023, 13 pages (6 pages of English Translation and 7 pages of Official Copy).
Decision to Grant received for Danish Patent Application No. PA202170598, mailed on Jul. 11, 2023, 1 page.
Office Action received for Danish Patent Application No. 202270438, mailed on Jul. 10, 2023, 4 pages.
Office Action received for Japanese Patent Application No. 2022-573404, mailed on Jul. 3, 2023, 12 pages (6 pages of English Translation and 6 pages of Official Copy).
Advisory Action received for U.S. Appl. No. 17/900,734, mailed on Mar. 21, 2024, 5 pages.
Applicant-Initiated Interview Summary received for U.S. Appl. No. 17/375,767, mailed on Dec. 22, 2023, 2 pages.
Applicant-Initiated Interview Summary received for U.S. Appl. No. 17/900,734, mailed on Feb. 3, 2025, 4 pages.
Applicant-Initiated Interview Summary received for U.S. Appl. No. 17/900,734, mailed on Feb. 22, 2024, 3 pages.
Applicant-Initiated Interview Summary received for U.S. Appl. No. 17/951,818, mailed on Nov. 4, 2024, 5 pages.
Applicant-Initiated Interview Summary received for U.S. Appl. No. 18/595,238, mailed on Oct. 25, 2024, 2 pages.
Corrected Notice of Allowance received for U.S. Appl. No. 17/030,257, mailed on Nov. 24, 2023, 2 pages.

(56) References Cited

OTHER PUBLICATIONS

Corrected Notice of Allowance received for U.S. Appl. No. 18/128,775, mailed on Dec. 7, 2023, 2 pages.
Corrected Notice of Allowance received for U.S. Appl. No. 18/128,775, mailed on Jan. 8, 2024, 2 pages.
Corrected Notice of Allowance received for U.S. Appl. No. 18/128,775, mailed on Jun. 6, 2024.
Corrected Notice of Allowance received for U.S. Appl. No. 18/595,238, mailed on Dec. 10, 2024, 2 pages.
Decision to Grant received for European Patent Application No. 21731662.9, mailed on Sep. 12, 2024, 4 pages.
Extended European Search Report received for European Patent Application No. 23200887.0, mailed on Mar. 26, 2024, 9 pages.
Extended European Search Report received for European Patent Application No. 23214955.9, mailed on Feb. 22, 2024, 10 pages.
Final Office Action received for U.S. Appl. No. 17/900,734, mailed on Jan. 19, 2024, 11 pages.
Final Office Action received for U.S. Appl. No. 17/951,818, mailed on Jan. 27, 2025, 31 pages.
Intention to Grant received for European Patent Application No. 21731662.9, mailed on May 3, 2024, 9 pages.
Intention to Grant received for European Patent Application No. 23200887.0, mailed on Jan. 7, 2025, 8 pages.
Intention to Grant received for European Patent Application No. 23214955.9, mailed on Dec. 3, 2024, 8 pages.
International Preliminary Report on Patentability received for PCT Patent Application No. PCT/US2022/030567, mailed on Dec. 21, 2023, 18 pages.
International Preliminary Report on Patentability received for PCT Patent Application No. PCT/US2022/042978, mailed on Apr. 4, 2024, 12 pages.
International Preliminary Report on Patentability received for PCT Patent Application No. PCT/US2023/023766, mailed on Dec. 19, 2024, 15 pages.
International Search Report and Written Opinion received for PCT Patent Application No. PCT/US2023/023766, mailed on Nov. 7, 2023, 20 pages.
Invitation to Pay Additional Fees and Partial International Search Report received for PCT Patent Application No. PCT/US2023/023766, mailed on Sep. 14, 2023, 14 pages.
Invitation to Pay Search Fees received for European Patent Application No. 22723512.4, mailed on Nov. 11, 2024, 3 pages.
Khedekar et al., "Strength of QR Code over Design and Implementation of Authentication System", International Conference on Communication and Signal Processing, online available at: https://ieeexplore.ieee.org/document/7754571, Apr. 6-8, 2016, pp. 2190-2193.
Non-Final Office Action received for U.S. Appl. No. 17/375,767, mailed on Nov. 28, 2023, 16 pages.
Non-Final Office Action received for U.S. Appl. No. 17/900,734, mailed on Jan. 16, 2025, 7 pages.
Non-Final Office Action received for U.S. Appl. No. 17/951,818, mailed on Sep. 9, 2024, 30 pages.
Non-Final Office Action received for U.S. Appl. No. 18/375,932, mailed on Jan. 29, 2025, 39 pages.
Non-Final Office Action received for U.S. Appl. No. 18/595,238, mailed on Sep. 26, 2024, 8 pages.
Notice of Acceptance received for Australian Patent Application No. 2023200021, mailed on Jul. 22, 2024, 3 pages.
Notice of Allowance received for Chinese Patent Application No. 202310033917.0, mailed on Nov. 26, 2023, 2 pages (1 page of English Translation and 1 page of Official Copy).
Notice of Allowance received for Chinese Patent Application No. 202310865934.0, mailed on May 8, 2024, 2 pages (1 page of English Translation and 1 page of Official Copy).
Notice of Allowance received for Chinese Patent Application No. 202311323829.0, mailed on Nov. 29, 2024, 4 pages (1 page of English Translation and 3 pages of Official Copy).
Notice of Allowance received for Chinese Patent Application No. 202311569957.3, mailed on Sep. 2, 2024, 5 pages (1 page of English Translation and 4 pages of Official Copy).
Notice of Allowance received for Japanese Patent Application No. 2022-573404, mailed on Dec. 11, 2023, 4 pages (1 page of English Translation and 3 pages of Official Copy).
Notice of Allowance received for Japanese Patent Application No. 2023-168764, mailed on Jul. 26, 2024, 4 pages (1 page of English Translation and 3 pages of Official Copy).
Notice of Allowance received for Japanese Patent Application No. 2023-200980, mailed on Nov. 5, 2024, 4 pages (1 page of English Translation and 3 pages of Official Copy).
Notice of Allowance received for Japanese Patent Application No. 2023-528157, mailed on Feb. 5, 2024, 4 pages (1 page of English Translation and 3 pages of Official Copy).
Notice of Allowance received for Korean Patent Application No. 10-2021-0151108, mailed on May 26, 2024, 7 pages (2 pages of English Translation and 5 pages of Official Copy).
Notice of Allowance received for Korean Patent Application No. 10-2021-0182662, mailed on Jun. 2, 2024, 6 pages (2 pages of English Translation and 4 pages of Official Copy).
Notice of Allowance received for Korean Patent Application No. 10-2021-7037387, mailed on Jan. 31, 2024, 7 pages (2 pages of English Translation and 5 pages of Official Copy).
Notice of Allowance received for Korean Patent Application No. 10-2023-7010480, mailed on Nov. 29, 2023, 7 pages (2 pages of English Translation and 5 pages of Official Copy).
Notice of Allowance received for Korean Patent Application No. 10-2023-7033718, mailed on Apr. 18, 2024, 7 pages (2 pages of English Translation and 5 pages of Official Copy).
Notice of Allowance received for Korean Patent Application No. 10-2024-0100836, mailed on Oct. 14, 2024, 7 pages (2 pages of English Translation and 5 pages of Official Copy).
Notice of Allowance received for U.S. Appl. No. 17/375,767, mailed on Feb. 20, 2024, 6 pages.
Notice of Allowance received for U.S. Appl. No. 17/398,723, mailed on Jan. 30, 2024, 15 pages.
Notice of Allowance received for U.S. Appl. No. 18/128,775, mailed on Feb. 28, 2024, 11 pages.
Notice of Allowance received for U.S. Appl. No. 18/404,058, mailed on Oct. 9, 2024, 12 pages.
Notice of Allowance received for U.S. Appl. No. 18/595,238, mailed on Nov. 20, 2024, 9 pages.
Office Action received for Australian Patent Application No. 2023200021, mailed on Apr. 24, 2024, 4 pages.
Office Action received for Australian Patent Application No. 2023200021, mailed on Feb. 1, 2024, 4 pages.
Office Action received for Chinese Patent Application No. 202180005556.8, mailed on Feb. 8, 2024, 16 pages (9 pages of English Translation and 7 pages of Official Copy).
Office Action received for Chinese Patent Application No. 202310865934.0, mailed on Jan. 16, 2024, 12 pages (6 pages of English Translation and 6 pages of Official Copy).
Office Action received for Chinese Patent Application No. 202311323829.0, mailed on Sep. 5, 2024, 11 pages (6 pages of English Translation and 5 pages of Official Copy).
Office Action received for European Patent Application No. 22732745.9, mailed on Apr. 10, 2024, 7 pages.
Office Action received for European Patent Application No. 22785826.3, mailed on Aug. 1, 2024, 7 pages.
Office Action received for European Patent Application No. 22785826.3, mailed on Jan. 9, 2025, 9 pages.
Office Action received for European Patent Application No. 23165330.4, mailed on Mar. 18, 2024, 4 pages.
Office Action received for Indian Patent Application No. 202217048935, mailed on Oct. 29, 2024, 9 pages.
Office Action received for Japanese Patent Application No. 2023-168764, mailed on Feb. 5, 2024, 5 pages (2 pages of English Translation and 3 pages of Official Copy).
Office Action received for Japanese Patent Application No. 2023-168764, mailed on May 17, 2024, 6 pages (3 pages of English Translation and 3 pages of Official Copy).

(56) References Cited

OTHER PUBLICATIONS

Office Action received for Japanese Patent Application No. 2023-200980, mailed on Apr. 22, 2024, 8 pages (4 pages of English Translation and 4 pages of Official Copy).
Office Action received for Japanese Patent Application No. 2023-200980, mailed on Aug. 2, 2024, 8 pages (4 pages of English Translation and 4 pages of Official Copy).
Office Action received for Japanese Patent Application No. 2023-528157, mailed on Dec. 8, 2023, 4 pages (2 pages of English Translation and 2 pages of Official Copy).
Office Action received for Korean Patent Application No. 10-2023-7033718, mailed on Dec. 4, 2023, 5 pages (2 pages of English Translation and 3 pages of Official Copy).
Result of Consultation received for European Patent Application No. 21707473.1, mailed on Sep. 6, 2024, 3 pages.
Result of Consultation received for European Patent Application No. 22732745.9, mailed on Jan. 15, 2025, 13 pages.
Result of Consultation received for European Patent Application No. 22732745.9, mailed on Jan. 23, 2025, 4 pages.
Summons to Attend Oral Proceedings received for European Patent Application No. 21707473.1, mailed on Mar. 22, 2024, 9 pages.
Summons to Attend Oral Proceedings received for European Patent Application No. 22732745.9, mailed on Sep. 3, 2024, 11 pages.
Corrected Notice of Allowance received for U.S. Appl. No. 17/900,734, mailed on Mar. 10, 2025, 3 pages.
Corrected Notice of Allowance received for U.S. Appl. No. 17/900,734, mailed on Mar. 17, 2025, 2 pages.
Non-Final Office Action received for U.S. Appl. No. 17/949,042, mailed on Mar. 13, 2025, 12 pages.
Intention to Grant received for European Patent Application No. 22732745.9, mailed on Feb. 7, 2025, 14 pages.
Intention to Grant received for European Patent Application No. 23165330.4, mailed on Feb. 19, 2025, 8 pages.
Office Action received for European Patent Application No. 21707473.1, mailed on Feb. 11, 2025, 9 pages.
Office Action received for European Patent Application No. 22723512.4, mailed on Feb. 10, 2025, 9 pages.
Applicant-Initiated Interview Summary received for U.S. Appl. No. 17/951,818, mailed on Mar. 3, 2025, 5 pages.
Non-Final Office Action received for U.S. Appl. No. 17/971,407, mailed on Feb. 27, 2025, 9 pages.
Notice of Allowance received for U.S. Appl. No. 17/900,734, mailed on Feb. 26, 2025, 8 pages.
Emilio, Di Paolo M., "CES 2021: Wearable Device with Biometric Authentication", Available online at: https://www.eetimes.eu/ces-2021-wearable-device-with-biometric-authentication/—EE Times Europe, Jan. 11, 2021, 6 pages.

* cited by examiner

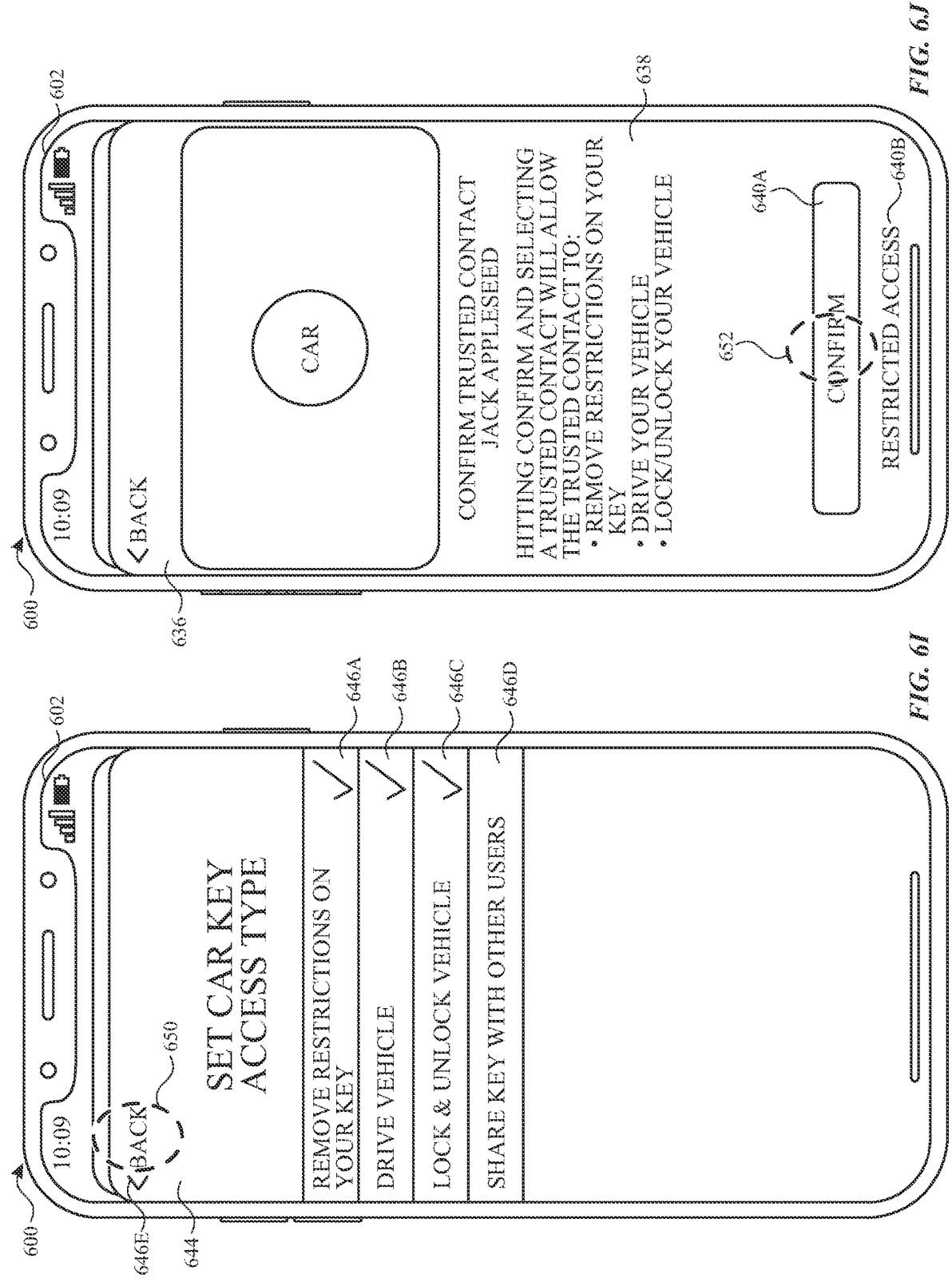

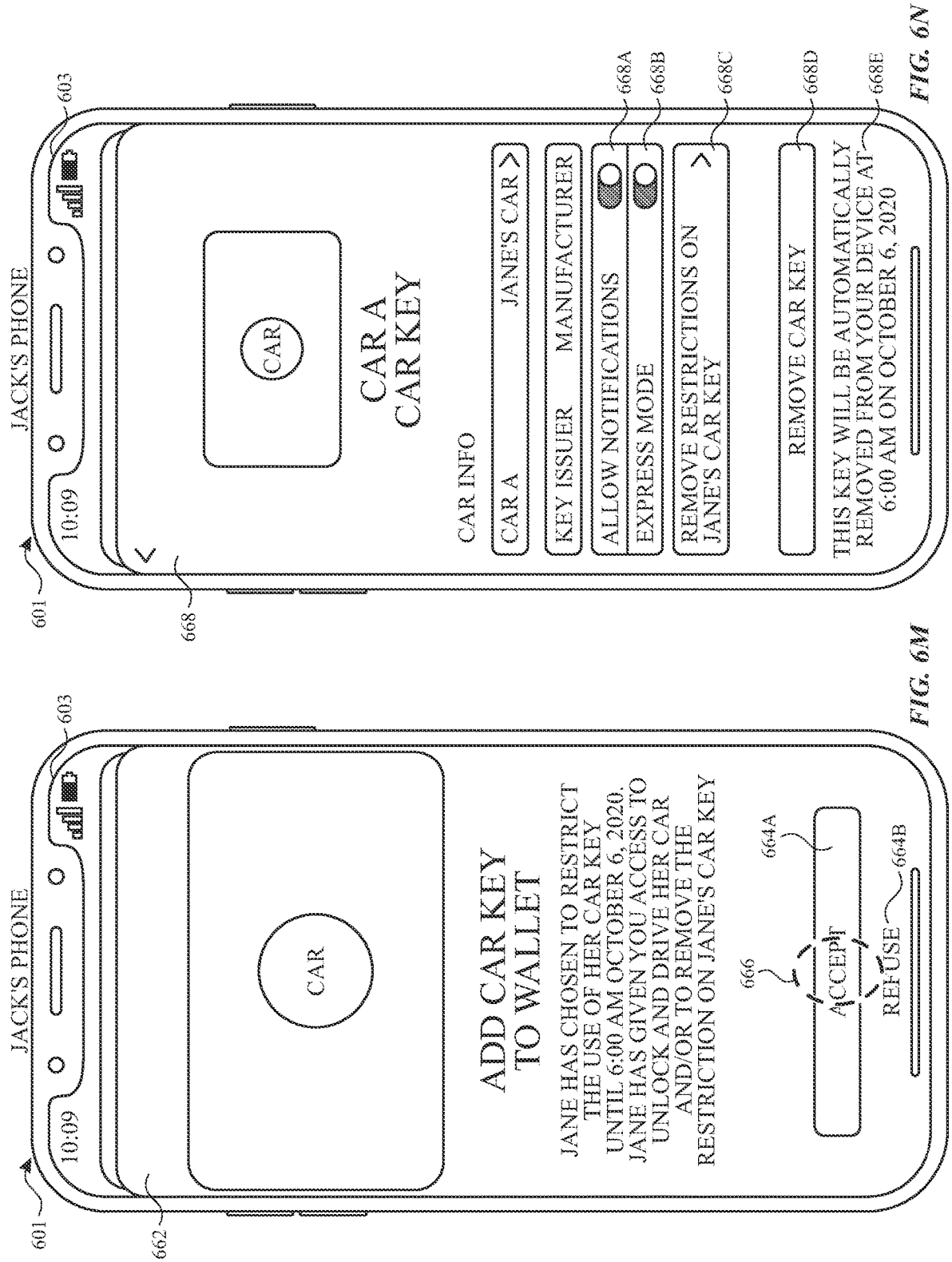

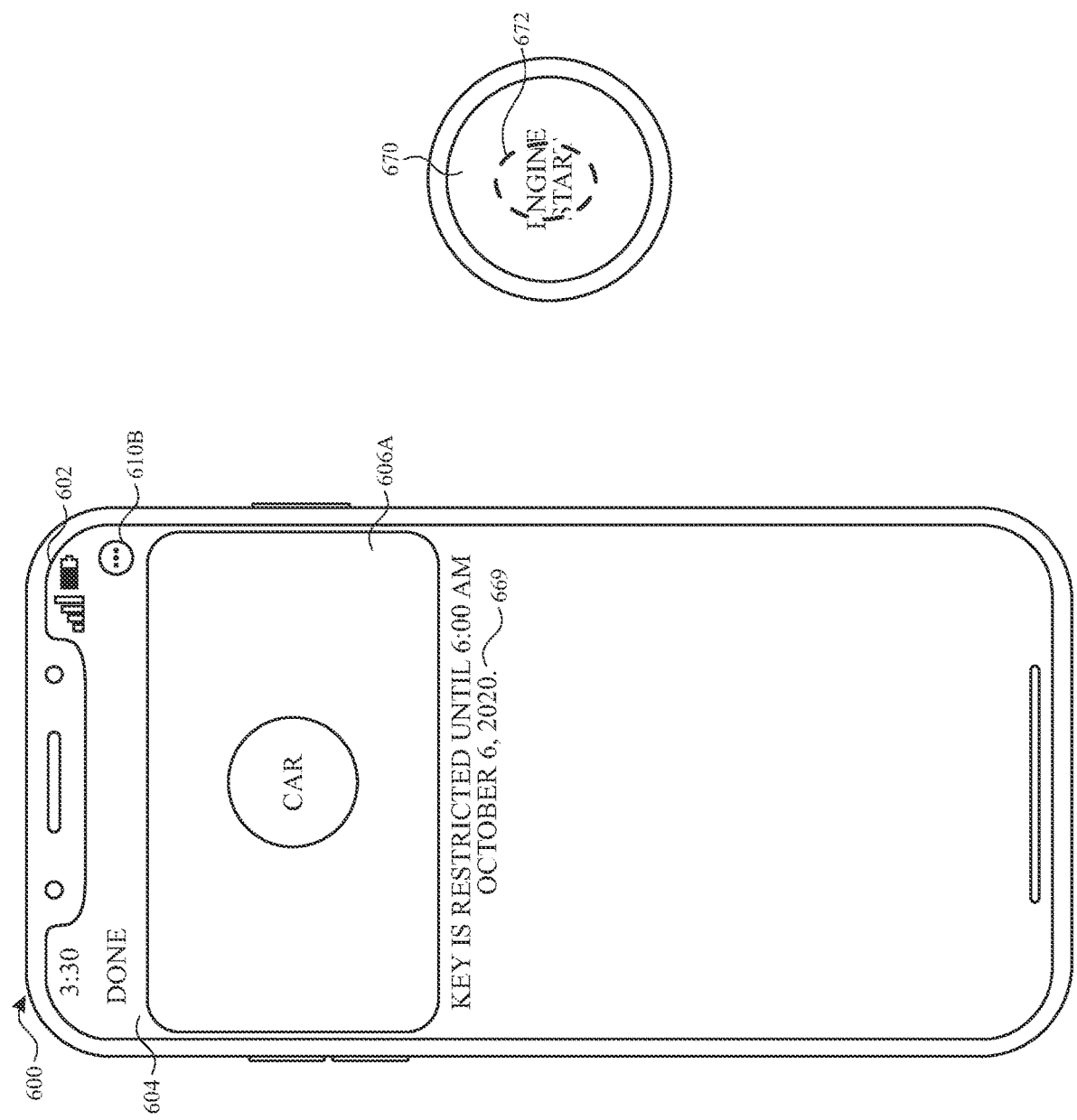

700

702
Display, via the display generation component, a user interface object corresponding to a first secure credential, wherein the first secure credential is configured to provide authorization to use one or more functions of a vehicle.

704
While displaying the user interface object corresponding to the first secure credential:

706
Detect a sequence of one or more user inputs corresponding to a request to restrict use of the first secure credential to authorize at least a first function of the one or more functions for a predetermined period of time.

708
In response to detecting the sequence of one or more user inputs:

710
Restrict use of the first secure credential to authorize the first function of the one or more functions.

712
The first function comprises driving the vehicle, and restricting use of the first secure credential to authorize the first function of the one or more functions comprises restricting use of the first secure credential to authorize driving of the vehicle.

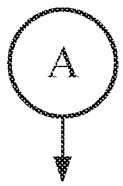

714
Detect a second sequence of one or more user inputs corresponding to selection of a contactable user from a plurality of contactable users, wherein selection of the contactable user enables the contactable user to restore use of the first secure credential to authorize the first function of the one or more functions.

716
Selection of the contactable user requests permission from the contactable user to restore use of the first secure credential to authorize the first function of the one or more functions from a remote location.

718
Selection of the contactable user requests permission from the contactable user to restore use of the first secure credential to authorize the first function of the one or more functions when proximity criteria are satisfied.

*FIG. 7B*

MOBILE KEY USER INTERFACES

CROSS-REFERENCE TO RELATED APPLICATION

This application claims priority to U.S. Provisional Patent Application Ser. No. 63/110,272, entitled "MOBILE KEY USER INTERFACES," filed on Nov. 5, 2020, the contents of which are hereby incorporated by reference in their entirety.

FIELD

The present disclosure relates generally to computer user interfaces, and more specifically to techniques for managing and using a mobile key (e.g., a form of secure credential).

BACKGROUND

As electronic devices such as smartphones have become more widely used, their functions have grown beyond phone calls and text messaging. Providing an efficient method for using and implementing the various functions on these electronic devices can be complex and time-consuming.

BRIEF SUMMARY

Some techniques for managing and using a mobile key using electronic devices are generally cumbersome and inefficient. For example, some existing techniques use a complex and time-consuming user interface, which may include multiple key presses or keystrokes. Some existing techniques do not provide users with options for restricting use of a mobile key. Existing techniques require more time than necessary, wasting user time and device energy. This latter consideration is particularly important in battery-operated devices.

Accordingly, the present technique provides electronic devices with faster, more efficient methods and interfaces for managing and using a mobile key. Such methods and interfaces optionally complement or replace other methods for managing and using a mobile key. Such methods and interfaces reduce the cognitive burden on a user and produce a more efficient human-machine interface. For battery-operated computing devices, such methods and interfaces conserve power and increase the time between battery charges.

In some embodiments, a method comprises: at a computer system that is in communication with a display generation component and one or more input devices: displaying, via the display generation component, a user interface object corresponding to a first secure credential, wherein the first secure credential is configured to provide authorization to use one or more functions of a vehicle; while displaying the user interface object corresponding to the first secure credential, detecting a sequence of one or more user inputs corresponding to a request to restrict use of the first secure credential to authorize at least a first function of the one or more functions for a predetermined period of time; and in response to detecting the sequence of one or more user inputs, restricting use of the first secure credential to authorize the first function of the one or more functions.

In some embodiments, a non-transitory computer-readable storage medium stores one or more programs configured to be executed by one or more processors of a computer system that is in communication with a display generation component and one or more input devices, and the one or more programs include instructions for: displaying, via the display generation component, a user interface object corresponding to a first secure credential, wherein the first secure credential is configured to provide authorization to use one or more functions of a vehicle; while displaying the user interface object corresponding to the first secure credential, detecting a sequence of one or more user inputs corresponding to a request to restrict use of the first secure credential to authorize at least a first function of the one or more functions for a predetermined period of time; and in response to detecting the sequence of one or more user inputs, restricting use of the first secure credential to authorize the first function of the one or more functions.

In some embodiments, a transitory computer-readable storage medium stores one or more programs configured to be executed by one or more processors of a computer system that is in communication with a display generation component and one or more input devices, and the one or more programs include instructions for: displaying, via the display generation component, a user interface object corresponding to a first secure credential, wherein the first secure credential is configured to provide authorization to use one or more functions of a vehicle; while displaying the user interface object corresponding to the first secure credential, detecting a sequence of one or more user inputs corresponding to a request to restrict use of the first secure credential to authorize at least a first function of the one or more functions for a predetermined period of time; and in response to detecting the sequence of one or more user inputs, restricting use of the first secure credential to authorize the first function of the one or more functions.

In some embodiments, a computer system comprises a display generation component; one or more inputs devices; one or more processors; and memory storing one or more programs configured to be executed by the one or more processors, the one or more programs including instructions for: displaying, via the display generation component, a user interface object corresponding to a first secure credential, wherein the first secure credential is configured to provide authorization to use one or more functions of a vehicle; while displaying the user interface object corresponding to the first secure credential, detecting a sequence of one or more user inputs corresponding to a request to restrict use of the first secure credential to authorize at least a first function of the one or more functions for a predetermined period of time; and in response to detecting the sequence of one or more user inputs, restricting use of the first secure credential to authorize the first function of the one or more functions.

In some embodiments, a computer system comprises a display generation component; one or more inputs devices; means for displaying, via the display generation component, a user interface object corresponding to a first secure credential, wherein the first secure credential is configured to provide authorization to use one or more functions of a vehicle; means for, while displaying the user interface object corresponding to the first secure credential, detecting a sequence of one or more user inputs corresponding to a request to restrict use of the first secure credential to authorize at least a first function of the one or more functions for a predetermined period of time; and means for, in response to detecting the sequence of one or more user inputs, restricting use of the first secure credential to authorize the first function of the one or more functions.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing and using a mobile key, thereby increasing the effectiveness, efficiency, and user satisfaction with such devices. Such methods and interfaces may complement or replace other methods for managing and using a mobile key.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7B are a flow diagram illustrating an exemplary process for managing and using a secure credential, in accordance with some embodiments.

DESCRIPTION OF EMBODIMENTS

Figure 1A:
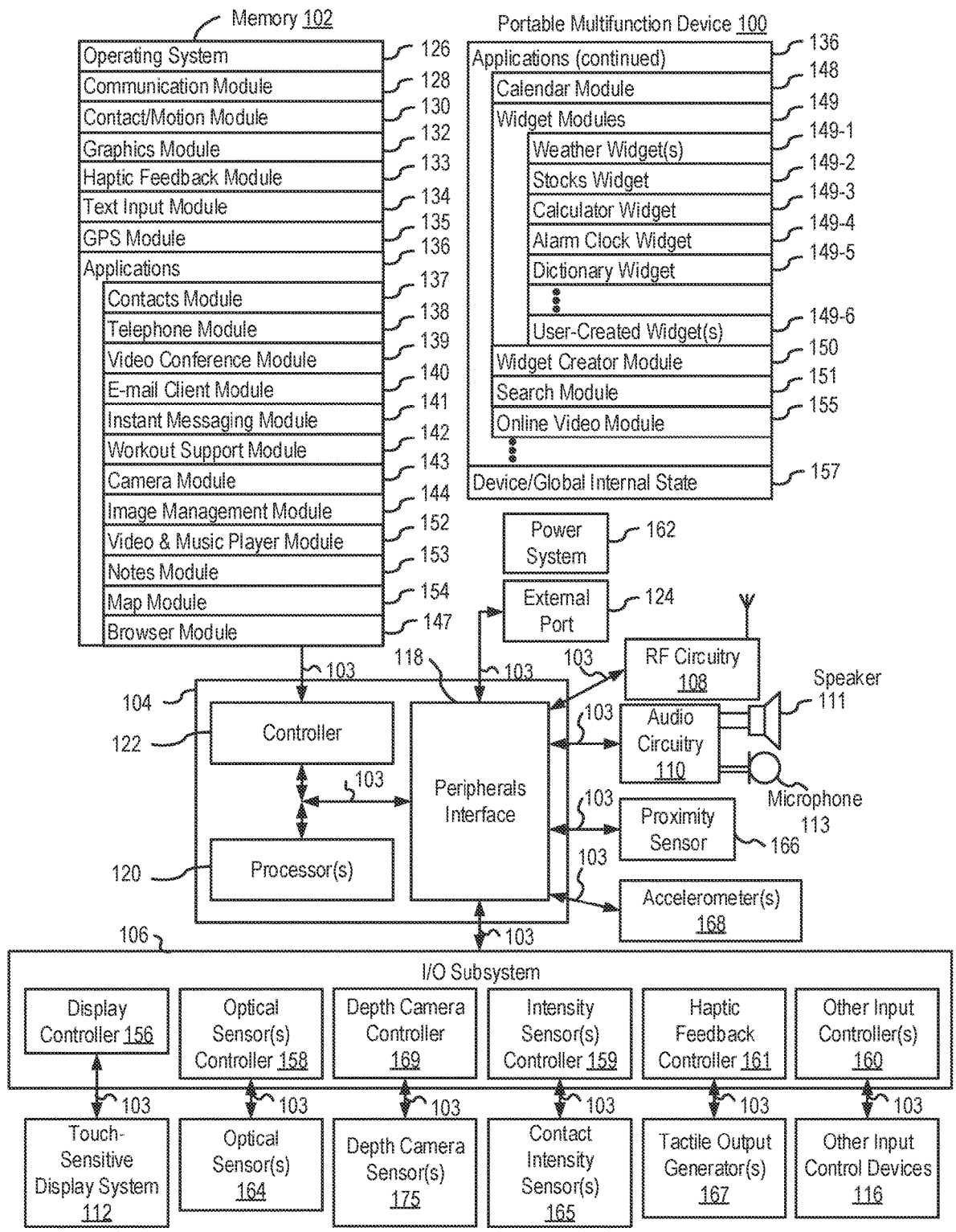
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing and using a mobile key. For example, a user would benefit from being able to quickly and easily restrict use of a secure credential on a first electronic device. A user would also benefit from being able to quickly enroll and/or authorize a second secure credential on a second device. Such techniques can reduce the cognitive burden on a user who uses a mobile key, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing and using a mobile key. FIGS. 6A-6X illustrate exemplary user interfaces for managing and using a secure credential. FIGS. 7A-7B are a flow diagram illustrating methods of managing and using a secure credential in accordance with some embodiments. The user interfaces in FIGS. 6A-6X are used to illustrate the processes described below, including the processes in FIGS. 7A-7B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
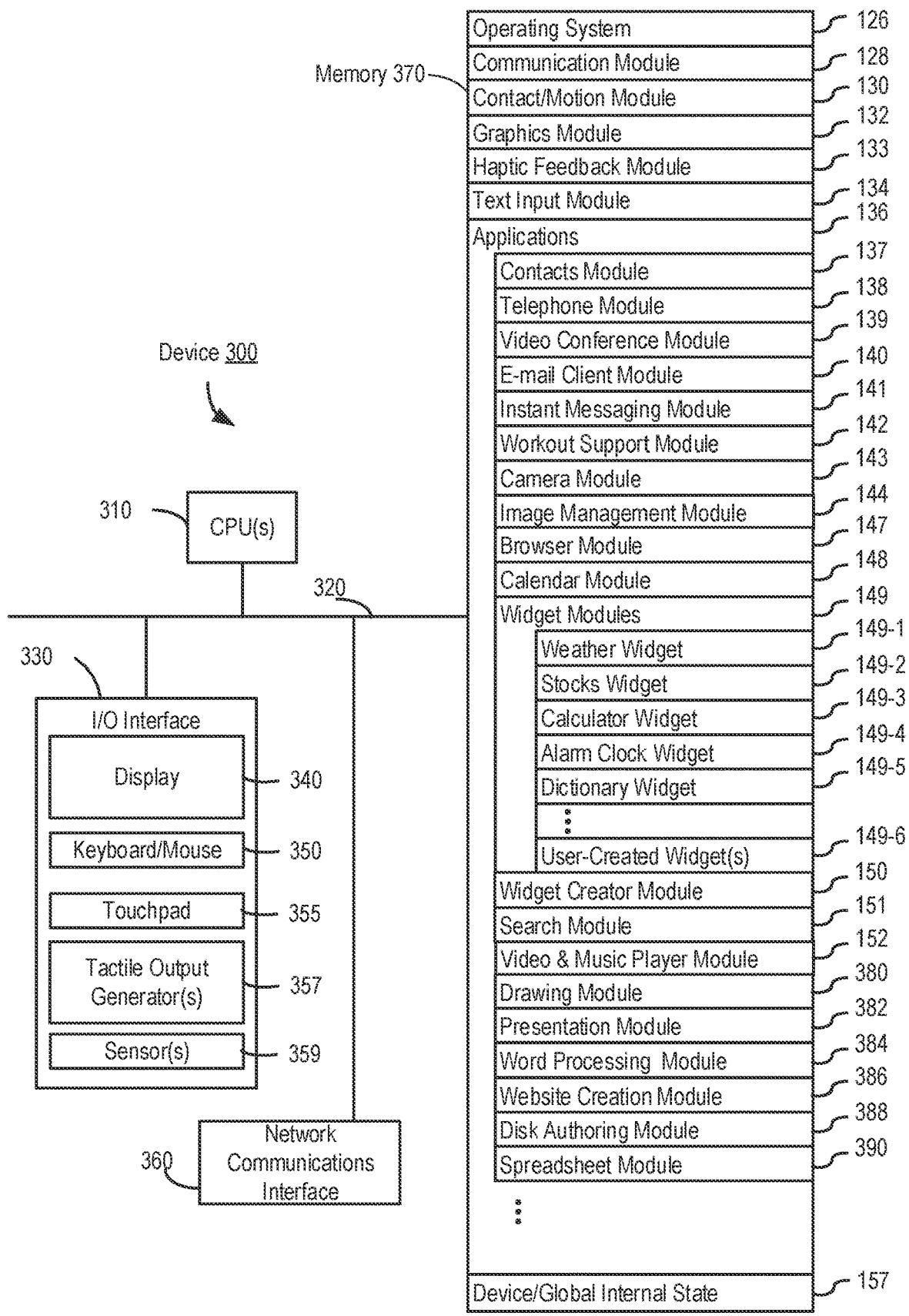
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
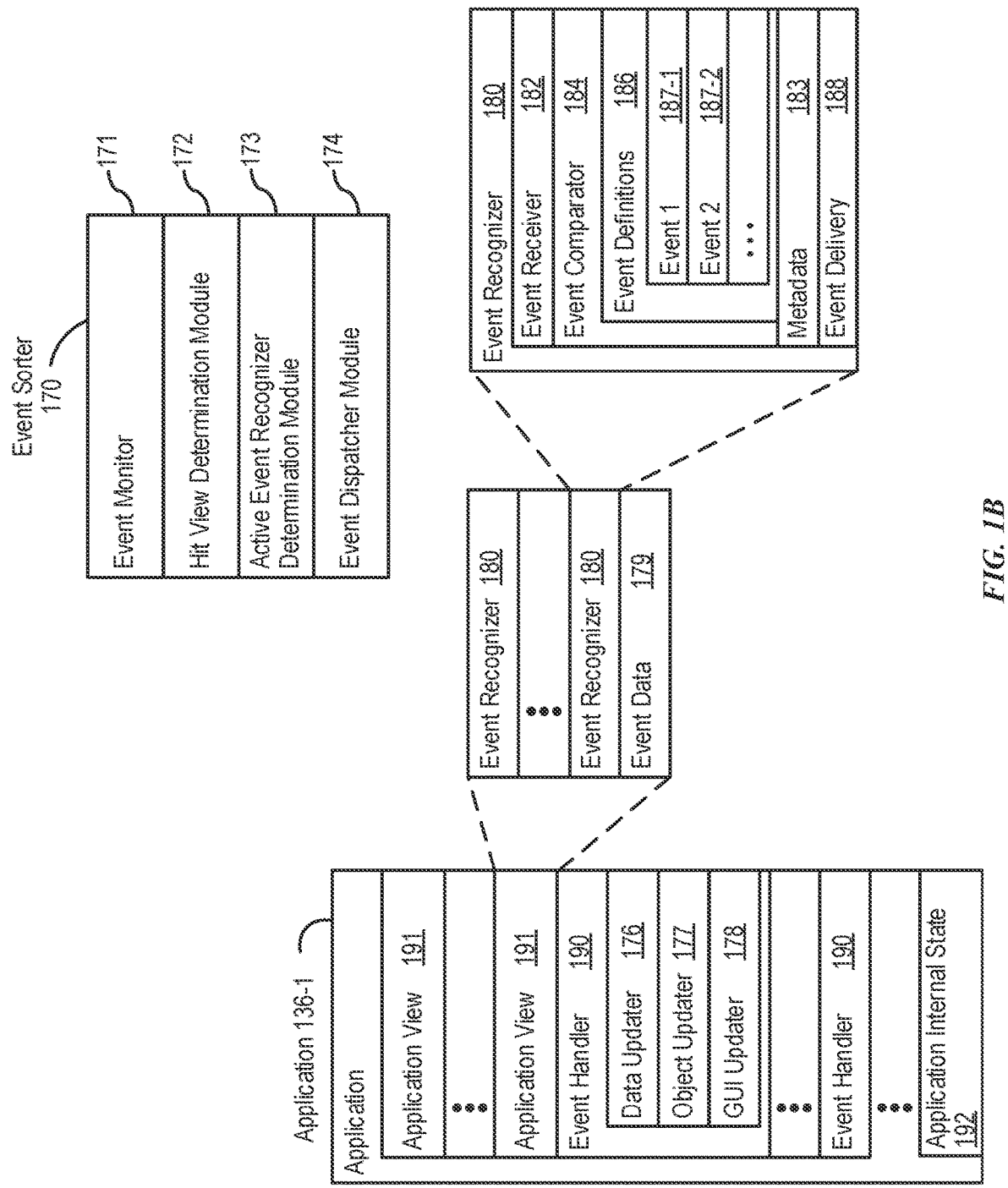
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
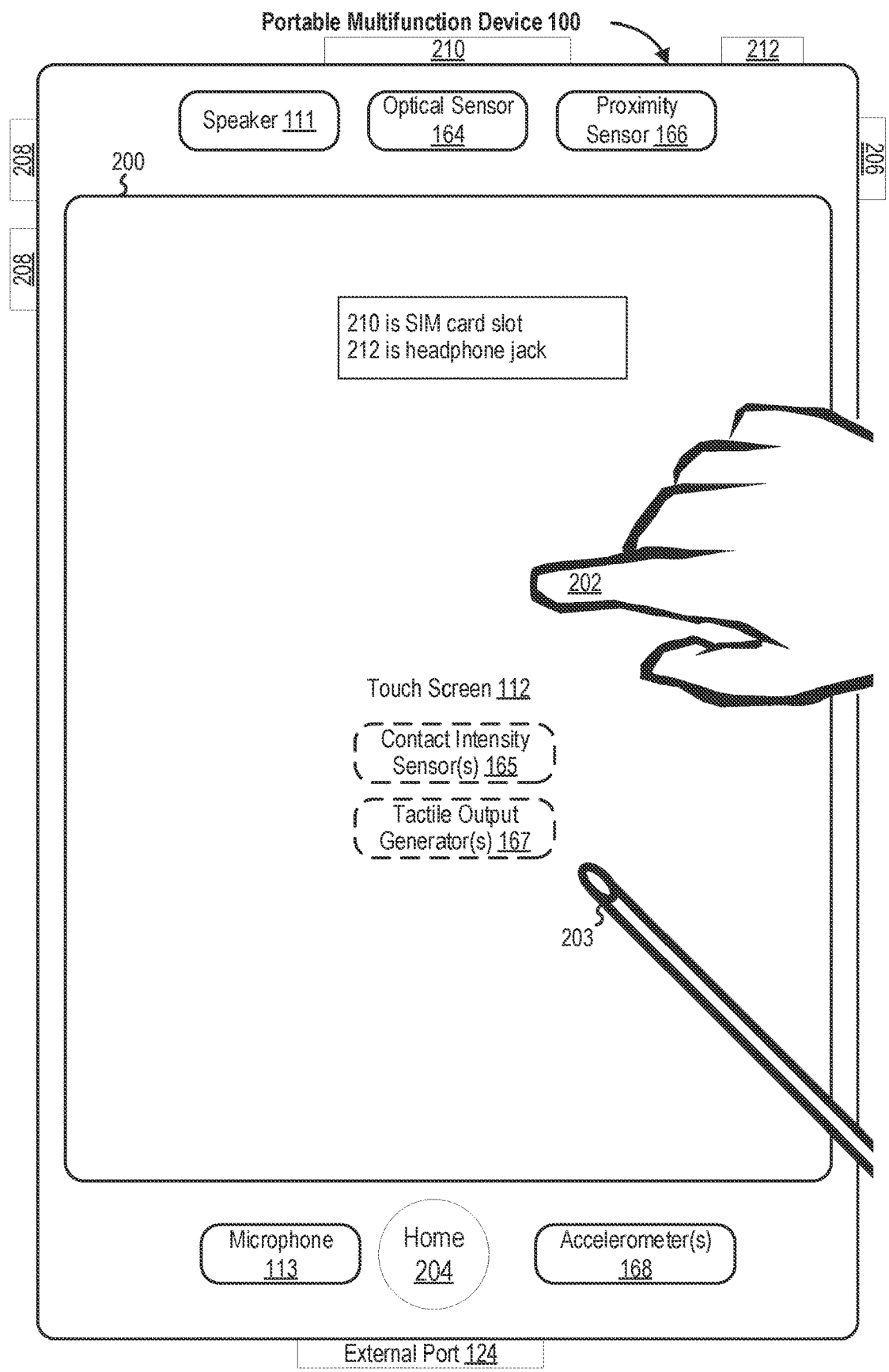
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
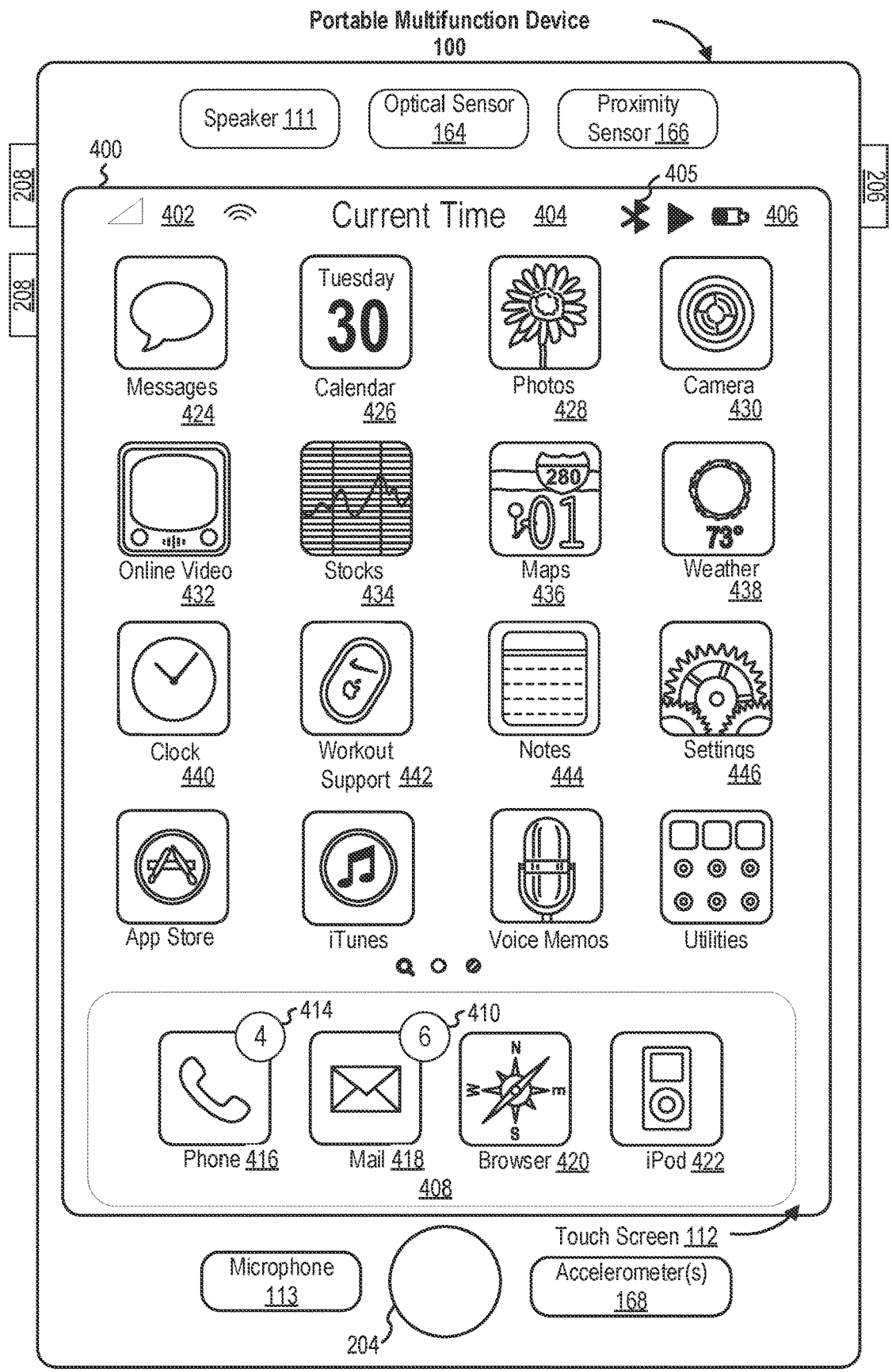
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
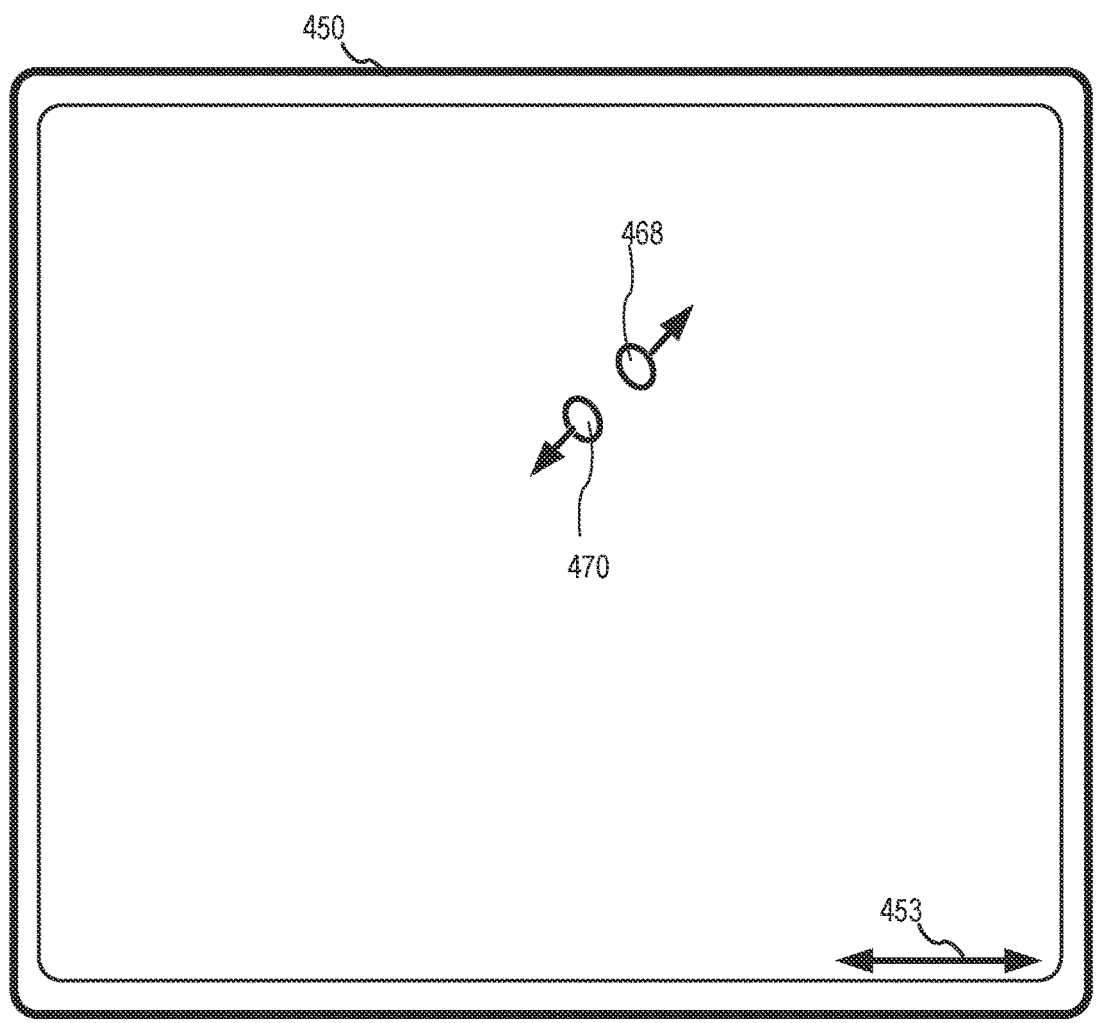
FIG. 4B illustrates an exemplary user interface for a multifunction device with a touch-sensitive surface that is separate from the display in accordance with some embodiments.
Figure 4B:
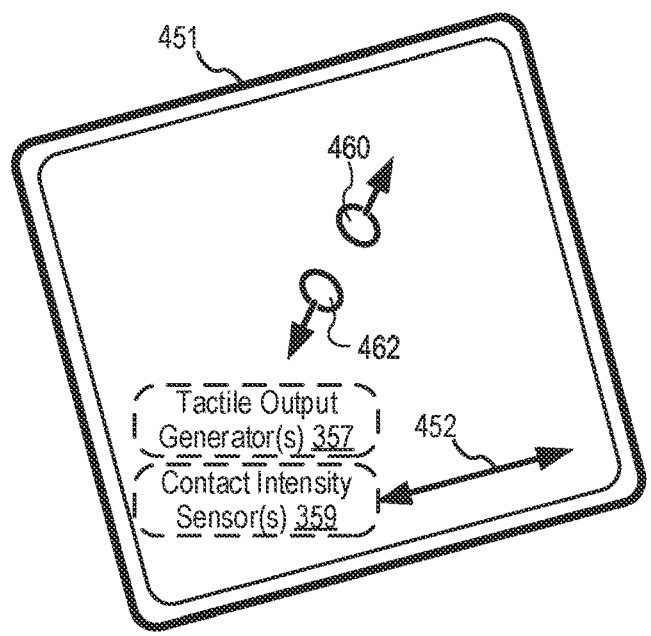

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
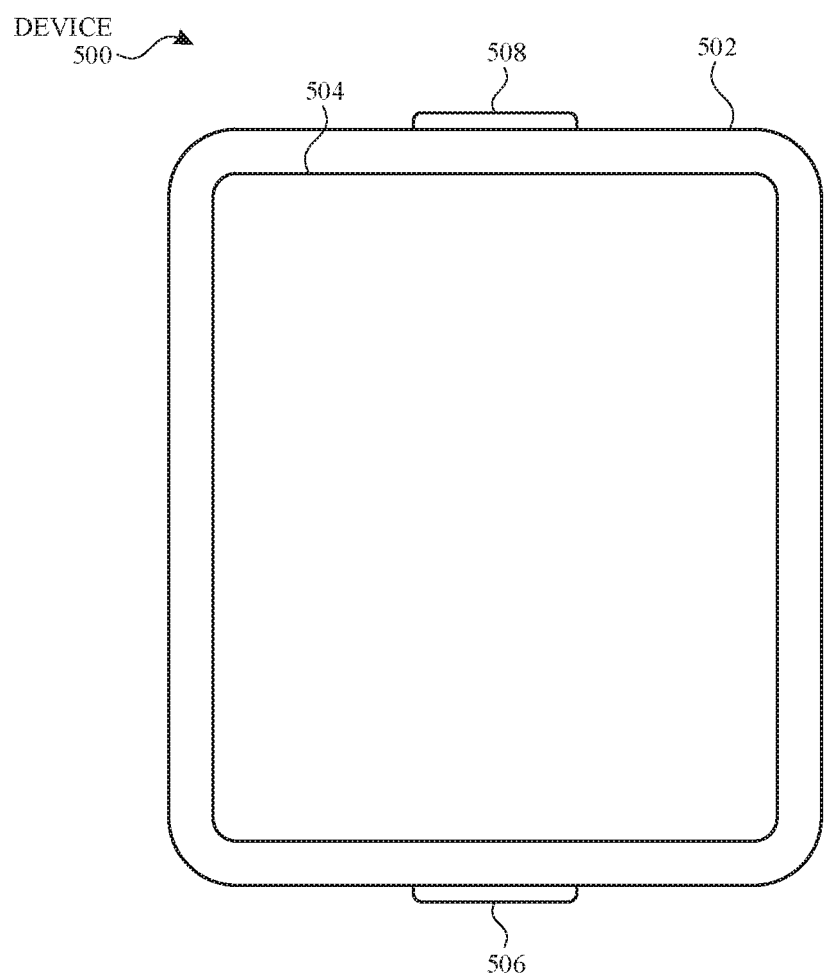
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
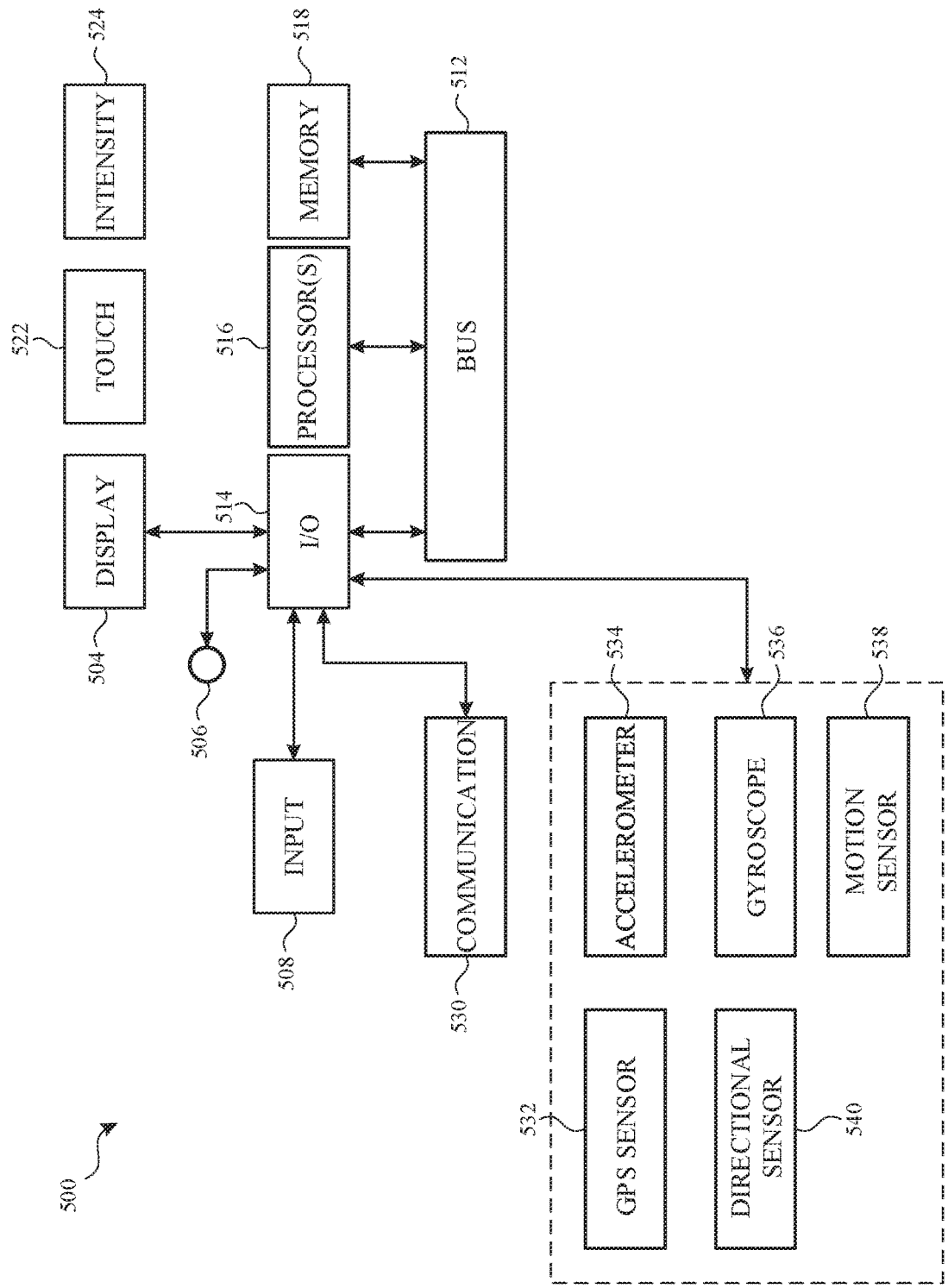
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIGS. 7A-7B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6X illustrate exemplary user interfaces for managing and using a secure credential (e.g., a mobile key), in accordance with some embodiments. The user interfaces in these figures are used to illustrate the processes described below, including the processes in FIGS. 7A-7B.

FIG. 6A depicts electronic device 600, which is a smartphone with a display 602. Display 602 of electronic device 600 includes a touch-sensitive surface on which electronic device 600 can detect user gestures (e.g., tap, swipe, and/or drag). In some embodiments, electronic device 600 includes one or more features of electronic device 100, 300, and/or 500.

In FIG. 6A, electronic device 600 displays a user interface 604 of a wallet application. User interface 604 includes representations 606A-606F. Representations 606A-606F represent one or more credentials (e.g., secure credentials) that have been enrolled on (e.g., added to) electronic device 600. In some embodiments, enrolling a secure credential on (e.g., adding a secure credential to) electronic device 600 results in the secure credential being stored on a secure element of electronic device 600.

In the depicted example, representation 606A is a representation of a first secure credential that is enrolled on electronic device 600, and is configured to provide authorization for one or more functions of a vehicle (e.g., unlocking the vehicle, locking the vehicle, driving the vehicle (e.g., starting the engine of the vehicle)); in some embodiments, the secure credential represented by representation 606A is referred to as a mobile key, as it provides access to one or more functions of a vehicle in a manner analogous to a physical key. For example, enrollment of the first secure credential on electronic device 600 enables electronic device 600 to provide authorization for the one or more functions of the vehicle. Representations 606B-606F are representations of other secure credentials that are enrolled on electronic device 600, but do not provide authorization to use one or more functions of the vehicle. For example, representation 606B is a representation of a secure credential corresponding to a payment account. As another example, representation 606C is a representation of a secure credential corresponding to a non-payment account. In particular, representation 606C is configured to provide authorization to access a restricted physical area (e.g., an airport boarding area).

At FIG. 6A, while displaying user interface 604, electronic device 600 detects input 608 (e.g., a tap) at a location corresponding to representation 606A.

Figure 6B:
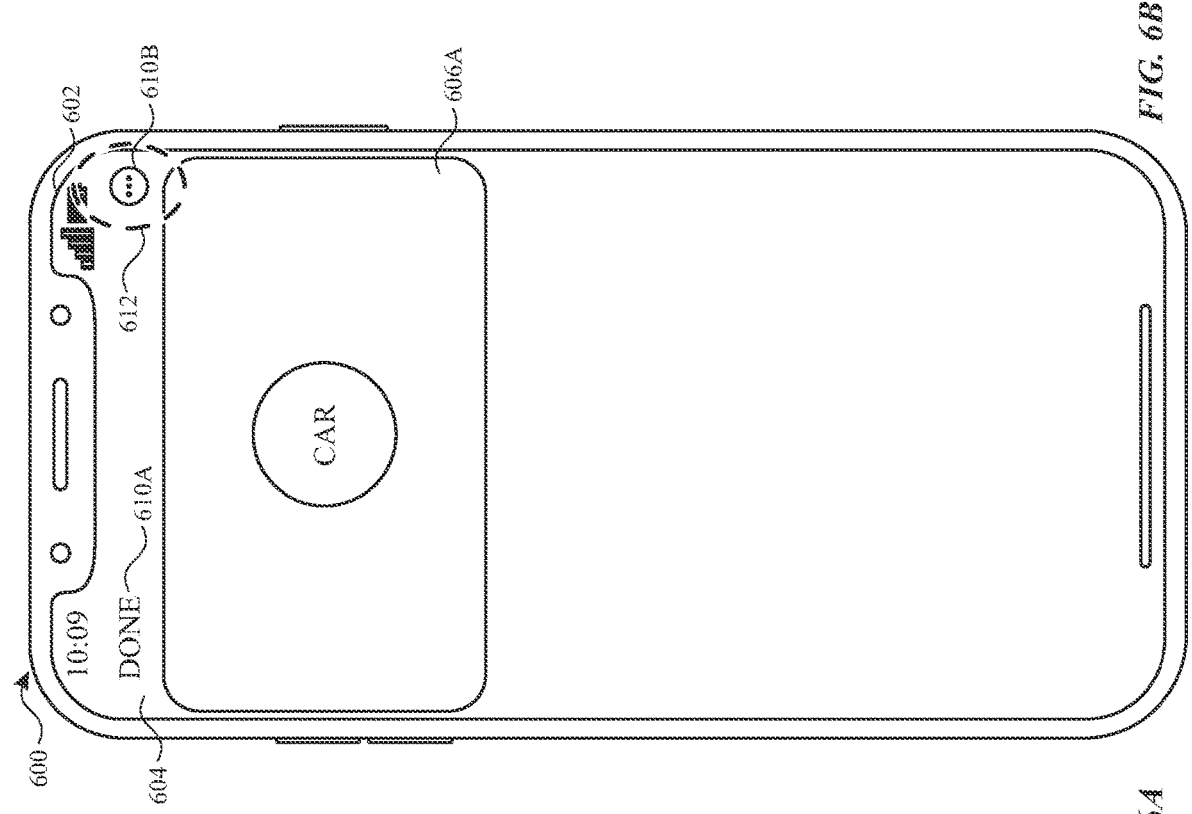
FIGS. 6A-6X illustrate exemplary user interfaces for managing and using a secure credential, in accordance with some embodiments.
Figure 6A:
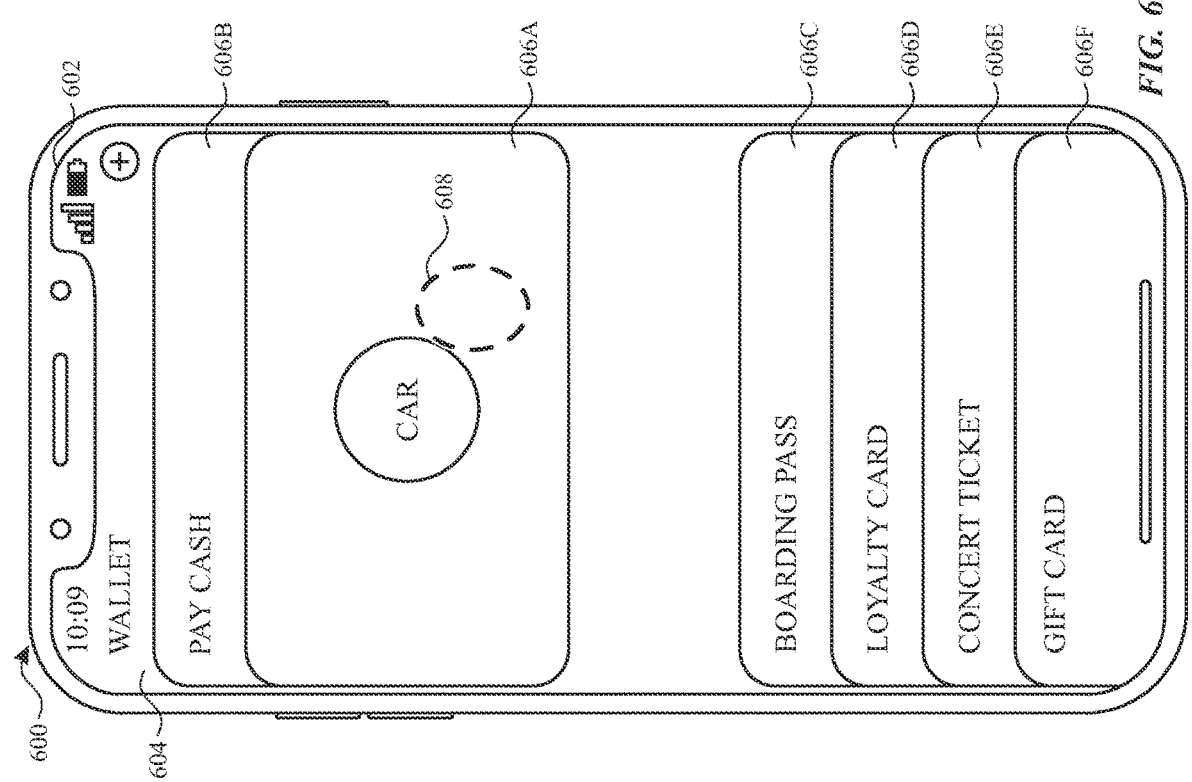
Figure 6D:
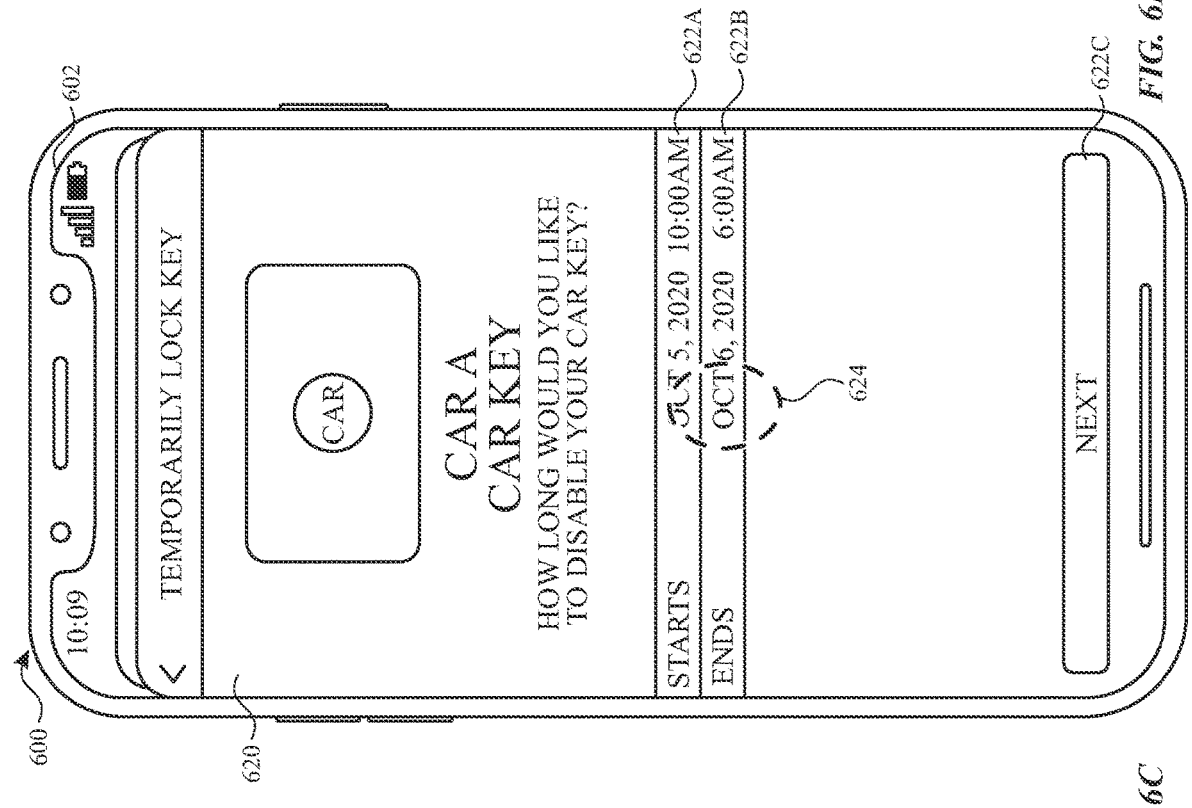

At FIG. 6B, in response to detecting input 608, electronic device 600 updates user interface 604 by maintaining display of representation 606A while ceasing to display representations 606B-606F. In some embodiments, interface 604 is also updated to include further information and/or functions specific to representation 606A. In FIG. 6B, user interface 604 includes an option 610A that is selectable to return to user interface 604 as depicted in FIG. 6A, and an option 610B that is selectable to open a settings user interface.

At FIG. 6B, while displaying user interface 604, electronic device 600 detects input 612 (e.g., a tap) at a location corresponding to option 610B.

Figure 6C:
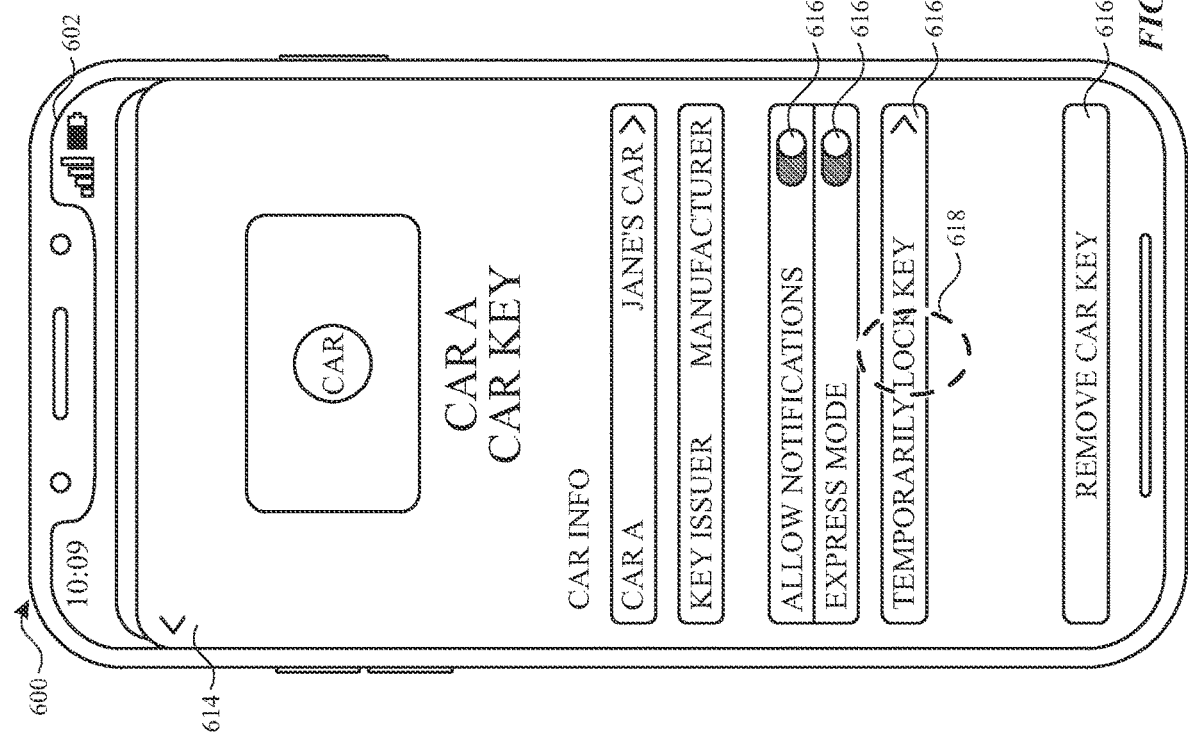
Figure 6F:
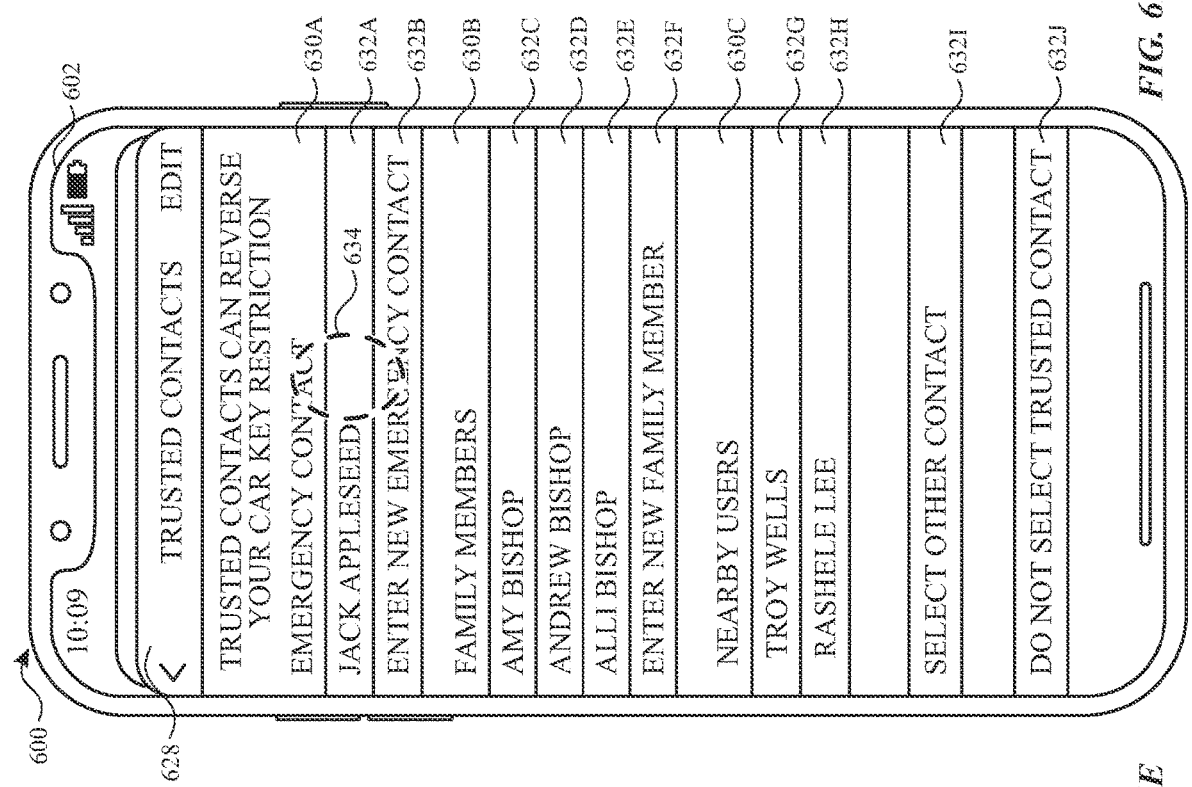

At FIG. 6C, in response to detecting input 612, electronic device 600 replaces display of user interface 604 with settings user interface 614. Settings user interface 614 presents one or more settings options for the secure credential associated with representation 606A. Settings user interface 614 includes an option 616A that can be turned on or off to enable or disable notifications pertaining to the secure credential. Settings user interface 614 also includes an option 616B that can be turned on or off to activate or deactivate an express mode for the secure credential. In some embodiments, when express mode is deactivated, electronic device 600 requires successful user authentication (e.g., biometric authentication, passcode authentication) as a condition for providing authorization to use one or more functions of the vehicle using the secure credential. Conversely, when express mode is activated, electronic device 600 provides authorization, via the secure credential, to use one or more functions of the vehicle without requiring successful user authentication. Settings user interface 614 includes a third option 616C that is selectable to initiate a process for unenrolling (e.g., removing) the secure credential from electronic device 600. Settings user interface 614 includes a fourth option 616D that is selectable by a user to initiate a process for implementing a temporary restriction on the secure credential. The temporary restriction on the secure credential temporarily renders the secure credential inoperable to authorize at least a subset of the one or more functions of the vehicle that the secure credential would otherwise be configured to authorize. For example, a temporary restriction of the secure credential can temporarily render the secure credential inoperable to authorize starting of the engine of the vehicle or otherwise driving the vehicle. In some embodiments, temporary restriction of the secure credential can restrict certain operations of the secure credential (e.g., restrict the secure credential from authorizing certain functions of the vehicle) while permitting other operations (e.g., permit the secure credential to authorize certain other functions of the vehicle). For example, temporarily restricting the secure credential can prohibit the secure credential from authorizing driving of the vehicle (e.g., prohibit the secure credential from authorizing starting of the vehicle's engine), but can still allow the secure credential to authorize turning on an electrical system or heating system or cooling system of the vehicle, locking or unlocking of the vehicle, opening the trunk of the vehicle, and so forth.

At FIG. 6C, while displaying settings user interface 614, electronic device 600 detects input 618 (e.g., a tap) at a location corresponding to option 616D.

At FIG. 6D, in response to detecting input 618, electronic device 600 replaces display of settings user interface 614 with time selection user interface 620. Time selection user interface 620 allows a user to provide one or more inputs to define a predefined period of time during which the secure credential will be restricted. In the depicted embodiments, time selection user interface 620 allows a user to provide one or more inputs to define a start time (option 622A) and an end time (option 622B) for a temporary restriction of the secure credential. Time selection user interface 620 also includes an option 622C that can be selected by a user to indicate that the user has completed entering time constraints (e.g., a start time and an end time) for the temporary restriction of the secure credential. In some embodiments, device 600 pre-populates a recommended time period during which the secure credential will be restricted.

At FIG. 6D, while displaying time selection user interface 620, electronic device 600 detects input 624 (e.g., a tap) at a location corresponding to option 622B.

Figure 6E:
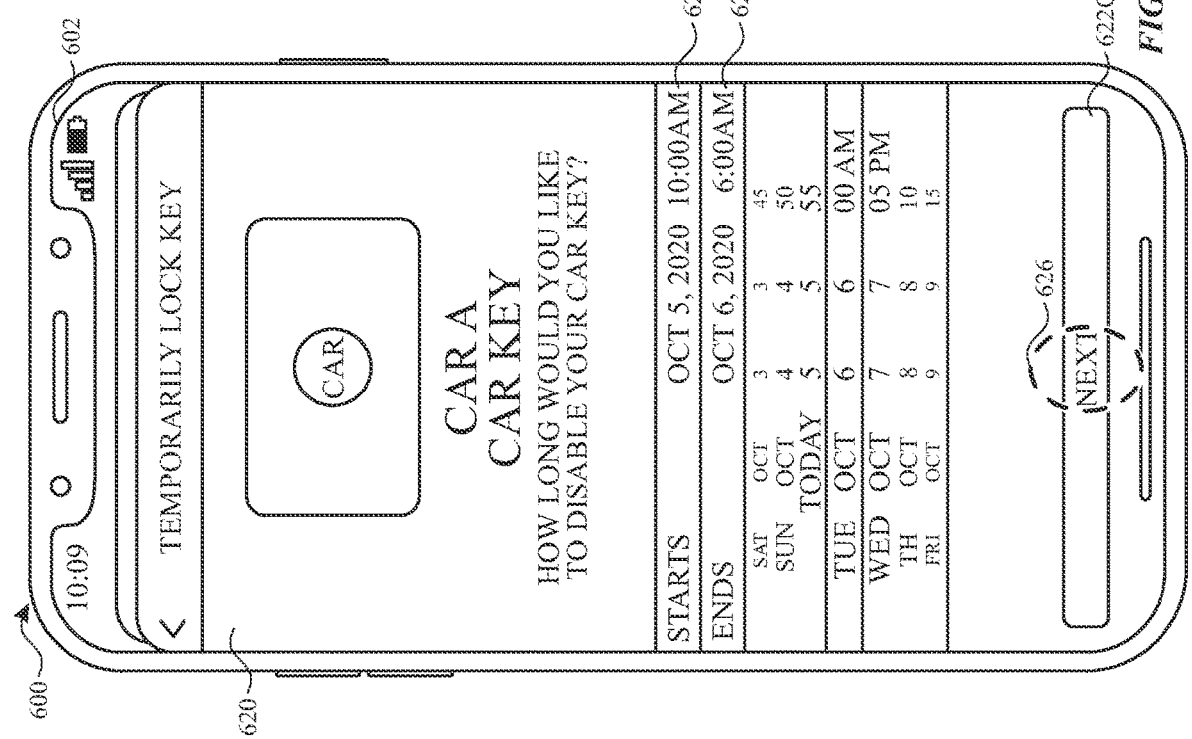
Figure 6H:
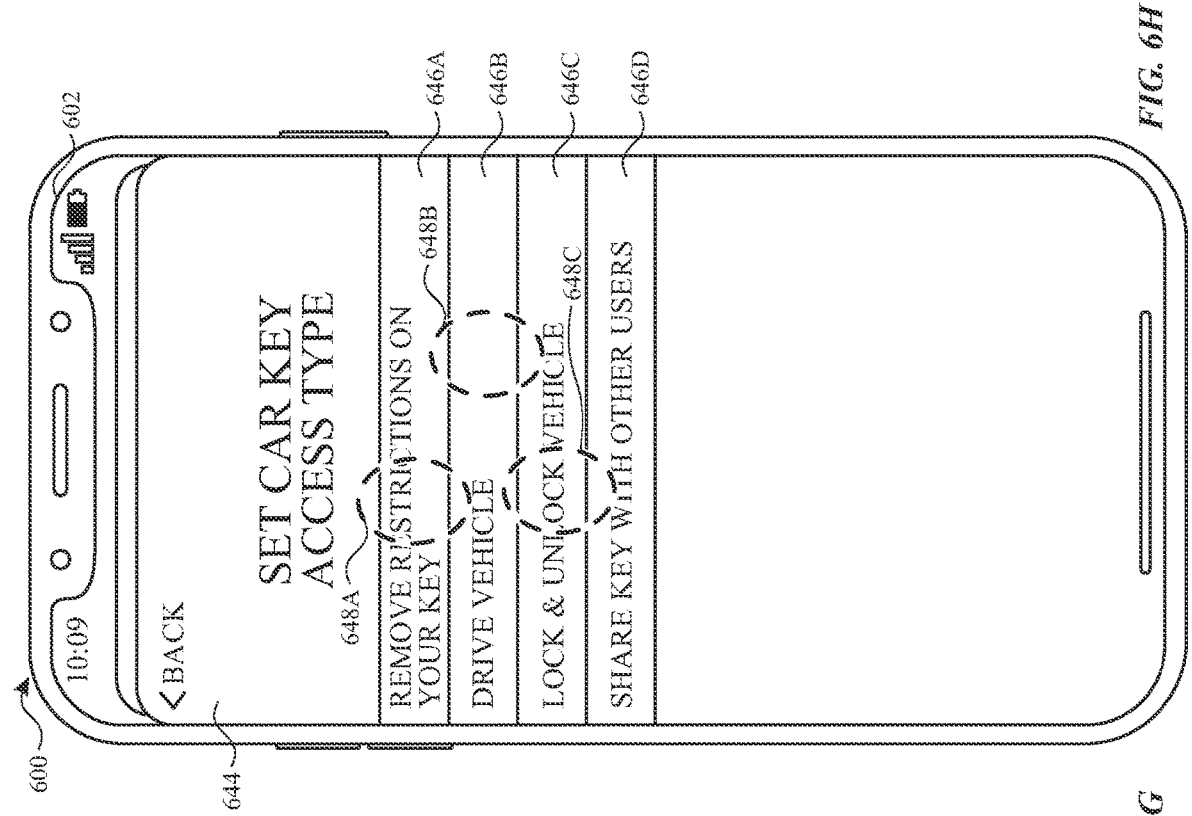

At FIG. 6E, in response to detecting input 624, electronic device 600 updates time selection user interface 620 to expand option 622B so that a user can provide one or more user inputs to define an end time for the temporary restriction of the secure credential.

At FIG. 6E, while displaying time selection user interface 620, electronic device 600 detects input 626 (e.g., a tap) at a location corresponding to option 622C.

At FIG. 6F, in response to detecting input 626, electronic device 600 replaces display of time selection user interface 620 with trusted contacts selection user interface 628. Trusted contacts selection user interface 628 displays one or more selectable options that can be selected by a user to identify a trusted contact (e.g., a contactable user). In certain embodiments, a trusted contact selected by the user is notified that the user has implemented a temporary restriction on the secure credential that is enrolled on electronic device 600. In certain embodiments, a trusted contact that is selected by the user is provided with the ability to remove the temporary restriction on the secure credential prior to the end time defined by the user. For example, in some embodiments, the user is prohibited from removing the temporary restriction of the secure credential prior to the end time defined by the user unless a request to do so is approved by the trusted contact. In some embodiments, a trusted contact that is selected by the user is notified if the user attempts to remove the temporary restriction on the secure credential prior to the predefined time for the temporary restriction elapsing.

In FIG. 6F, trusted contacts selection user interface 628 includes an emergency contact section 630A that includes an option 632A that corresponds to a previously-identified emergency contact "JACK APPLESEED." In certain embodiments, contacts listed in the emergency contact section 630A have been previously identified by the user as an emergency contact for the user. For example, in some embodiments, a contact identified as an emergency contact is automatically notified if electronic device 600 receives an indication that the user is in an emergency situation (e.g., based on one or more inputs received at the electronic device 600). In certain embodiments, emergency contact(s) can be identified in a separate application (e.g., separate from a wallet application and/or a vehicle application), such as a health application. The emergency contact section 630A also includes an option 632B that can be selected to initiate a process for identifying and/or adding a new emergency contact.

Trusted contacts selection user interface 628 also includes a family members section 630B that includes options 632B-632E that correspond to family members of the user. In certain embodiments, contacts listed in the family members section 630B have been previously identified by the user as family members of the user. For example, in some embodiments, family members may be identified based on sharing a family account that allows family members in the family account to share content, share payment instruments, and/or allow one or more family members to control various settings for other family members (e.g., for parents to control one or more parental controls for their children). The family members section 630B also includes an option 632F that can be selected to initiate a process for identifying and/or adding a new family member.

Trusted contacts selection user interface 628 also includes a nearby users section 630C that includes options 632G and 632H. In the depicted embodiment, options 632G and 632H correspond to one or more contacts of the user (e.g., one or more contacts that are stored in an address book on electronic device 600) that satisfy one or more proximity criteria relative to electronic device 600 (e.g., based on signal strength between electronic device 600 and an electronic device associated with the contact, based on location information associated with the electronic device 600 and an electronic device associated with the contact, and/or other proximity indications).

Trusted contacts selection user interface 628 also includes option 632I that is selectable to select a different contact as a trusted contact (e.g., to open an address book from which the user can select a different contact), and an option 632J that is selectable to forgo selecting a trusted contact.

At FIG. 6F, while displaying trusted contacts selection user interface 628, electronic device 600 detects input 634 (e.g., a tap) at a location corresponding to option 632A.

Figure 6G:
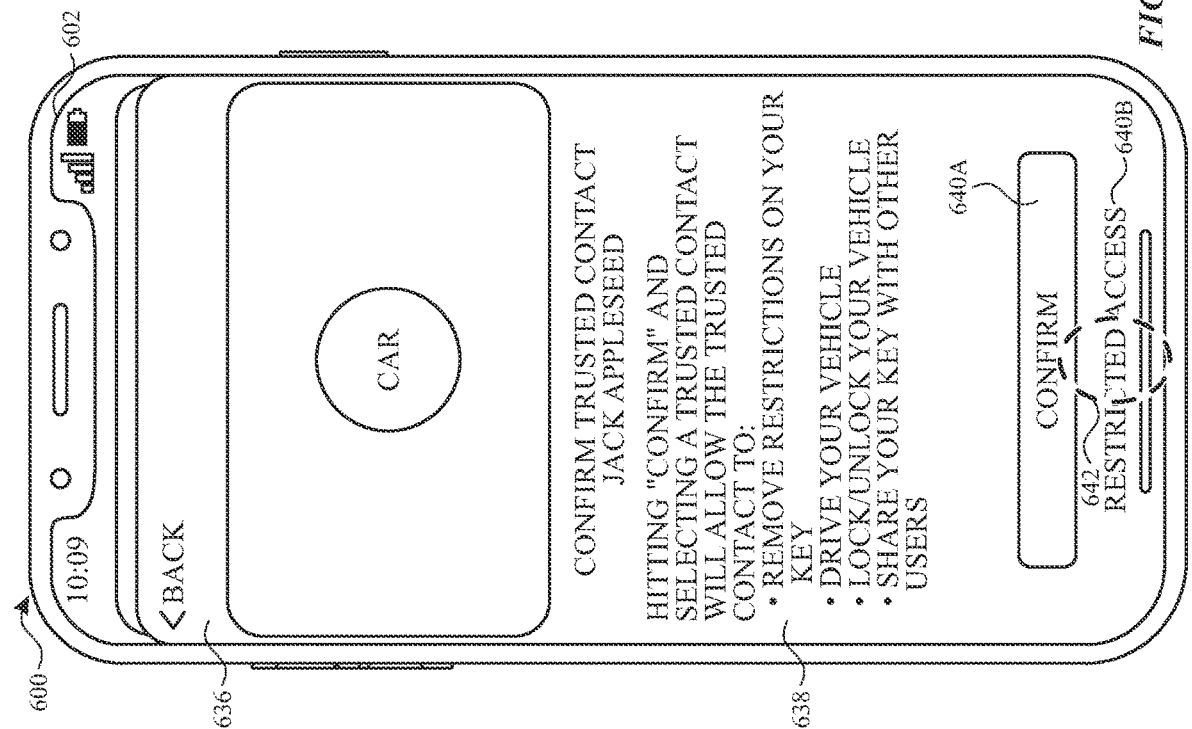

At FIG. 6G, in response to detecting input 634, electronic device 600 replaces display of trusted contacts selection user interface 628 with confirmation user interface 636. Confirmation user interface 636 includes a visual indication 638 indicating that selection of a trusted contact will authorize the trusted contact to perform various functions, including removing temporary restrictions on the secure credential, driving the vehicle, locking/unlocking the vehicle, and sharing a secure credential for the vehicle with other users. Confirmation user interface 636 includes an option 640A that is selectable to confirm that the user would like to authorize the trusted contact to perform the identified functions. Confirmation user interface 636 also includes an option 640B that is selectable to define restricted access for the trusted contact such that the trusted contact is authorized to perform only a subset of the identified functions.

At FIG. 6G, while displaying confirmation user interface 636, electronic device 600 detects input 642 (e.g., a tap) at a location corresponding to option 640B.

At FIG. 6H, in response to detecting input 642, electronic device 600 replaces display of confirmation user interface 636 with restricted access user interface 644. Restricted access user interface 644 includes options 646A-646D that are selectable by a user to selectively enable one or more functions that the trusted contact will be authorized to perform.

At FIG. 6H, while displaying restricted access user interface 644, electronic device 600 detects inputs 648A-648C (e.g., taps) at locations corresponding to options 646A-646C, respectively.

At FIG. 6I, in response to detecting inputs 648A-648C, electronic device 600 updates restricted access user interface 644 to indicate that options 646A-646C have been enabled, while option 646D has not.

At FIG. 6I, while displaying restricted access user interface 644, electronic device 600 detects input 650 (e.g., a tap) at a location corresponding to an option 646E.

At FIG. 6J, in response to detecting input 650, electronic device 600 replaces display of restricted access user interface 644 with confirmation user interface 636. Indication 638 in confirmation user interface 636 has been updated to reflect the selections made by the user in restricted access user interface 644.

At FIG. 6J, while displaying confirmation user interface 636, electronic device 600 detects input 652 (e.g., a tap) at a location corresponding to option 640A.

Figure 6K:
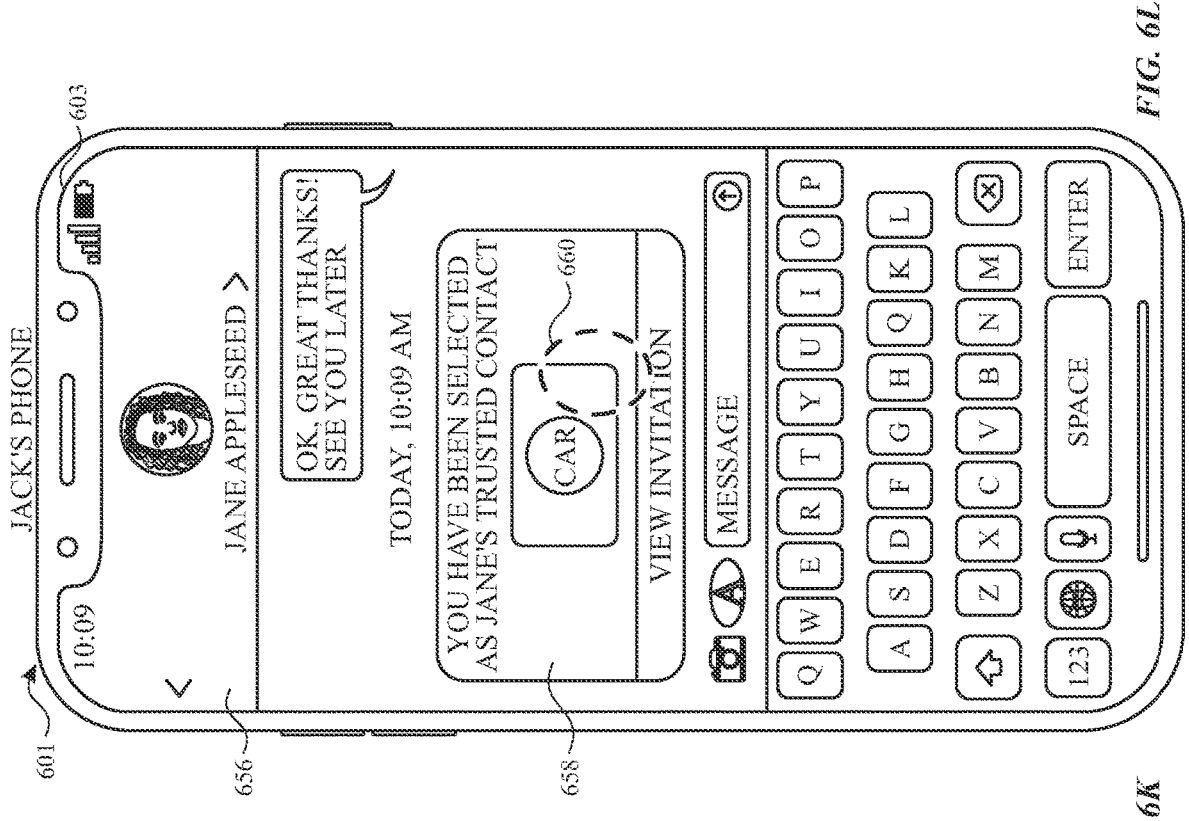

At FIG. 6K, in response to detecting input 652, electronic device 600 displays notification 654 indicating that the secure credential is temporarily restricted until Tuesday, October 6 at 6:00 AM. In some embodiments, at the end of the predefined period of time (e.g., at the selected end date/time), the temporary restriction on the secure credential is automatically removed by electronic device 600.

In some embodiments, in response to selection of a trusted contact by a user on electronic device 600 and in response to temporary restriction of the secure credential on electronic device 600 (e.g., in response to input 652 in FIG. 6J), electronic device 600 initiates a process for transmitting a notification to the trusted contact (e.g., an electronic device associated with and/or corresponding to the trusted contact).

Figure 6L:
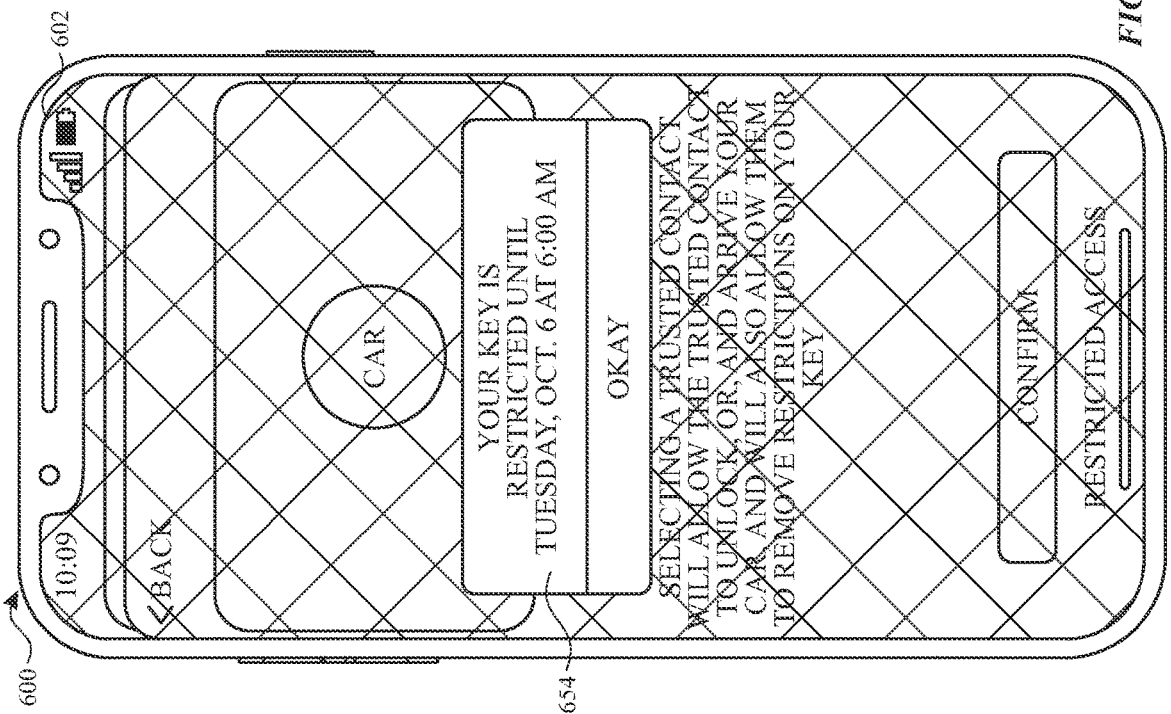

FIG. 6L depicts electronic device 601, which is a smartphone with a display 603. Display 603 of electronic device 600 includes a touch-sensitive surface on which electronic device 601 can detect user gestures (e.g., tap, swipe, and/or drag). In some embodiments, electronic device 601 includes one or more features of electronic device 100, 300, and/or 500. In the depicted scenario, electronic device 601 corresponds to (e.g., belongs to) the trusted contact selected by the user of electronic device 600.

At FIG. 6L, electronic device 601 displays a messaging user interface 656 which displays a conversation between Jane Appleseed (the user of electronic device 600) and Jack Appleseed (the user of electronic device 601 that was selected as the trusted contact). Messaging user interface 656 includes a notification 658 that indicates to Jack Appleseed that Jane Appleseed has selected Jack as her trusted contact.

At FIG. 6L, while displaying messaging user interface 656, electronic device 601 detects input 660 (e.g., a tap) at a location corresponding to notification 658.

At FIG. 6M, in response to detecting input 660, electronic device 601 replaces display of messaging user interface 656 with invitation user interface 662. Invitation user interface 662 indicates that Jane has chosen Jack as her trusted contact. Invitation user interface 662 includes an option 664A that is selectable to indicate that Jack accepts Jane's invitation to be her trusted contact, or an option 664B that is selectable to indicate that Jack does not accept Jane's invitation.

At FIG. 6M, while displaying invitation user interface 662, electronic device 601 detects input 666 (e.g., a tap) at a location corresponding to option 664A.

At FIG. 6N, in response to detecting input 666, electronic device 601 replaces display of invitation user interface 662 with settings user interface 668. In response to detecting input 666, electronic device 601 has enrolled a secure credential on electronic device 601 that can be used to authorize one or more functions of a vehicle (e.g., Jane Appleseed's vehicle). Settings user interface 668 corresponds to the secure credential, and is similar to settings user interface 614 of FIG. 6C. Settings user interface 668 includes an option 668A that can be toggled on or off to enable or disable notifications pertaining to the secure credential on electronic device 601, and an option 668B that can be toggled on or off to activate or deactivate an express mode for the secure credential on electronic device 601. Settings user interface 668 also includes an option 668D that is selectable to initiate a process to unenroll (e.g., remove) the secure credential from electronic device 601. Settings user interface 668 also includes a visual indication 668E indicating that the secure credential will be automatically removed from electronic device 601 at 6:00 AM on Oct. 6, 2020 (e.g., the end time selected by the user of electronic device 600, at which time temporary restrictions on the secure credential on electronic device 600 will be removed). Settings user interface 668 also includes an option 668C that is selectable to remove the temporary restriction on the secure credential on electronic device 600. As discussed above, in certain embodiments, a trusted contact can be provided with the ability to remove temporary restrictions on a secure credential before the predefined time period for the temporary restriction has lapsed. For example, even if the current time is before 6:00 AM on Oct. 6, 2020, Jack Appleseed can use electronic device 601 to remove the temporary restriction on the secure credential on Jane Appleseed's electronic device 600 by selecting option 668C.

At FIG. 6O, the figures return to depicting electronic device 600 (e.g., the electronic device corresponding to Jane Appleseed). Electronic device 600 is depicted displaying user interface 604. Based on the secure credential being temporarily restricted on electronic device 600, user interface 604 has been updated with a visual indication 669 indicating that the secure credential that is represented by representation 606A is temporarily restricted until 6:00 AM on Oct. 6, 2020. In FIG. 6O, while the secure credential is temporarily restricted, a user attempts to use the secure credential to authorize ignition of the engine of the vehicle by providing an input 672 to an "ENGINE START" button 670 of the vehicle. However, because the secure credential is temporarily restricted, the secure credential is unable to authorize this function of the vehicle, and the vehicle does not start.

Figure 6P:
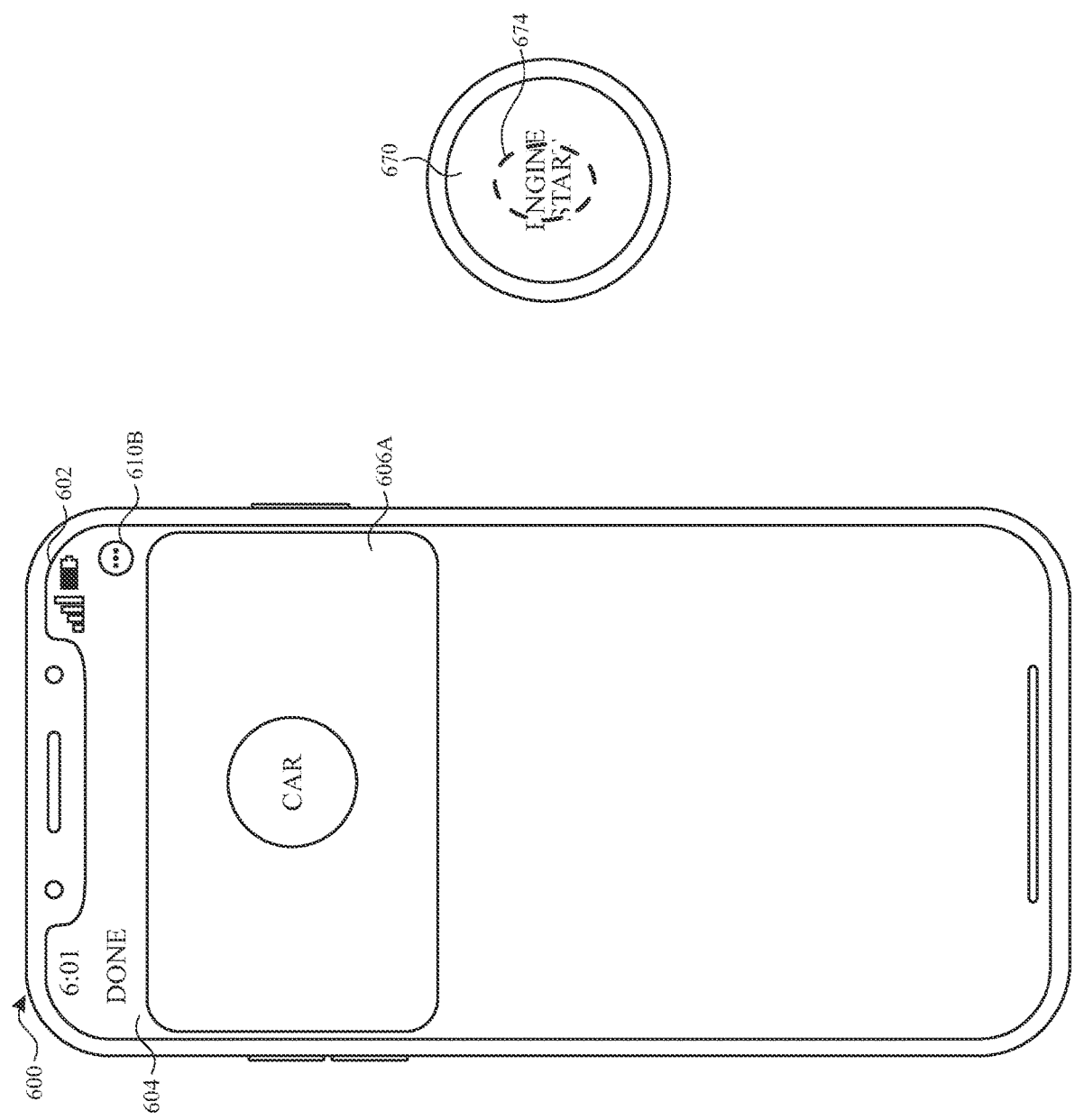
Figure 6R:
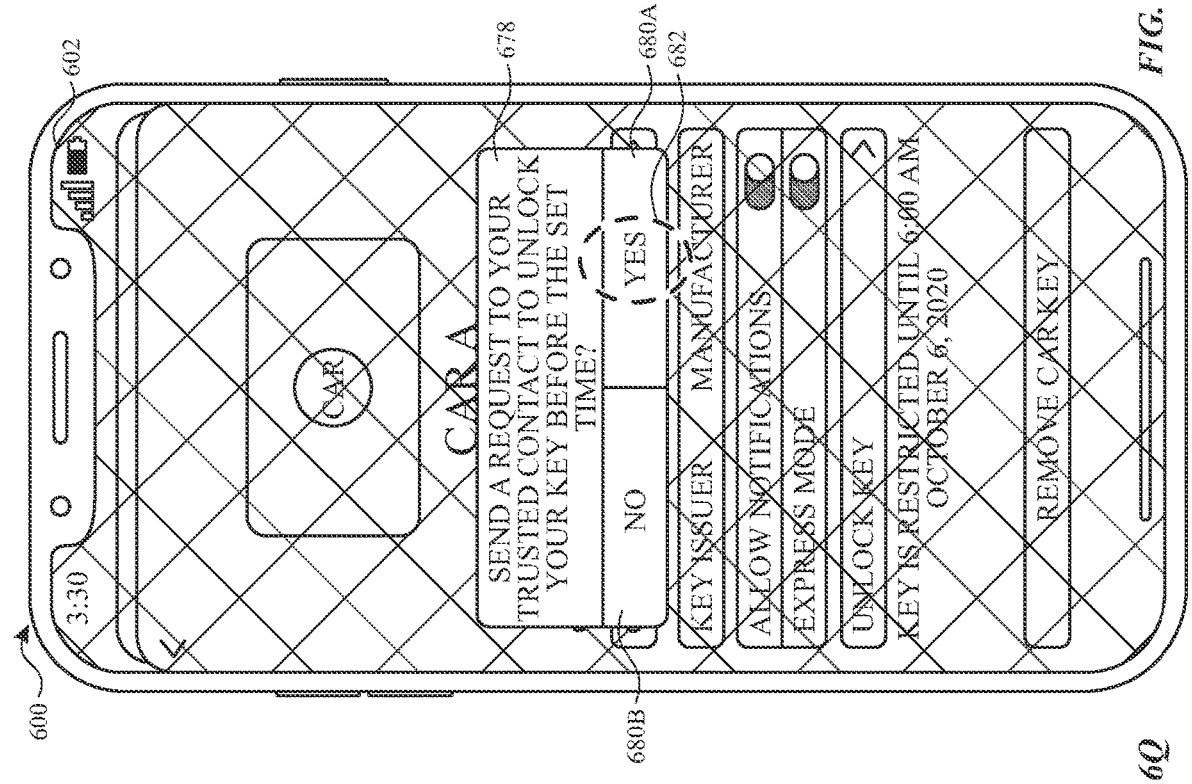

In contrast, in FIG. 6P, the current time is 6:01 AM on Oct. 6, 2020, and user interface 604 has been updated to remove visual indication 669, indicating that the secure credential is no longer restricted. With the restrictions removed, the user again attempts to use the secure credential to authorize ignition of the engine of the vehicle by providing an input 674 to the "ENGINE START" button 670. This time, because the secure credential is not restricted, the secure credential is able to authorize this function of the vehicle, and the engine of the vehicle starts.

Figure 6Q:
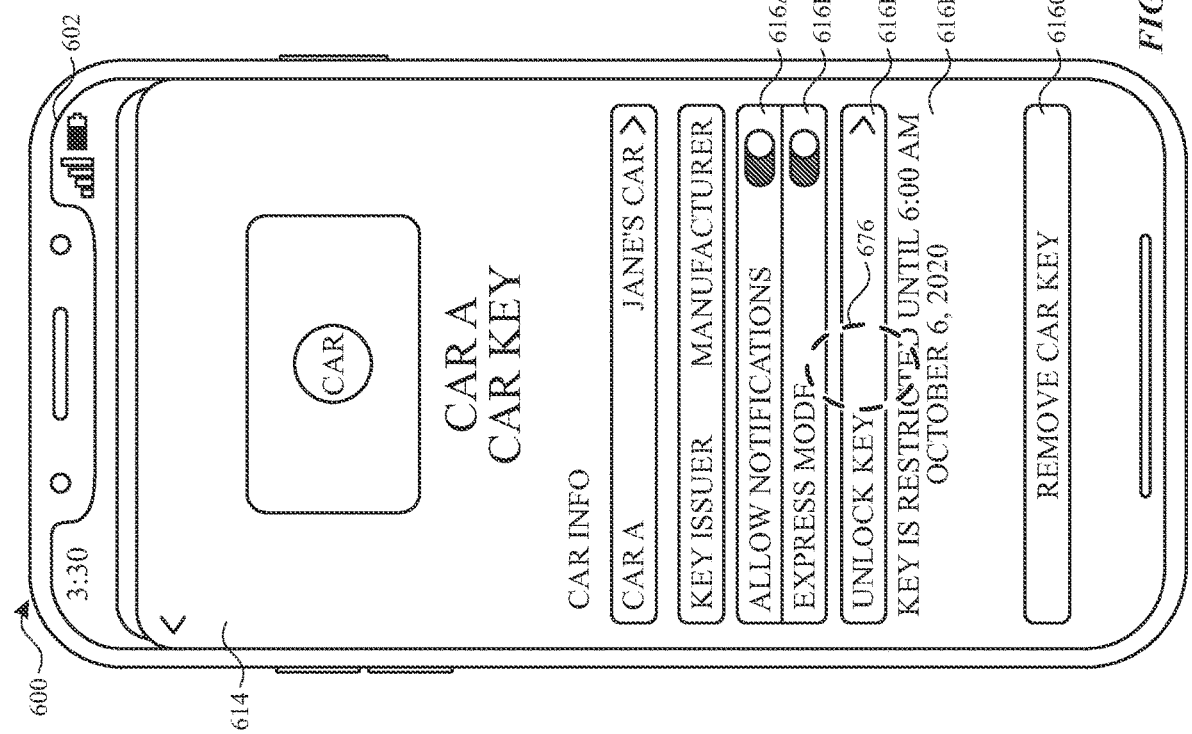
Figure 6T:
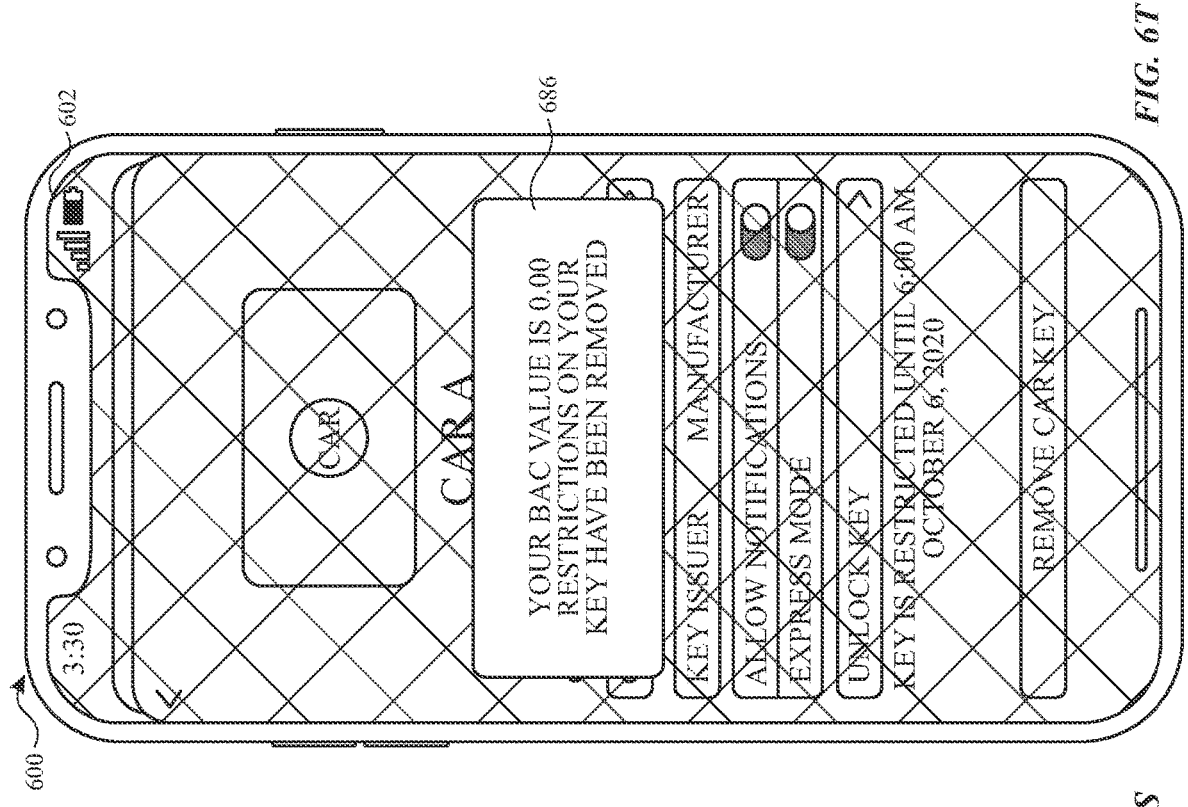

At FIG. 6Q, the current time is 3:30 AM on Oct. 6, 2020, and the secure credential on electronic device 600 is temporarily restricted. FIG. 6Q depicts electronic device 600 displaying settings user interface 614. Settings user interface 614 has been updated to reflect that the secure credential is temporarily restricted. Settings user interface 614 includes a visual indication 616F that indicates that the secure credential is restricted until 6:00 AM on Oct. 6, 2020. Settings user interface 614 also includes an option 616E that is selectable to initiate a process for removing the temporary restriction on the secure credential prior to the predetermined time for the temporary restriction lapsing.

At FIG. 6Q, while displaying settings user interface 614, electronic device 600 detects input 676 (e.g., a tap) at a location corresponding to option 616E.

In some embodiments, if a user attempts to remove the temporary restriction on the secure credential prior to the predetermined time period lapsing, the trusted contact is notified of the user's attempt. In some embodiments, if a user attempts to remove the temporary restriction on the secure credential prior to the predetermined time period lapsing, a request is sent to the trusted contact to approve removal of the temporary restriction of the secure credential, and the temporary restriction is only removed after approval from the trusted contact (e.g., on a separate electronic device corresponding to and/or associated with the trusted contact). In FIG. 6R, in response to detecting input 676, electronic device 600 displays notification 678. Notification 678 includes an option 680A that confirms that the user would like to send a request to the trusted contact to remove the temporary restriction on the secure credential, and an option 680B to cancel the request.

At FIG. 6R, while displaying notification 678, electronic device 600 detects input 682 (e.g., a tap) at a location corresponding to option 680A. In response to detecting input 682, electronic device 600 initiates a process for transmitting a request to the trusted contact (e.g., transmitting a request to a separate electronic device associated with and/or corresponding to the trusted contact).

Figure 6S:
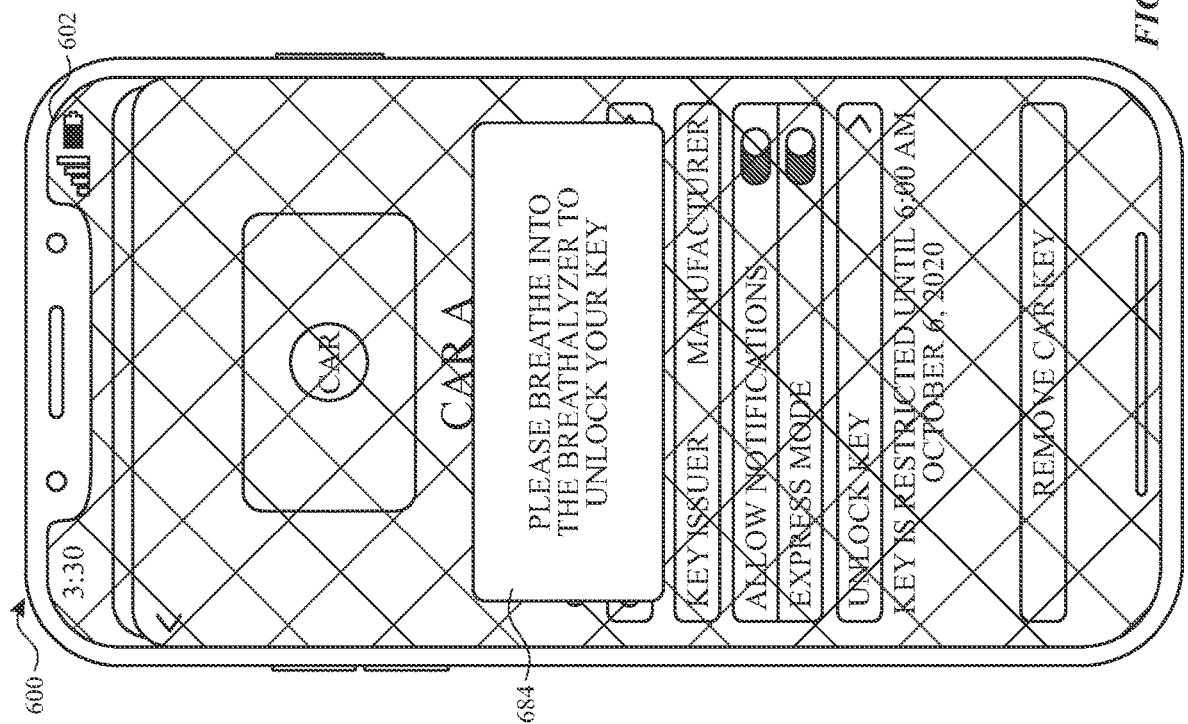

In some embodiments, if a user attempts to remove the temporary restriction on the secure credential prior to the predetermined time period lapsing, one or more unlocking criteria must be satisfied before the temporary restriction can be removed. For example, the one or more unlocking criteria can include one or more biometric criteria (e.g., a blood alcohol level below a threshold value). In FIG. 6S, in response to detecting input 676, electronic device 600 displays notification 684 instructing a user to breathe into a breathalyzer (e.g., a breathalyzer that is in wireless or wired communication with device 600).

At FIG. 6T, electronic device 600 receives biometric information indicating that the user's blood alcohol level is 0.00, which falls below the threshold value. Based on the determination that the user's blood alcohol level satisfies one or more biometric criteria, electronic device 600 displays indication 686 and removes restrictions on the secure credential.

Figure 6U:
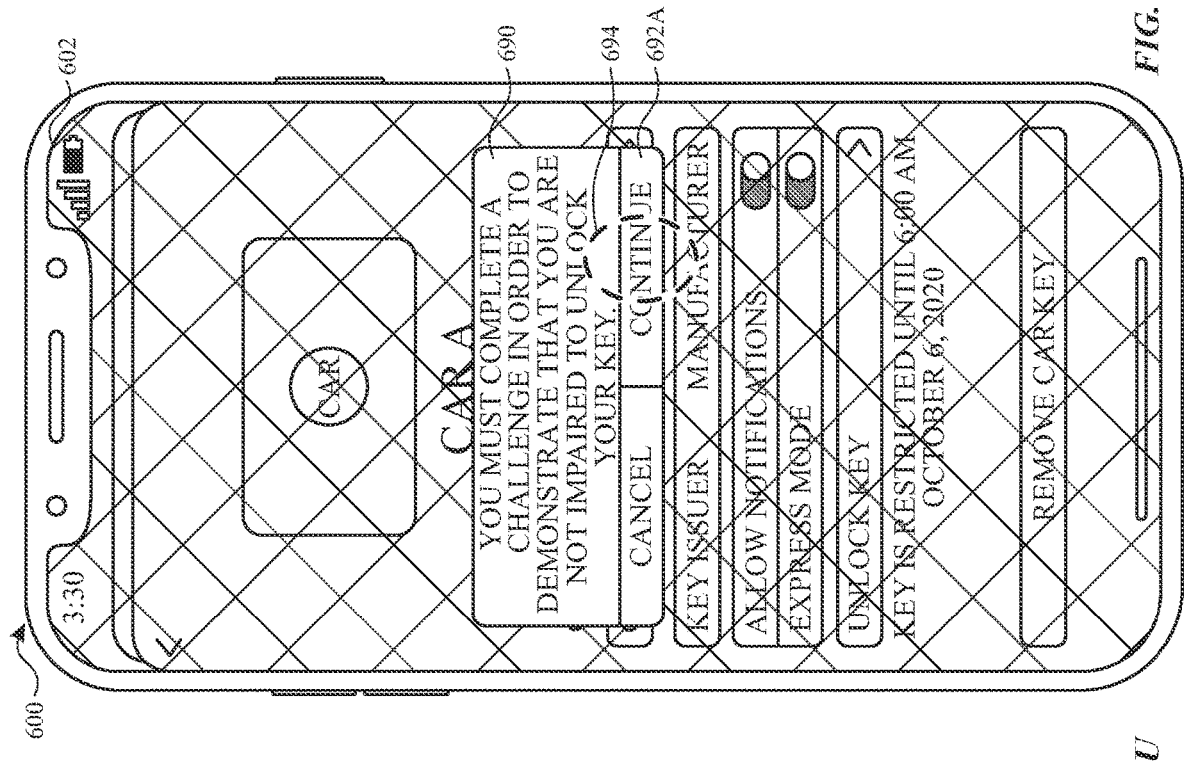

In contrast, in FIG. 6U, electronic device 600 receives biometric information indicating that the user's blood alcohol level is 0.08, which does not fall below the threshold value. Based on the determination that the user's blood alcohol level does not satisfy the one or more biometric criteria, electronic device 600 displays indication 688, and maintains restrictions on the secure credential.

Figure 6V:
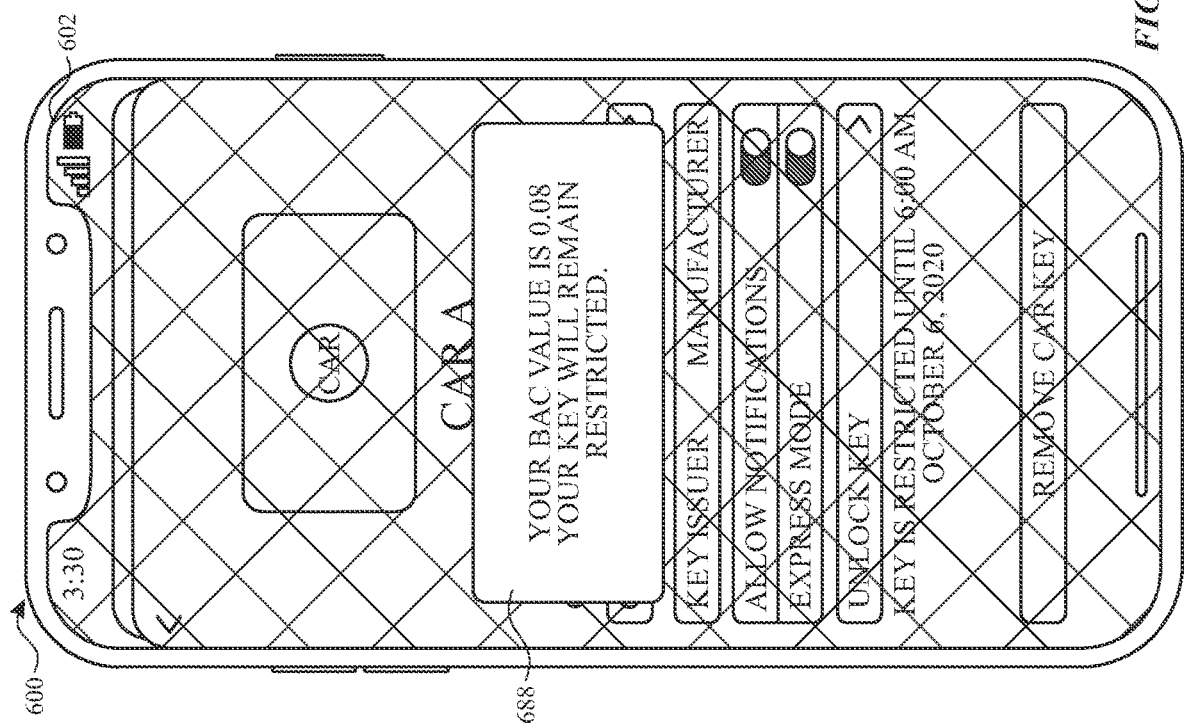

In some embodiments, the one or more unlocking criteria can include a requirement that the user successfully complete a challenge (e.g., a manual dexterity challenge; a mental clarity challenge (e.g., a series of math problems)) in order to remove restrictions on the secure credential. In FIG. 6V, in response to detecting input 676, electronic device 600 displays notification 690 informing the user that the user must successfully complete a challenge in order to remove restrictions on the credential. While displaying notification 690, electronic device 600 detects input 694 at a location corresponding to option 692A.

Figure 6W:
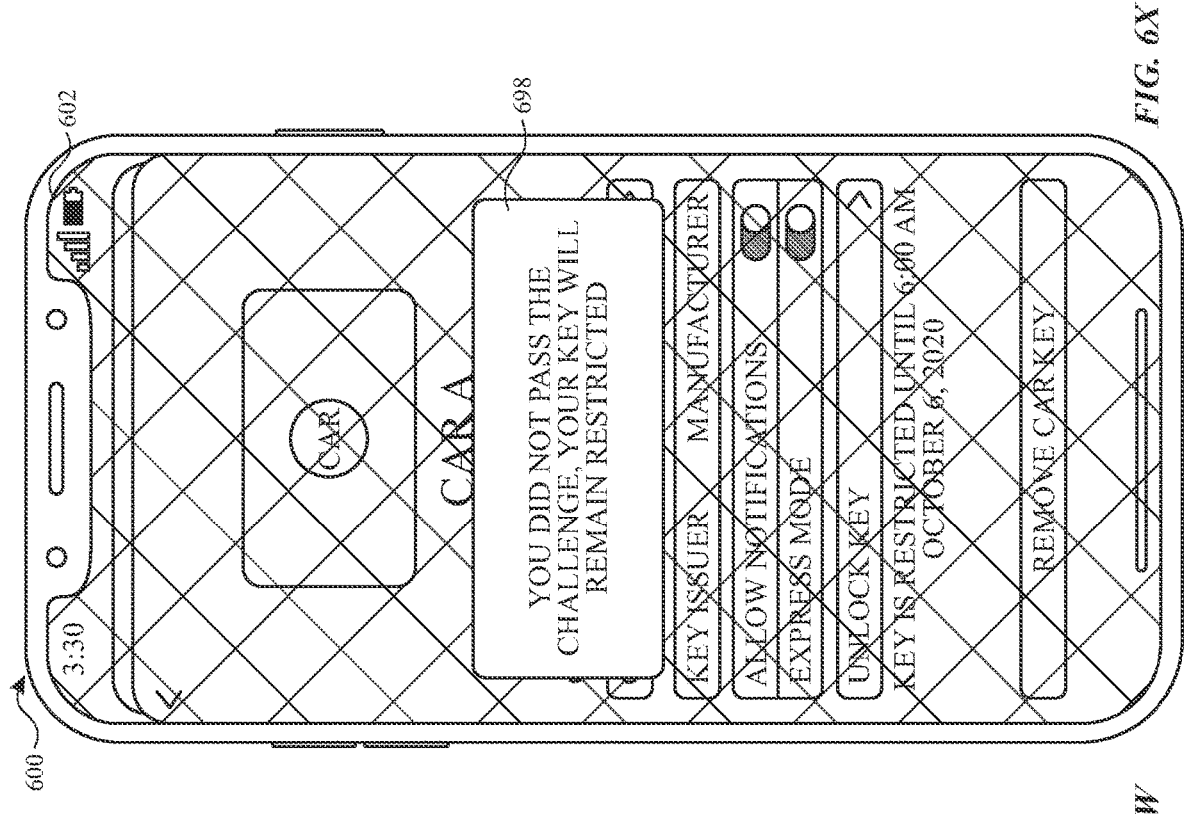
Figure 6X:
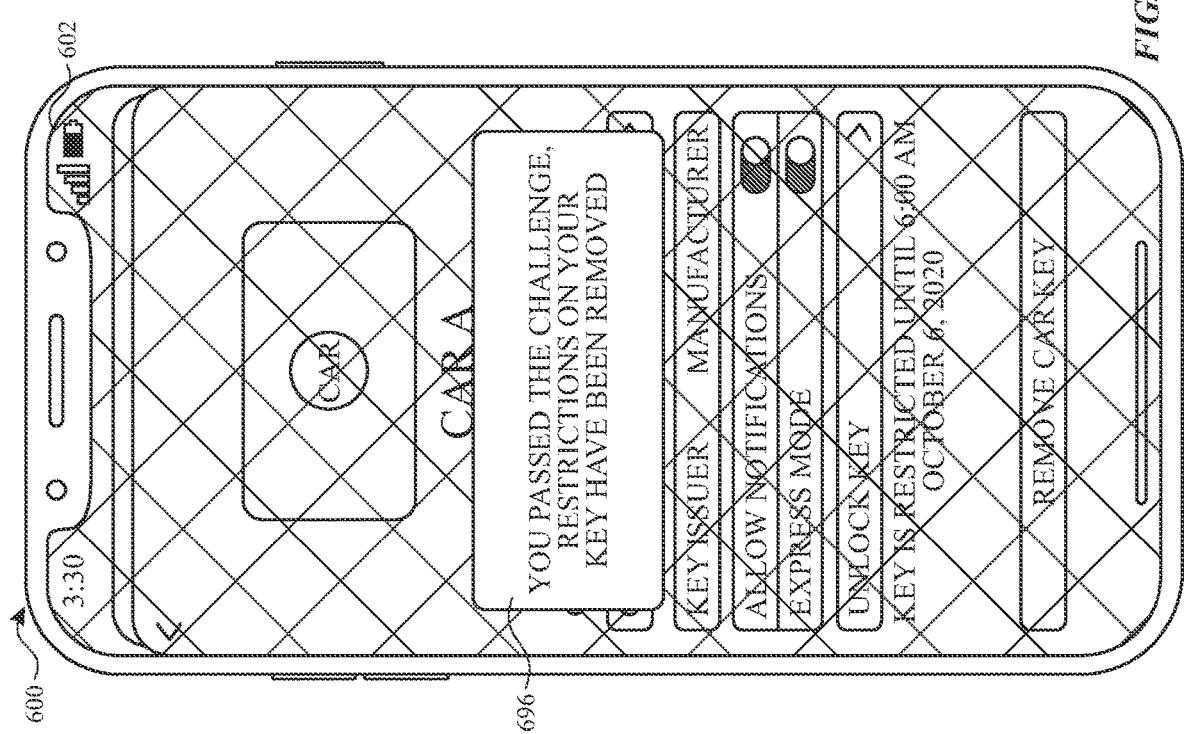

At FIG. 6W, electronic device 600 determines that the user has successfully completed the challenge (e.g., satisfied one or more performance requirements). Based on the determination that the user has completed the challenge, electronic device 600 displays indication 696 and removes restrictions on the secure credential.

In contrast, in FIG. 6X, electronic device 600 determines that the user has not successfully completed the challenge (e.g., has not satisfied the one or more performance requirements). Based on the determination that the user has not successfully completed the challenge, electronic device 600 displays indication 698, and maintains restrictions on the secure credential.

FIGS. 7A-7B are a flow diagram illustrating a method for managing and using a secure credential using an electronic device in accordance with some embodiments. Method 700 is performed at a computer system (e.g., 100, 300, 500) that is in communication with a display generation component and one or more input devices. Some operations in method 700 are, optionally, combined, the orders of some operations are, optionally, changed, and some operations are, optionally, omitted.

As described below, method 700 provides an intuitive way for managing and using a secure credential (e.g., a mobile key). The method reduces the cognitive burden on a user for manage and use a secure credential, thereby creating a more efficient human-machine interface. For battery-operated computing devices, enabling a user to manage and user a secure credential faster and more efficiently conserves power and increases the time between battery charges.

In some embodiments, a computer system (e.g., a smart phone, a smart watch, a tablet) that is in communication with a display generation component (e.g., a display controller; a touch-sensitive display system; a display (e.g., integrated or connected)) and one or more input devices (e.g., a touch-sensitive surface (e.g., a touch-sensitive display)) displays (702), via the display generation component, a user interface object (e.g., 606A) corresponding to a first secure credential, wherein the first secure credential is configured to provide authorization to use one or more functions of a vehicle (e.g., car, truck, motorcycle, etc.). In some embodiments, the first secure credential is added to and/or stored on (e.g., in a secure element of) the computer system. In some embodiments, the secure element is a hardware component that controls release of secure information. In some embodiments, the secure element is a software component that controls release of secure information. In some embodiments, the secure element is a hardware component (e.g., a secure microcontroller chip) configured to securely store data or an algorithm. In some embodiments, the secure element provides (or releases) payment information (e.g., an account number and/or a transaction-specific dynamic security code). In some embodiments, the secure element provides (or releases) the payment information in response to the device receiving authorization, such as a user authentication (e.g., biometric authentication, passcode authentication). In some embodiments, in accordance with a determination that authentication is successful, the secure element provides (or releases) payment information. In some embodiments, in accordance with a determination that authentication is not successful, the secure element forgoes providing (or releasing) payment information. In some embodiments, the first secure credential is configured to enable (e.g., start, turn on) a physical vehicle. In some embodiments, the request is triggered by user activation of a displayed selectable user interface object in a third-party car manufacturer app. In some embodiments, the request is triggered by the device detecting that it has been placed at or in the vicinity of an NFC/ultra-wideband reader. In some embodiments, the first secure credential is a token or device-specific number corresponding to an account number. In some embodiments, the first secure credential is linked to account information associated with an asset (e.g., vehicle, credit card, debit card, etc.). Displaying a user interface object corresponding to a first secure credential, wherein the first secure credential is configured to provide authorization to use one or more functions of a vehicle, provides the user with feedback as to the status of the computer system (e.g., that the computer system is configured to provide authorization to use one or more functions of a vehicle). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the user interface object corresponding to the first secure credential (704), the computer system detects (706) a sequence of one or more user inputs (e.g., 618, 626, 652) corresponding to a request to restrict use of the first secure credential to authorize at least a first function of the one or more functions for a predetermined period of time (e.g., FIGS. 6D-6E) (e.g., a user-defined period of time). In some embodiments, the first function corresponds to the ability of the first secure credential to enable (e.g., start, turn on) a physical vehicle.

In response to detecting the sequence of one or more user inputs (708), the computer system restricts (710) use of the first secure credential to authorize the first function of the one or more functions (e.g., for the predetermined period of time) (e.g., FIGS. 6K, 6O). In some embodiments, the first function corresponds to the ability of the first secure credential to enable (e.g., start, turn on) a physical vehicle and restricting use of the first secure credential to authorize the first function prevents use of the first secure credential for enabling (e.g., starting, turning on) the physical vehicle. Restricting use of the first secure credential to authorize the first function of the one or more functions provides security and can prevent unauthorized users from initiating sensitive operations. Providing improved security enhances the operability of the device and makes the user-device interface more efficient and/or secure (e.g., by restricting unauthorized access) which, additionally, reduces power usage and improves battery life of the device by limiting the performance of restricted operations.

In some embodiments, after restricting use of the first secure credential to authorize the first function of the one or more functions, in accordance with a determination that the predetermined period of time has elapsed after restricting use of the first secure credential to authorize the first function of the one or more functions, the computer system restores use of the first secure credential to authorize the first function of the one or more functions (e.g., FIG. 6P) (e.g., ceasing to restrict use of the first secure credential to authorize the first function of the one or more functions; re-enabling use of the first secure credential to authorize the first function of the one or more functions; removing the restriction of use of the first secure credential to authorize the first function of the one or more functions) (e.g., such that the first secure credential is again configured to and/or able to provide authorization to use the first function of the one or more functions). Automatically restoring use of the first secure credential to authorize the first function of the one or more functions in accordance with a determination that the predetermined period of time has elapsed allows the user to use the first secure credential to authorize the first function after the predetermined period of time has elapsed without requiring additional input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system detects (in some embodiments, after restricting use of the first secure credential to authorize the first function of the one or more functions) a request to use the first secure credential to authorize the first function of the one or more functions (e.g., 672, 674). In response to detecting the request to use the first secure credential to authorize the first function of the one or more functions: in accordance with a determination that use of the first secure credential to authorize the first function of the one or more functions is not currently restricted, the computer system authorizes (e.g., performs; authorizes performance of) the first function of the one or more functions (e.g., FIG. 6P), and in accordance with a determination that use of the first secure credential to authorize the first function of the one or more functions is currently restricted, the computer system foregoes authorizing (e.g., forgoes performing; forgoes authorizing performance of) the first function of the one or more functions (e.g., FIG. 6O). In some embodiments, the computer system displays an indication that that use of the first secure credential to authorize the first function of the one or more functions is currently restricted. Forgoing authorizing the first function in accordance with a determination that use of the first secure credential to authorize the first function is currently restricted provides security and can prevent unauthorized users from initiating sensitive operations. Providing improved security enhances the operability of the device and makes the user-device interface more efficient and/or secure (e.g., by restricting unauthorized access) which, additionally, reduces power usage and improves battery life of the device by limiting the performance of restricted operations.

In some embodiments, after restricting use of the first secure credential to authorize the first function of the one or more functions (e.g., while use of the first secure credential to authorize the first function is restricted), the computer system detects a request (e.g., an attempt) to use the first secure credential to authorize a respective operation of the vehicle (e.g., 672, 674) (e.g., detects a request (e.g., from the vehicle, from a user) to authorize the respective operation using the first secure credential). In response to detecting the request to use the secure credential to authorize the respective operation, and in accordance with a determination that the respective operation corresponds to the first function, the computer system forgoes authorizing the respective operation (e.g., FIG. 6O) (e.g., forgoes transmitting authorization to the vehicle to perform the respective operation) (e.g., declines authorization of performance of the respective operation) (e.g., transmits information to the vehicle indicating that the respective operation is declined). In some embodiments, forgoing authorizing the respective operation prevents the vehicle from performing the respective operation. In response to detecting the request to use the secure credential to authorize the respective operation, and in accordance with a determination that the respective operation corresponds to a second function different from the first function, the computer system authorizes (e.g., authorizes performance of) the respective operation (e.g., transmits information to the vehicle authorizing (e.g., enabling) performance of the respective operation). In some embodiments, authorizing performance of the respective operation enables the vehicle to perform the respective operation. Forgoing authorizing the respective operation in accordance with a determination that the respective operation corresponds to the first function provides security and can prevent unauthorized users from initiating sensitive operations. Providing improved security enhances the operability of the device and makes the user-device interface more efficient and/or secure (e.g., by restricting unauthorized access) which, additionally, reduces power usage and improves battery life of the device by limiting the performance of restricted operations.

In some embodiments, the first function comprises driving the vehicle, and restricting use of the first secure credential to authorize the first function of the one or more functions comprises restricting use of the first secure credential to authorize driving of the vehicle (e.g., FIG. 6O) (e.g., restricting use of the first secure credential to authorize motive functions of the vehicle, such as starting the vehicle (e.g., enabling ignition of the engine of the vehicle), restricting use of the first secure credential to shift the transmission of the vehicle from "park" to "drive" or "reverse" (e.g., while the engine of the vehicle is running)). In some embodiments, the first secure credential can still enable non-motive functions of the vehicle (e.g., operation of entertainment and/or environmental controls). Restricting use of the first secure credential to authorize driving of the vehicle provides security and can prevent unauthorized users from initiating sensitive operations. Providing improved security enhances the operability of the device and makes the user-device interface more efficient and/or secure (e.g., by restricting unauthorized access) which, additionally, reduces power usage and improves battery life of the device by limiting the performance of restricted operations.

In some embodiments, after restricting use of the first secure credential to authorize driving of the vehicle (e.g., while use of the first secure credential to authorize driving of the vehicle is restricted), the computer system detects an attempt (e.g., input 672) to use the first secure credential to perform a second respective operation of the vehicle (e.g., detects a request (e.g., from the vehicle, from a user) to authorize the respective operation using the first secure credential). In response to detecting the attempt to use the secure credential to perform the second respective operation, and in accordance with a determination that the second respective operation corresponds to driving of the vehicle (e.g., an attempt to start the engine of the vehicle, an attempt to shift the vehicle from "park" to "drive" or "reverse" (e.g., while the engine of the car is running)), the computer systems forgoes authorizing the second respective operation (e.g. FIG. 6O) (e.g., forgoes transmitting authorization to the vehicle to perform the respective operation) (e.g., declines authorization of performance of the respective operation) (e.g., transmits information to the vehicle indicating that the respective operation is declined). In some embodiments, forgoing authorizing the respective operation prevents the vehicle from performing the respective operation (e.g., prevents the vehicle from starting the engine of the vehicle, prevents the vehicle from shifting from "park" to "drive" or "reverse" (e.g., while the engine is running). In response to detecting the attempt to use the secure credential to perform the second respective operation, and in accordance with a determination that the second respective operation does not correspond to driving of the vehicle (e.g., the second respective operation corresponds to unlocking the vehicle, turning on the heating and/or air conditioning of the vehicle, playing music in the vehicle), the computer system authorizes performance of the second respective operation (e.g., transmits information to the vehicle authorizing (e.g., enabling) performance of the respective operation). In some embodiments, authorizing performance of the respective operation enables the vehicle to perform the respective operation). Forgoing authorizing the second respective operation in accordance with a determination that the second respective operation corresponds to driving of the vehicle provides security and can prevent unauthorized users from initiating sensitive operations. Providing improved security enhances the operability of the device and makes the user-device interface more efficient and/or secure (e.g., by restricting unauthorized access) which, additionally, reduces power usage and improves battery life of the device by limiting the performance of restricted operations.

In some embodiments, the computer system detects (714) (in some embodiments, before restricting use of the first secure credential to authorize the first function of the one or more functions; in some embodiments, after detecting the sequence of one or more inputs) a second sequence of one or more user inputs (e.g., 634) corresponding to selection (e.g., designation) of a contactable user (e.g., a trusted contact; an account associated with one or more devices of a contactable user) (e.g., 632A) from a plurality of contactable users (e.g., 632A-632H), wherein selection of the contactable user enables the contactable user to restore use of the first secure credential to authorize the first function of the one or more functions (e.g., enables the contactable user to utilize an electronic device (e.g., smartphone, tablet, watch) associated with the contactable user (e.g., 601) to restore use of the first secure credential to authorize the first function of the one or more functions (e.g., via one or more user inputs on the electronic device associated with the contactable user)) (e.g., regardless of whether the predetermined period of time has elapsed). In some embodiments, in response to detecting the second sequence of one or more user inputs corresponding to selection of the contactable user from the plurality of contacts, the computer system transmits, to one or more electronic devices associated with the contactable user (e.g., 601), a notification (e.g., 658) indicating that the contactable user has been enabled (e.g., selected) to restore use of the first secure credential to authorize the first function. In some embodiments, the second sequence of one or more user inputs (e.g., 634) are detected after detecting the sequence of one or more user inputs (e.g., 618) corresponding to the request to restrict use of the first secure credential to authorize at least the first function. In some embodiments, the second sequence of one or more user inputs (e.g., 634) are part of the one or more user inputs corresponding to the request to restrict use of the first secure credential to authorize at least the first function (e.g., the sequence of one or more user inputs comprise the second sequence of one or more user inputs)). In some embodiments, after restricting use of the first secure credential to authorize the first function of the one or more functions, the computer system receives an indication of one or more user inputs by the contactable user (e.g., at an electronic device corresponding to and/or associated with the contactable user) (e.g., at an electronic device different from the computer system) corresponding to a request (e.g., by the contactable user) to restore use of the first secure credential to authorize the first function of the one or more functions; and, in response to receiving the indication of the one or more user inputs by the contactable user, the computer system restores use of the first secure credential to authorize the first function of the one or more functions (e.g., ceasing to restrict use of the first secure credential to authorize the first function of the one or more functions; re-enabling use of the first secure credential to authorize the first function of the one or more functions; removing the restriction of use of the first secure credential to authorize the first function of the one or more functions) (e.g., such that the first secure credential is again configured to and/or able to provide authorization to use the first function of the one or more functions)).

Detecting a sequence of user inputs corresponding to selection of a contactable user, and enabling the contactable user to restore use of the first secure credential to authorize the first function of the one or more functions provides security and can prevent unauthorized users from initiating sensitive operations (e.g., prevents other, non-trusted users from restoring use of the first secure credential to authorize the first function of the one or more functions). Providing improved security enhances the operability of the device and makes the user-device interface more efficient and/or secure (e.g., by restricting unauthorized access) which, additionally, reduces power usage and improves battery life of the device by limiting the performance of restricted operations.

In some embodiments, selection of the contactable user requests permission (e.g., as indicated in FIG. 6R) from the contactable user to restore use of the first secure credential to authorize the first function of the one or more functions from a remote location (716) (e.g., without restrictions as to the distance of the contactable user from the computer system; without requiring that the contactable user (or a device associated with the contactable user) satisfies proximity criteria with respect to the computer system). In some embodiments, using an electronic device associated with the contactable. Enabling a selected contactable user to restore use of the first secure credential to authorize the first function of the one or more functions from a remote location provides security and can prevent unauthorized users from initiating sensitive operations (e.g., prevents other, non-trusted users from restoring use of the first secure credential to authorize the first function of the one or more functions). Providing improved security enhances the operability of the device and makes the user-device interface more efficient and/or secure (e.g., by restricting unauthorized access) which, additionally, reduces power usage and improves battery life of the device by limiting the performance of restricted operations.

In some embodiments, selection of the contactable user requests permission from the contactable user to restore use of the first secure credential to authorize the first function of the one or more functions when proximity criteria are satisfied (718) (e.g., 630C, 632G, 632H) (e.g., when the contactable user requests to restore use directly on the computer system; when the contactable user requests to restore use from an external device that is within a predetermined distance (e.g., within Bluetooth range; within 1, 5, 10, or 15 meters) from the computer system). Enabling a selected contactable user to restore use of the first secure credential to authorize the first function of the one or more functions when proximity criteria are satisfied provides security and can prevent unauthorized users from initiating sensitive operations (e.g., prevents other, non-trusted users from restoring use of the first secure credential to authorize the first function of the one or more functions). Providing improved security enhances the operability of the device and makes the user-device interface more efficient and/or secure (e.g., by restricting unauthorized access) which, additionally, reduces power usage and improves battery life of the device by limiting the performance of restricted operations.

In some embodiments, the plurality of contactable users (e.g., 632A-632H) includes a first set of contactable users that have a predetermined relationship (e.g., a family member of the user; a parent or guardian of the user) to a user of the computer system (e.g., 632A, 632C-632E) and a second set of contactable users (e.g. 632G, 632H, 632I) that do not have the predetermined relationship to the user of the computer system and wherein the contactable user is a user within the first set of contactable users. In some embodiments, a contactable user of the plurality of contactable users is only enabled for selection to enable the contactable user to restore use of the first secure credential to authorize the first function of the one or more functions if the contactable user has the predetermined relationship to the user of the computer system. In some embodiments, the first set of contactable users include users that have been previously identified by the user as family members of the user. For example, in some embodiments, family members may be identified based on sharing a family account that allows family members in the family account to share content, share payment instruments, and/or allow one or more family members to control various settings for other family members (e.g., for parents to control one or more parental controls for their children). Enabling a selected contactable user that has a predetermined relationship to the user of the computer system to restore use of the first secure credential to authorize the first function of the one or more functions provides security and can prevent unauthorized users from initiating sensitive operations (e.g., prevents other, non-trusted users from restoring use of the first secure credential to authorize the first function of the one or more functions). Providing improved security enhances the operability of the device and makes the user-device interface more efficient and/or secure (e.g., by restricting unauthorized access) which, additionally, reduces power usage and improves battery life of the device by limiting the performance of restricted operations.

In some embodiments, in response to detecting the second sequence of one or more user inputs corresponding to selection of the contactable user from the plurality of contactable users, the computer system initiates a process for transmitting a second secure credential to an electronic device associated with the contactable user (e.g., 601) (e.g., FIGS. 6O-6N) (e.g., initiates a process for adding a second secure credential to an electronic device associated with the contactable user) (e.g., initiates a process for enabling a second secure credential on an electronic device associated with the contactable user), wherein the second secure credential is configured to provide authorization to use at least a subset of the one or more functions of the vehicle that includes the first function of the one or more functions (e.g., 646A-646C, FIG. 6H). In some embodiments, the second secure credential is configured to provide authorization to use the first function of the one or more functions of the vehicle (e.g., the first function of the or more functions is not restricted for the second secure credential) (e.g., 646B), even while the first function is restricted for the first secure credential (e.g., the contactable user can use the second secure credential on his or her electronic device to authorize the first function while the first secure credential is restricted from authorizing the first function)). In some embodiments, the first function of the one or more functions corresponds to driving of the vehicle, and the second secure credential on the electronic device associated with the contactable user can authorize driving of the vehicle while the first secure credential is restricted from authorizing driving of the vehicle. Transmitting a second secure credential to an electronic device associated with a selected contactable user provides security and can prevent unauthorized users from initiating sensitive operations. Providing improved security enhances the operability of the device and makes the user-device interface more efficient and/or secure (e.g., by restricting unauthorized access) which, additionally, reduces power usage and improves battery life of the device by limiting the performance of restricted operations.

In some embodiments, the second secure credential is not configured to provide authorization to use a third function (e.g., 646D), different from the first function, that the first secure credential is configured to provide authorization to use (e.g., without being restricted on the first secure credential) (e.g., contactable user cannot share the second secure credential with another user, whereas the first secure credential can be shared with other users). In some embodiments, the third function is restricted on the second secure credential and the first function is not restricted on the second secure credential, while the third function is not restricted on first secure credential and the first function is restricted on the second secure credential. Restricting certain functions on the second secure credential provides security and can prevent unauthorized users from initiating sensitive operations. Providing improved security enhances the operability of the device and makes the user-device interface more efficient and/or secure (e.g., by restricting unauthorized access) which, additionally, reduces power usage and improves battery life of the device by limiting the performance of restricted operations.

In some embodiments, after initiating the process for transmitting the second secure credential to the electronic device associated with the contactable user (in some embodiments, and after restricting use of the first secure credential to authorize the first function of the one or more functions), in accordance with a determination that the predetermined period of time has elapsed after initiating the process for transmitting the second secure credential to the electronic device associated with the contactable user (in some embodiments, alternatively after restricting use of the first secure credential to authorize the first function of the one or more functions), the computer system initiates a process to disable the second secure credential (e.g., 668E) (e.g., initiates a process to remove the second secure credential from the electronic device associated with the contactable user; disables the ability of the second credential to authorize use of at least the subset of the one or more functions). Automatically disabling the second secure credential in accordance with a determination that the predetermined period of time has elapsed allows the user to revoke the second secure credential without requiring additional input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of contactable users includes one or more previously-identified emergency contacts (e.g., 630A, 632A) (e.g., one or more contacts that have been identified by a user associated with the computer system as emergency contacts prior to detecting the second sequence of one or more user inputs (e.g., prior to detecting the sequence of one or more user inputs and prior to detecting the second sequence of one or more user inputs)). Prior to detecting the second sequence of one or more inputs (in some embodiments, in response to detecting the sequence of one or more inputs), the computer system displays a suggestion (e.g., 630A, 632A) to select at least one of the one or more previously-identified emergency contacts as the contactable user. In some embodiments, displaying the suggestion to select the at least one of the one or more previous-identified emergency contacts as the contactable user comprises visually emphasizing the one or more previously-identified emergency contacts (e.g., whereas one or more contacts that are not previously-identified emergency contacts are not visually emphasized). In some embodiments, designation of the one or more contacts as emergency contacts is utilized in one or more applications on the computer system. For example, in some embodiments, a contact identified as an emergency contact is automatically notified if the computer system receives an indication that the user is in an emergency situation (e.g., based on one or more inputs received at the computer system) or that the user was involved in a fall. In some embodiments, the one or more emergency contacts can be displayed in a medical identification user interface that is accessible even when the computer system is in a locked state. Automatically suggesting one or more emergency contacts as the contactable user improves the quality of suggestions to the user, thereby providing a means for selection by the user. Otherwise, additional inputs would be required to further locate the desired contact. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after detecting the second sequence of one or more user inputs and after restricting use of the first secure credential to authorize the first function of the one or more functions (in some embodiments, and while use of the first secure credential to authorize the first function of the one or more functions is currently restricted), the computer system detects a third sequence of one or more user inputs (e.g., 676) corresponding to a request to restore use of the first secure credential to authorize the first function of the one or more functions. In response to detecting the third sequence of one or more user inputs corresponding to the request to restore use of the first secure credential to authorize the first function of the one or more functions, the computer system transmits a notification to the contactable user (e.g., to one or more electronic devices associated with the contactable user) (e.g., 678) notifying the contactable user of the request to restore use of the first secure credential to authorize the first function of the one or more functions. Automatically transmitting a notification to the contactable user in response to a request to restore use of the first secure credential to authorize the first function provides security and can prevent unauthorized users from initiating sensitive operations. Providing improved security enhances the operability of the device and makes the user-device interface more efficient and/or secure (e.g., by restricting unauthorized access) which, additionally, reduces power usage and improves battery life of the device by limiting the performance of restricted operations.

In some embodiments, after restricting use of the first secure credential to authorize the first function of the one or more functions (in some embodiments, and while use of the first secure credential to authorize the first function of the one or more functions is currently restricted), the computer system receives biometric information (e.g., FIGS. 6S-6U) (e.g., from a first input device of the one or more input devices (e.g., a blood alcohol level test device (e.g., a breath alcohol test device)). In response to receiving the biometric information, and in accordance with a determination that the biometric information satisfies unlocking criteria (e.g., in accordance with a determination that the biometric information indicates a blood alcohol level below a threshold value), the computer system restores use of the first secure credential to authorize the first function of the one or more functions (e.g., re-enabling use of the first secure credential to authorize the first function of the one or more functions, removing the restriction of use of the first secure credential to authorize the first function of the one or more functions) (e.g., such that the first secure credential is again configured to and/or able to provide authorization to use the first function of the one or more functions) (e.g., regardless of whether the predetermined period of time has elapsed) (e.g., FIG. 6T). In response to receiving the biometric information, and in accordance with a determination that the biometric information does not satisfy unlocking criteria (e.g., in accordance with a determination that the biometric information indicates a blood alcohol level above a threshold value), the computer system maintains restriction of use of the first secure credential to authorize the first function of the one or more functions (e.g., until the predetermined period of time has elapsed after restricting use of the first secure credential to authorize the first function of the one or more functions) (e.g., FIG. 6U). Automatically restoring use of the first secure credential to authorize the first function of the one or more functions in accordance with a determination that the biometric information satisfies unlocking criteria allows the user to restore use of the first secure credential without requiring additional input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after restricting use of the first secure credential to authorize the first function of the one or more functions (in some embodiments, and while use of the first secure credential to authorize the first function of the one or more functions is currently restricted), the computer system detects a fourth sequence of one or more user inputs (e.g., 676, FIG. 6V) corresponding to a request to restore use of the first secure credential to authorize the first function of the one or more functions (e.g., one or more touch inputs, one or more non-touch inputs) (e.g., one or more user inputs provided by a user in response to a challenge that assesses temporary impairment) (in some embodiments, a challenge that assesses temporary impairment is displayed and/or outputted while detecting the fourth sequence of one or more user inputs (in some embodiments the challenge that assesses temporary impairment is displayed and/or outputted in response to a user input)).

In response to receiving the fourth sequence of one or more user inputs, and in accordance with a determination that the fourth sequence of one or more user inputs satisfies unlocking criteria (e.g., in accordance with a determination that the fourth sequence of one or more user inputs demonstrate that the user is not impaired (e.g., the inputs demonstrate a degree of manual dexterity, cognitive function, and/or a biometric parameter (e.g., blood or breath-based blood alcohol assessment)), the computer system restores use of the first secure credential to authorize the first function of the one or more functions (e.g., FIG. 6W) (e.g., ceasing to restrict use of the first secure credential to authorize the first function of the one or more functions; re-enabling use of the first secure credential to authorize the first function of the one or more functions; removing the restriction of use of the first secure credential to authorize the first function of the one or more functions) (e.g., such that the first secure credential is again configured to and/or able to provide authorization to use the first function of the one or more functions) (e.g., regardless of whether the predetermined period of time has elapsed).

In response to receiving the fourth sequence of one or more user inputs, and in accordance with a determination that the fourth sequence of one or more user inputs do not satisfy unlocking criteria (e.g., in accordance with a determination that the fourth sequence of one or more user inputs demonstrate that the user is impaired), maintaining restriction of use of the first secure credential to authorize the first function of the one or more functions (e.g., until the predetermined period of time has elapsed after restricting use of the first secure credential to authorize the first function of the one or more functions) (e.g., FIG. 6X). Maintaining restriction of use of the first secure credential to authorize the first function in accordance with a determination that the fourth sequence of one or more user inputs do not satisfy unlocking criteria provides security and can prevent unauthorized users from initiating sensitive operations. Providing improved security enhances the operability of the device and makes the user-device interface more efficient and/or secure (e.g., by restricting unauthorized access) which, additionally, reduces power usage and improves battery life of the device by limiting the performance of restricted operations.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve management and user of secure credentials on electronic devices. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted services and information that are of greater relevance to the user. Accordingly, use of such personal information data enables provision of more efficient and intuitive user interfaces for a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of managing and using a secure credential, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users may be provided with user interfaces and user interface options based on non-personal information data or a bare minimum amount of personal information, such as the content being requested by the device associated with a user, other non-personal information available to the electronic device, or publicly available information.

What is claimed is:

1. A computer system, comprising: a display generation component; one or more input devices; one or more processors; and
    memory storing one or more programs configured to be executed by the one or more processors, the one or more programs including instructions for:
    displaying, via the display generation component, a user interface object corresponding to a first secure credential stored on the computer system, wherein the first secure credential enables the computer system to provide authorization to use one or more functions of a vehicle that is separate from the computer system;
    while displaying the user interface object corresponding to the first secure credential, detecting, via an input device from the one or more input devices, a sequence of one or more user inputs corresponding to a request to restrict use of the first secure credential stored on the computer system to authorize at least a first function of the one or more functions for a predetermined period of time;
    in response to detecting the sequence of one or more user inputs, restricting use of the first secure credential stored on the computer system to authorize the first function of the one or more functions, wherein restricting the use of the first secure credential stored on the computer system to authorize the first function of the one or more functions prohibits the computer system from providing authorization to use the first function of the one or more functions of the vehicle that is separate from the computer system during the predetermined period of time; and
    detecting, via the input device from the one or more input devices, a second sequence of one or more user inputs corresponding to selection of a contactable user from a plurality of contactable users, wherein selection of the contactable user enables the contactable user, using a second external device separate from the computer system, to restore use of the first secure credential stored on the computer system to authorize the first function of the one or more functions.

2. The computer system of claim 1, wherein the one or more programs further include instructions for:
after restricting use of the first secure credential to authorize the first function of the one or more functions, in accordance with a determination that the predetermined period of time has elapsed after restricting use of the first secure credential to authorize the first function of the one or more functions, restoring use of the first secure credential to authorize the first function of the one or more functions, wherein restoring use of the first secure credential to authorize the first function of the one or more functions allows the computer system to provide authorization to use the first function of the one or more functions of the vehicle that is separate from the computer system.

3. The computer system of claim 1, wherein the one or more programs further include instructions for:
detecting a request to use the first secure credential to authorize the first function of the one or more functions; and
in response to detecting the request to use the first secure credential to authorize the first function of the one or more functions:
in accordance with a determination that use of the first secure credential to authorize the first function of the one or more functions is not currently restricted, authorizing the first function of the one or more functions, and
in accordance with a determination that use of the first secure credential to authorize the first function of the one or more functions is currently restricted, forgoing authorizing.

4. The computer system of claim 1, wherein the one or more programs further include instructions for:
after restricting use of the first secure credential to authorize the first function of the one or more functions:
detecting a request to use the first secure credential to authorize a respective operation of the vehicle; and
in response to detecting the request to use the secure credential to authorize the respective operation:
in accordance with a determination that the respective operation corresponds to the first function, forgoing authorizing the respective operation, and
in accordance with a determination that the respective operation corresponds to a second function different from the first function, authorizing the respective operation.

5. The computer system of claim 1, wherein the first function comprises driving the vehicle, and restricting use of the first secure credential to authorize the first function of the one or more functions comprises restricting use of the first secure credential to authorize driving of the vehicle.

6. The computer system of claim 5, wherein the one or more programs further include instructions for:
after restricting use of the first secure credential to authorize driving of the vehicle:
detecting an attempt to use the first secure credential to perform a second respective operation of the vehicle; and
in response to detecting the attempt to use the secure credential to perform the second respective operation:
in accordance with a determination that the second respective operation corresponds to driving of the vehicle, forgoing authorizing the second respective operation, and
in accordance with a determination that the second respective operation does not correspond to driving of the vehicle, authorizing performance of the second respective operation.

7. The computer system of claim 1, wherein selection of the contactable user requests permission from the contactable user to restore use of the first secure credential to authorize the first function of the one or more functions from a remote location.

8. The computer system of claim 1, wherein selection of the contactable user requests permission from the contactable user to restore use of the first secure credential to authorize the first function of the one or more functions when proximity criteria are satisfied.

9. The computer system of claim 1, wherein the plurality of contactable users includes a first set of contactable users that have a predetermined relationship to a user of the computer system and a second set of contactable users that do not have the predetermined relationship to the user of the computer system and wherein the contactable user is user within the first set of contactable users.

10. The computer system of claim 1, wherein the one or more programs further include instructions for:
in response to detecting the second sequence of one or more user inputs corresponding to selection of the contactable user from the plurality of contactable users, initiating a process for transmitting a second secure credential to an electronic device associated with the contactable user, wherein the second secure credential is configured to provide authorization to use at least a subset of the one or more functions of the vehicle that includes the first function of the one or more functions.

11. The computer system of claim 10, wherein the second secure credential is not configured to provide authorization to use a third function, different from the first function, that the first secure credential is configured to provide authorization to use.

12. The computer system of claim 10, wherein the one or more programs further include instructions for:
after initiating the process for transmitting the second secure credential to the electronic device associated with the contactable user, in accordance with a determination that the predetermined period of time has elapsed after initiating the process for transmitting the second secure credential to the electronic device associated with the contactable user, initiating a process to disable the second secure credential.

13. The computer system of claim 1, wherein the plurality of contactable users includes one or more previously-identified emergency contacts, and the one or more programs further include instructions for:
prior to detecting the second sequence of one or more inputs, displaying a suggestion to select at least one of the one or more previously-identified emergency contacts as the contactable user.

14. The computer system of claim 1, wherein the one or more programs further include instructions for:
after detecting the second sequence of one or more user inputs and after restricting use of the first secure credential to authorize the first function of the one or more functions, detecting a third sequence of one or more user inputs corresponding to a request to restore use of the first secure credential to authorize the first function of the one or more functions; and in response to detecting the third sequence of one or more user inputs corresponding to the request to restore use of the first secure credential to authorize the first function of the one or more functions, transmitting a notification to the contactable user notifying the contactable user of the request to restore use of the first secure credential to authorize the first function of the one or more functions.

15. The computer system of claim 1, wherein the one or more programs further include instructions for:

after restricting use of the first secure credential to authorize the first function of the one or more functions, receiving biometric information; and in response to receiving the biometric information:

in accordance with a determination that the biometric information satisfies unlocking criteria, restoring use of the first secure credential to authorize the first function of the one or more functions; and in accordance with a determination that the biometric information does not satisfy unlocking criteria, maintaining restriction of use of the first secure credential to authorize the first function of the one or more functions.

16. The computer system of claim 1, wherein the one or more programs further include instructions for:

after restricting use of the first secure credential to authorize the first function of the one or more functions, detecting a fourth sequence of one or more user inputs corresponding to a request to restore use of the first secure credential to authorize the first function of the one or more functions;

in response to receiving the fourth sequence of one or more user inputs:

in accordance with a determination that the fourth sequence of one or more user inputs satisfies unlocking criteria, restoring use of the first secure credential to authorize the first function of the one or more functions; and in accordance with a determination that the fourth sequence of one or more user inputs do not satisfy unlocking criteria, maintaining restriction of use of the first secure credential to authorize the first function of the one or more functions.

17. A non-transitory computer-readable storage medium storing one or more programs configured to be executed by one or more processors of a computer system that is in communication with a display generation component and one or more input devices, the one or more programs including instructions for:

displaying, via the display generation component, a user interface object corresponding to a first secure credential stored on the computer system, wherein the first secure credential enables the computer system to provide authorization to use one or more functions of a vehicle that is separate from the computer system;

while displaying the user interface object corresponding to the first secure credential, detecting, via an input device from the one or more input devices, a sequence of one or more user inputs corresponding to a request to restrict use of the first secure credential stored on the computer system to authorize at least a first function of the one or more functions for a predetermined period of time;

in response to detecting the sequence of one or more user inputs, restricting use of the first secure credential stored on the computer system to authorize the first function of the one or more functions, wherein restricting the use of the first secure credential stored on the computer system to authorize the first function of the one or more functions prohibits the computer system from providing authorization to use the first function of the one or more functions of the vehicle that is separate from the computer system during the predetermined period of time; and detecting, via the input device from the one or more input devices, a second sequence of one or more user inputs corresponding to selection of a contactable user from a plurality of contactable users, wherein selection of the contactable user enables the contactable user, using a second external device separate from the computer system, to restore use of the first secure credential stored on the computer system to authorize the first function of the one or more functions.

18. A method, comprising:

at a computer system that is in communication with a display generation component and one or more input devices:

displaying, via the display generation component, a user interface object corresponding to a first secure credential stored on the computer system, wherein the first secure credential enables the computer system to provide authorization to use one or more functions of a vehicle;

while displaying the user interface object corresponding to the first secure credential, detecting, via an input device from the one or more input devices, a sequence of one or more user inputs corresponding to a request to restrict use of the first secure credential stored on the computer system to authorize at least a first function of the one or more functions for a predetermined period of time;

in response to detecting the sequence of one or more user inputs, restricting use of the first secure credential stored on the computer system to authorize the first function of the one or more functions, wherein restricting the use of the first secure credential stored on the computer system to authorize the first function of the one or more functions prohibits the computer system from providing authorization to use the first function of the one or more functions of the vehicle that is separate from the computer system during the predetermined period of time; and detecting, via the input device from the one or more input devices, a second sequence of one or more user inputs corresponding to selection of a contactable user from a plurality of contactable users, wherein selection of the contactable user enables the contactable user, using a second external device separate from the computer system, to restore use of the first secure credential enrolled on the computer system to authorize the first function of the one or more functions.

19. The non-transitory computer-readable storage medium system of claim 17, wherein the one or more programs further include instructions for:

after restricting use of the first secure credential to authorize the first function of the one or more functions, in accordance with a determination that the predetermined period of time has elapsed after restricting use of the first secure credential to authorize the first function of the one or more functions, restoring use of the first secure credential to authorize the first function of the one or more functions, wherein restoring use of the first secure credential to authorize the first function of the one or more functions allows the computer system to provide authorization to use the first function of the one or more functions of the vehicle that is separate from the computer system.

20. The non-transitory computer-readable storage medium system of claim 17, wherein the one or more programs further include instructions for:
   detecting a request to use the first secure credential to authorize the first function of the one or more functions; and
   in response to detecting the request to use the first secure credential to authorize the first function of the one or more functions:
      in accordance with a determination that use of the first secure credential to authorize the first function of the one or more functions is not currently restricted, authorizing the first function of the one or more functions, and
      in accordance with a determination that use of the first secure credential to authorize the first function of the one or more functions is currently restricted, forgoing authorizing.

21. The non-transitory computer-readable storage medium system of claim 17, wherein the one or more programs further include instructions for:
   after restricting use of the first secure credential to authorize the first function of the one or more functions:
   detecting a request to use the first secure credential to authorize a respective operation of the vehicle; and
   in response to detecting the request to use the secure credential to authorize the respective operation:
      in accordance with a determination that the respective operation corresponds to the first function, forgoing authorizing the respective operation, and
      in accordance with a determination that the respective operation corresponds to a second function different from the first function, authorizing the respective operation.

22. The non-transitory computer-readable storage medium system of claim 17, wherein the first function comprises driving the vehicle, and restricting use of the first secure credential to authorize the first function of the one or more functions comprises restricting use of the first secure credential to authorize driving of the vehicle.

23. The non-transitory computer-readable storage medium system of claim 22, wherein the one or more programs further include instructions for:
   after restricting use of the first secure credential to authorize driving of the vehicle:
   detecting an attempt to use the first secure credential to perform a second respective operation of the vehicle; and
   in response to detecting the attempt to use the secure credential to perform the second respective operation:
      in accordance with a determination that the second respective operation corresponds to driving of the vehicle, forgoing authorizing the second respective operation, and
      in accordance with a determination that the second respective operation does not correspond to driving of the vehicle, authorizing performance of the second respective operation.

24. The non-transitory computer-readable storage medium system of claim 17, wherein selection of the contactable user requests permission from the contactable user to restore use of the first secure credential to authorize the first function of the one or more functions from a remote location.

25. The non-transitory computer-readable storage medium system of claim 17, wherein selection of the contactable user requests permission from the contactable user to restore use of the first secure credential to authorize the first function of the one or more functions when proximity criteria are satisfied.

26. The non-transitory computer-readable storage medium system of claim 17, wherein the plurality of contactable users includes a first set of contactable users that have a predetermined relationship to a user of the computer system and a second set of contactable users that do not have the predetermined relationship to the user of the computer system and wherein the contactable user is user within the first set of contactable users.

27. The non-transitory computer-readable storage medium system of claim 17, wherein the one or more programs further include instructions for:
   in response to detecting the second sequence of one or more user inputs corresponding to selection of the contactable user from the plurality of contactable users, initiating a process for transmitting a second secure credential to an electronic device associated with the contactable user, wherein the second secure credential is configured to provide authorization to use at least a subset of the one or more functions of the vehicle that includes the first function of the one or more functions.

28. The non-transitory computer-readable storage medium system of claim 27, wherein the second secure credential is not configured to provide authorization to use a third function, different from the first function, that the first secure credential is configured to provide authorization to use.

29. The non-transitory computer-readable storage medium system of claim 27, wherein the one or more programs further include instructions for:
   after initiating the process for transmitting the second secure credential to the electronic device associated with the contactable user, in accordance with a determination that the predetermined period of time has elapsed after initiating the process for transmitting the second secure credential to the electronic device associated with the contactable user, initiating a process to disable the second secure credential.

30. The non-transitory computer-readable storage medium system of claim 17, wherein the plurality of contactable users includes one or more previously-identified emergency contacts, and the one or more programs further include instructions for:
   prior to detecting the second sequence of one or more inputs, displaying a suggestion to select at least one of the one or more previously-identified emergency contacts as the contactable user.

31. The non-transitory computer-readable storage medium system of claim 17, wherein the one or more programs further include instructions for:
   after detecting the second sequence of one or more user inputs and after restricting use of the first secure credential to authorize the first function of the one or more functions, detecting a third sequence of one or more user inputs corresponding to a request to restore use of the first secure credential to authorize the first function of the one or more functions; and in response to detecting the third sequence of one or more user inputs corresponding to the request to restore use of the first secure credential to authorize the first function of the one or more functions, transmitting a notification to the contactable user notifying the contactable user of the request to restore use of the first secure credential to authorize the first function of the one or more functions.

32. The non-transitory computer-readable storage medium system of claim 17, wherein the one or more programs further include instructions for:

after restricting use of the first secure credential to authorize the first function of the one or more functions, receiving biometric information; and in response to receiving the biometric information:
in accordance with a determination that the biometric information satisfies unlocking criteria, restoring use of the first secure credential to authorize the first function of the one or more functions; and in accordance with a determination that the biometric information does not satisfy unlocking criteria, maintaining restriction of use of the first secure credential to authorize the first function of the one or more functions.

33. The non-transitory computer-readable storage medium system of claim 17, wherein the one or more programs further include instructions for:

after restricting use of the first secure credential to authorize the first function of the one or more functions, detecting a fourth sequence of one or more user inputs corresponding to a request to restore use of the first secure credential to authorize the first function of the one or more functions;

in response to receiving the fourth sequence of one or more user inputs:
in accordance with a determination that the fourth sequence of one or more user inputs satisfies unlocking criteria, restoring use of the first secure credential to authorize the first function of the one or more functions; and in accordance with a determination that the fourth sequence of one or more user inputs do not satisfy unlocking criteria, maintaining restriction of use of the first secure credential to authorize the first function of the one or more functions.

34. The method of claim 18, further comprising:
after restricting use of the first secure credential to authorize the first function of the one or more functions, in accordance with a determination that the predetermined period of time has elapsed after restricting use of the first secure credential to authorize the first function of the one or more functions, restoring use of the first secure credential to authorize the first function of the one or more functions, wherein restoring use of the first secure credential to authorize the first function of the one or more functions allows the computer system to provide authorization to use the first function of the one or more functions of the vehicle that is separate from the computer system.

35. The method of claim 18, further comprising:
detecting a request to use the first secure credential to authorize the first function of the one or more functions; and in response to detecting the request to use the first secure credential to authorize the first function of the one or more functions:
in accordance with a determination that use of the first secure credential to authorize the first function of the one or more functions is not currently restricted, authorizing the first function of the one or more functions, and in accordance with a determination that use of the first secure credential to authorize the first function of the one or more functions is currently restricted, forgoing authorizing.

36. The method of claim 18, further comprising:
after restricting use of the first secure credential to authorize the first function of the one or more functions:
detecting a request to use the first secure credential to authorize a respective operation of the vehicle; and in response to detecting the request to use the secure credential to authorize the respective operation:
in accordance with a determination that the respective operation corresponds to the first function, forgoing authorizing the respective operation, and in accordance with a determination that the respective operation corresponds to a second function different from the first function, authorizing the respective operation.

37. The method of claim 18, wherein the first function comprises driving the vehicle, and restricting use of the first secure credential to authorize the first function of the one or more functions comprises restricting use of the first secure credential to authorize driving of the vehicle.

38. The method of claim 37, further comprising:
after restricting use of the first secure credential to authorize driving of the vehicle:
detecting an attempt to use the first secure credential to perform a second respective operation of the vehicle; and in response to detecting the attempt to use the secure credential to perform the second respective operation:
in accordance with a determination that the second respective operation corresponds to driving of the vehicle, forgoing authorizing the second respective operation, and in accordance with a determination that the second respective operation does not correspond to driving of the vehicle, authorizing performance of the second respective operation.

39. The method of claim 18, wherein selection of the contactable user requests permission from the contactable user to restore use of the first secure credential to authorize the first function of the one or more functions from a remote location.

40. The method of claim 18, wherein selection of the contactable user requests permission from the contactable user to restore use of the first secure credential to authorize the first function of the one or more functions when proximity criteria are satisfied.

41. The method of claim 18, wherein the plurality of contactable users includes a first set of contactable users that have a predetermined relationship to a user of the computer system and a second set of contactable users that do not have the predetermined relationship to the user of the computer system and wherein the contactable user is user within the first set of contactable users.

42. The method of claim 18, further comprising:
in response to detecting the second sequence of one or more user inputs corresponding to selection of the contactable user from the plurality of contactable users, initiating a process for transmitting a second secure credential to an electronic device associated with the contactable user, wherein the second secure credential is configured to provide authorization to use at least a subset of the one or more functions of the vehicle that includes the first function of the one or more functions.

43. The method of claim 42, wherein the second secure credential is not configured to provide authorization to use a third function, different from the first function, that the first secure credential is configured to provide authorization to use.

44. The method of claim 42, further comprising:
after initiating the process for transmitting the second secure credential to the electronic device associated with the contactable user, in accordance with a determination that the predetermined period of time has elapsed after initiating the process for transmitting the second secure credential to the electronic device associated with the contactable user, initiating a process to disable the second secure credential.

45. The method of claim 18, wherein the plurality of contactable users includes one or more previously-identified emergency contacts, and the method further comprises:
prior to detecting the second sequence of one or more inputs, displaying a suggestion to select at least one of the one or more previously-identified emergency contacts as the contactable user.

46. The method of claim 18, further comprising:
after detecting the second sequence of one or more user inputs and after restricting use of the first secure credential to authorize the first function of the one or more functions, detecting a third sequence of one or more user inputs corresponding to a request to restore use of the first secure credential to authorize the first function of the one or more functions; and
in response to detecting the third sequence of one or more user inputs corresponding to the request to restore use of the first secure credential to authorize the first function of the one or more functions, transmitting a notification to the contactable user notifying the contactable user of the request to restore use of the first secure credential to authorize the first function of the one or more functions.

47. The method of claim 18, further comprising:
after restricting use of the first secure credential to authorize the first function of the one or more functions, receiving biometric information; and
in response to receiving the biometric information:
in accordance with a determination that the biometric information satisfies unlocking criteria, restoring use of the first secure credential to authorize the first function of the one or more functions; and
in accordance with a determination that the biometric information does not satisfy unlocking criteria, maintaining restriction of use of the first secure credential to authorize the first function of the one or more functions.

48. The method of claim 18, further comprising:
after restricting use of the first secure credential to authorize the first function of the one or more functions, detecting a fourth sequence of one or more user inputs corresponding to a request to restore use of the first secure credential to authorize the first function of the one or more functions;
in response to receiving the fourth sequence of one or more user inputs:
in accordance with a determination that the fourth sequence of one or more user inputs satisfies unlocking criteria, restoring use of the first secure credential to authorize the first function of the one or more functions; and
in accordance with a determination that the fourth sequence of one or more user inputs do not satisfy unlocking criteria, maintaining restriction of use of the first secure credential to authorize the first function of the one or more functions.

\* \* \* \* \*

UNITED STATES PATENT AND TRADEMARK OFFICE
CERTIFICATE OF CORRECTION

PATENT NO. : 12,311,880 B2
APPLICATION NO. : 17/222568
DATED : May 27, 2025
INVENTOR(S) : Thomas Alsina It is certified that error appears in the above-identified patent and that said Letters Patent is hereby corrected as shown below:

In the Claims

In Column 52, Line 60, Claim 19, after "medium" delete "system".

In Column 53, Line 9, Claim 20, after "medium" delete "system".

In Column 53, Line 28, Claim 21, after "medium" delete "system".

In Column 53, Line 44, Claim 22, after "medium" delete "system".

In Column 53, Line 50, Claim 23, after "medium" delete "system".

In Column 54, Line 2, Claim 24, after "medium" delete "system".

In Column 54, Line 8, Claim 25, after "medium" delete "system".

In Column 54, Line 14, Claim 26, after "medium" delete "system".

In Column 54, Line 23, Claim 27, after "medium" delete "system".

In Column 54, Line 35, Claim 28, after "medium" delete "system".

In Column 54, Line 41, Claim 29, after "medium" delete "system".

In Column 54, Line 52, Claim 30, after "medium" delete "system".

In Column 54, Line 61, Claim 31, after "medium" delete "system".

Signed and Sealed this
Twenty-second Day of July, 2025

Coke Morgan Stewart
*Acting Director of the United States Patent and Trademark Office*

In Column 55, Line 12, Claim 32, after "medium" delete "system".

In Column 55, Line 29, Claim 33, after "medium" delete "system".